(12) United States Patent
Hashiguchi et al.

(10) Patent No.: US 8,650,965 B2
(45) Date of Patent: Feb. 18, 2014

(54) ROBOT, ROBOT SYSTEM, ROBOT CONTROL DEVICE, AND STATE DETERMINING METHOD

(75) Inventors: Yukio Hashiguchi, Fukuoka (JP); Shingo Ando, Fukuoka (JP); Takuya Fukuda, Fukuoka (JP); Takenori Oka, Fukuoka (JP); Shinji Murai, Fukuoka (JP); Takeomi Hidaka, Fukuoka (JP); Manabu Okahisa, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 134 days.

(21) Appl. No.: 13/221,868

(22) Filed: Aug. 30, 2011

(65) Prior Publication Data

US 2012/0048027 A1    Mar. 1, 2012

(30) Foreign Application Priority Data

Aug. 31, 2010 (JP) .................................. 2010-193717
Aug. 31, 2010 (JP) .................................. 2010-193718
Dec. 28, 2010 (JP) .................................. 2010-293843
Dec. 28, 2010 (JP) .................................. 2010-293844
Dec. 28, 2010 (JP) .................................. 2010-293845
Dec. 28, 2010 (JP) .................................. 2010-293846

(51) Int. Cl.
*G01L 1/00* (2006.01)
(52) U.S. Cl.
USPC .......................................................... 73/763
(58) Field of Classification Search
USPC .......................................................... 73/763
See application file for complete search history.

(56) References Cited

U.S. PATENT DOCUMENTS

| 5,136,201 A | * | 8/1992 | Culp ............................. 310/328 |
| 5,513,536 A | | 5/1996 | Reger et al. |
| 8,343,171 B2 | * | 1/2013 | Farritor et al. ................ 606/130 |
| 8,396,596 B2 | * | 3/2013 | Oka et al. ...................... 700/258 |
| 2010/0138030 A1 | | 6/2010 | Kohlmaier et al. |

FOREIGN PATENT DOCUMENTS

| DE | 102006049957 | * | 4/2008 |
| EP | 0333872 | | 9/1989 |
| EP | 0406018 | | 1/1991 |
| EP | 1696216 | * | 8/2006 |
| JP | 55-069010 | | 5/1980 |
| JP | 59-17197 U | | 2/1984 |
| JP | 60-95538 U | | 6/1985 |

(Continued)

OTHER PUBLICATIONS

Extended European Search Report for corresponding EP Application No. 11179266.9-2316, Aug. 7, 2012.

(Continued)

*Primary Examiner* — Lisa Caputo
*Assistant Examiner* — Octavia D. Hollington
(74) *Attorney, Agent, or Firm* — Ditthavong Mori & Steiner, P.C.

(57) ABSTRACT

A robot according to an embodiment includes an arm, a strain sensor, one or more actuator, and a sensor fixing jig. The strain sensor includes a piezoelectric body that has a natural frequency higher than a natural frequency of a structural material forming the arm. The one or more actuators are provided in the arm to drive the arm. The sensor fixing jig is provided in a base of the actuator, among the actuators in the arm, closest to a base end of the arm. The strain sensor is provided in the sensor fixing jig.

14 Claims, 55 Drawing Sheets

(56) References Cited

FOREIGN PATENT DOCUMENTS

| | | |
|---|---|---|
| JP | 61-33892 | 2/1986 |
| JP | 61-143812 | 7/1986 |
| JP | 62-251048 | 10/1987 |
| JP | 63-123105 | 5/1988 |
| JP | 63-131069 | 6/1988 |
| JP | 2-262993 | 10/1990 |
| JP | 02-310706 | 12/1990 |
| JP | 04-343690 | 11/1992 |
| JP | 05-026744 | 2/1993 |
| JP | 05-099764 | 4/1993 |
| JP | 06-170754 | 6/1994 |
| JP | 07-043226 | 2/1995 |
| JP | 09-085656 | 3/1997 |
| JP | 2006-021287 | 1/2006 |
| JP | 2007-203380 | 8/2007 |
| JP | 2008-6517 | 1/2008 |
| JP | 2009-058388 | 3/2009 |
| JP | 2009-226552 | 10/2009 |
| JP | 2010-506739 | 3/2010 |
| JP | 2008006517 * | 1/2013 |
| WO | WO 2007/096322 | 8/2007 |
| WO | WO 2007/139135 | 12/2007 |
| WO | WO 2008/046620 | 4/2008 |

OTHER PUBLICATIONS

Japanese Office Action for corresponding JP Application No. 2010-193717, Jul. 31, 2012.
Japanese Office Action for corresponding JP Application No. 2010-193718, Jul. 24, 2012.
Partial European Search Report for corresponding EP Application No. 11179266.9-2316, Dec. 29, 2011.
Extended European Search Report for corresponding EP Application No. 12197255.8-1712, Feb. 26, 2013.
Japanese Office Action for corresponding JP Application No. 2010-293843, May 2, 2013.
Japanese Office Action for corresponding JP Application No. 2010-293844, May 2, 2013.
Japanese Office Action for corresponding JP Application No. 2010-293845, May 2, 2013.
Japanese Office Action for corresponding JP Application No. 2010-293846, May 2, 2013.

* cited by examiner

AT THE TIME OF INSTRUCTING
(STATE IN WHICH THERE IS NO
ABNORMALITY IN ARMS)

AT THE TIME OF ACTIVATING
(STATE IN WHICH THERE IS ABNORMALITY IN ARMS)

AT THE TIME OF INSTRUCTING
(STATE IN WHICH THERE IS NO
ABNORMALITY IN ARMS)

AT THE TIME OF ACTIVATING
(STATE IN WHICH THERE IS
ABNORMALITY IN ARMS)

AT THE TIME OF INSTRUCTING

AT THE TIME OF INSTRUCTING

WAVEFORM OF TIME HISTORY OF OUTPUT VALUE V FROM SENSOR AT THE TIME OF INSTRUCTING

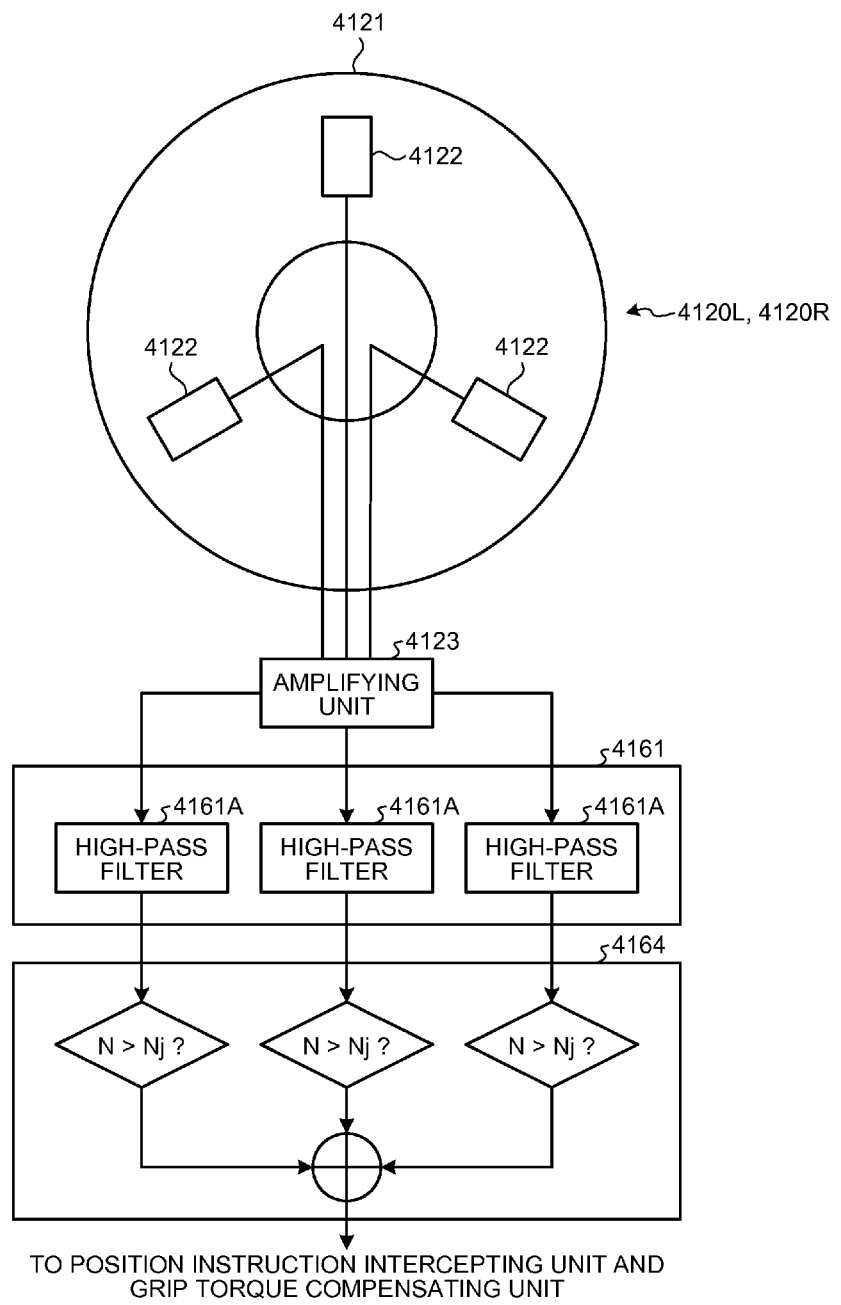

AT THE TIME OF INSTRUCTING
(STATE IN WHICH THERE IS NO
ABNORMALITY IN ARMS)

| POSITIVE/NEGATIVE OF EACH SENSOR SIGNAL PEAK VALUE | | | | COLLISION DIRECTION VECTOR |
|---|---|---|---|---|
| S1 | S2 | S3 | S4 | |
| 1 | -1 | 1 | -1 | V2 |
| 1 | -1 | -1 | 1 | V8 |
| 1 | -1 | 0 | 0 | V1 |
| -1 | 1 | 1 | -1 | V4 |
| -1 | 1 | -1 | 1 | V6 |
| -1 | 1 | 0 | 0 | V5 |
| 0 | 0 | 1 | -1 | V3 |
| 0 | 0 | -1 | 1 | V7 |
| COMBINATIONS OTHER THAN ABOVE | | | | DETERMINATION IMPOSSIBILITY |

FIG.55

| POSITIVE/NEGATIVE CONDITION OF INTEGRATION VALUE AT TIME X1 | | CANDIDATES FOR COLLISION DIRECTION VECTOR |
|---|---|---|
| POSITIVE/NEGATIVE OF INTEGRATION VALUE OF S1 | NEGATIVE | V1, V3, V7 |
| | 0 | V1, V3, V5, V7 |
| | POSITIVE | V3, V5, V7 |
| POSITIVE/NEGATIVE OF INTEGRATION VALUE OF S2 | NEGATIVE | V1, V5, V7 |
| | 0 | V1, V3, V5, V7 |
| | POSITIVE | V1, V3, V5 |
| POSITIVE/NEGATIVE OF INTEGRATION VALUE OF S3 | NEGATIVE | V3, V5, V7 |
| | 0 | V1, V3, V5, V7 |
| | POSITIVE | V1, V3, V7 |
| POSITIVE/NEGATIVE OF INTEGRATION VALUE OF S4 | NEGATIVE | V1, V3, V5 |
| | 0 | V1, V3, V5, V7 |
| | POSITIVE | V1, V5, V7 |

| POSITIVE/NEGATIVE CONDITION OF INTEGRATION VALUE AT TIME X2 | CANDIDATES FOR COLLISION DIRECTION VECTOR |
|---|---|
| POSITIVE/NEGATIVE OF INTEGRATION VALUE OF S1 | ... |
| POSITIVE/NEGATIVE OF INTEGRATION VALUE OF S2 | ... |

| POSITIVE/NEGATIVE CONDITION OF INTEGRATION VALUE AT TIME X3 | ... | ... |
|---|---|---|

| POSITIVE/NEGATIVE CONDITION OF INTEGRATION VALUE AT TIME X4 | ... | ... |
|---|---|---|

|      | Xmin | Xmax | Ymin | Ymax | Zmin | Zmax | Rz | Ex |     |
|------|------|------|------|------|------|------|----|----|-----|
| NO 1 | 0    | 100  | 0    | 100  | 0    | 100  | 45 | 70 |     |
| NO 2 | 100  | 200  | 0    | 100  | 0    | 100  | 47 | 75 |     |
| ...  | ...  | ...  | ...  | ...  | ...  | ...  | ...| ...| ... |

…

ROBOT, ROBOT SYSTEM, ROBOT CONTROL DEVICE, AND STATE DETERMINING METHOD

CROSS-REFERENCE TO RELATED APPLICATIONS

This application is based upon and claims the benefit of priority from the prior Japanese Patent Application No. 2010-193717, filed on Aug. 31, 2010; Japanese Patent Application No. 2010-193718, filed on Aug. 31, 2010; Japanese Patent Application No. 2010-293843, filed on Dec. 28, 2010; Japanese Patent Application No. 2010-293844, filed on Dec. 28, 2010; Japanese Patent Application No. 2010-293845, filed on Dec. 28, 2010; and Japanese Patent Application No. 2010-293846, filed on Dec. 28, 2010, the entire contents of all of which are incorporated herein by reference.

FIELD

The embodiments discussed in the present application are directed to a robot, a robot system, a robot control device, and a state determining method.

BACKGROUND

From the past, in the field of robotics, it is preferable to prevent an excessive load from acting on a robot or an object existing around the robot. For this reason, various technologies for detecting generation or non-generation of a contact (external force) to the robot are studied. For example, a technology is known which installs a force detector in a base end of a robot arm to detect the external force, and stops an operation of the robot arm on the basis of the detection result of the force detector or causing the robot arm to move in the direction capable of reducing the effect of the external force when the excessive external force is applied. The relevant technologies of the related art are described, for example, in Japanese Patent Application Laid-Open (JP-A) Nos. 2006-21287 and 2007-203380.

However, in the related art in which the force detector is simply provided in the robot, the response of the force detector to the contact of the robot arm is late, which may become an obstacle in detecting a light or momentary touch with a high degree of precision and improving the functionality of the robot.

SUMMARY

A robot according to an aspect of the embodiment includes a robot arm and a strain sensor. The strain sensor includes a piezoelectric body that has a natural frequency higher than that of a structural material forming the robot arm.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 36 is a diagram illustrating the detailed configuration of sensor units, a high-pass filter unit, and a comparing/determining unit according to the fourth embodiment.

FIG. 55 is a diagram illustrating an example of an external force direction narrowing condition table according to the sixth embodiment.

FIG. 63 is a diagram illustrating an example of the redundant angle definition table according to the eighth embodiment.

DESCRIPTION OF EMBODIMENTS

A robot according to an embodiment includes a robot arm and a strain sensor. The strains sensor has a piezoelectric body that has a natural frequency higher than that of a structural material forming the robot arm.

A robot system according to an embodiment includes a robot, a strain sensor, and a control unit. The robot has a robot arm. The strains sensor has a piezoelectric body that has a natural frequency higher than that of a structural material forming the robot arm. The control unit determines a predetermined state of the robot, on the basis of an output value of the strain sensor.

First, a first embodiment will be described.

In a field of robots, it is preferable to avoid an excessive load from being generated with respect to a robot or an object existing around the robot. For this reason, generation or non-generation of a contact (external force) with respect to the robot needs to be detected.

For example, a technology for attaching a force detector to detect the external force to a base end of a robot arm and stopping an operation of the robot arm on the basis of the detection result of the force detector or operating the robot arm in a reduction direction of the external force when the excessive external force is applied is disclosed in JP-A No. 2006-21287.

In order to improve functionality of the robot, it is preferable to detect generation or non-generation of a contact with respect to the robot arm with high precision.

In the related art, a six-axis force sensor is used as the force detector, and because the magnitude of the actual external force applied to the robot arm is detected, responsiveness with respect to the contact of the robot arm is late. Further, a slight contact or a momentary contact may not be sufficiently detected.

According to one aspect of the embodiment, a robot that can improve functionality of the robot is provided.

According to this embodiment, the functionality of the robot can be improved.

Hereinafter, the first embodiment will be described with reference to the drawings. This embodiment is an example of the case where the robot disclosed in the present application is applied to detection of abnormality of robot arms.

Figure 1:
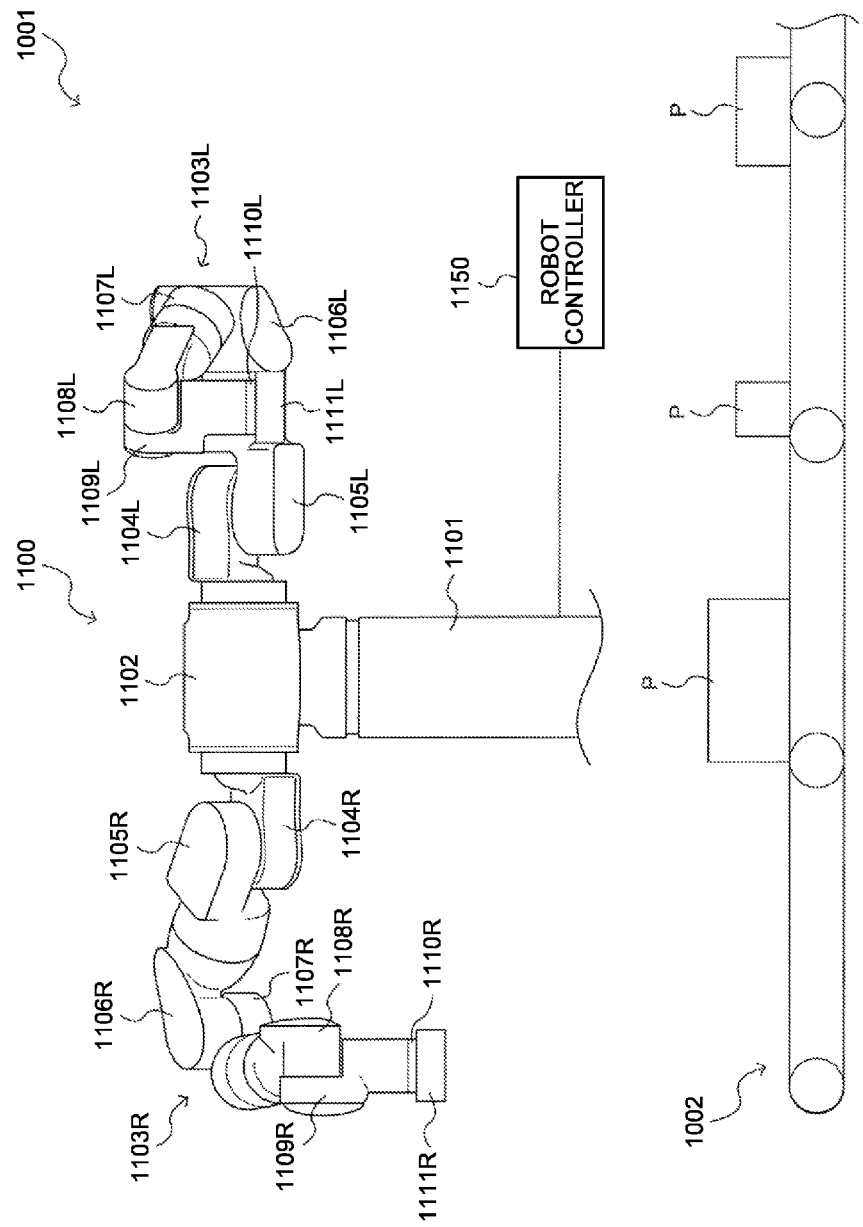
FIG. 1 is a conceptual diagram illustrating the entire configuration of a robot system that includes a robot according to a first embodiment.
Figure 2:
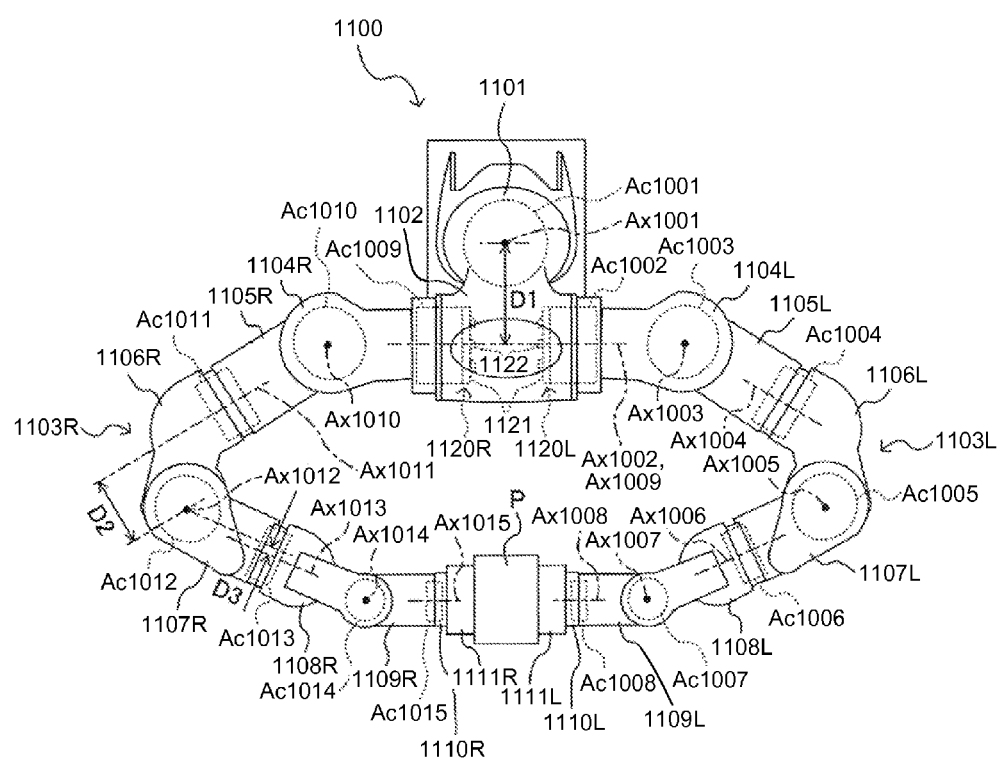
FIG. 2 is a top view illustrating the configuration of the robot according to the first embodiment.

FIG. 1 is a conceptual diagram illustrating the entire configuration of a robot system that includes the robot according to the first embodiment. FIG. 2 is a top view illustrating the configuration of the robot according to the first embodiment.

In FIGS. 1 and 2, a robot system 1001 according to this embodiment includes a robot 1100 that is provided on one side of a belt conveyor 1002 to convey plural products P and a robot controller 1150 that controls the robot 1100. The robot 1100 is a dual-arm robot and has a base 1101, a trunk portion 1102, two arms 1103L and 1103R (robot arms), and two sensor units 1120L and 1120R that function as a means for detecting dynamic strain of a structural material forming the robot arms.

The base 1101 is fixed to a mounting surface (floor) by an anchor bolt (not illustrated in the drawings). The trunk portion 1102 has a first joint portion in which an actuator Ac1001 driven to rotate around a rotation axis Ax1001 is provided. The trunk portion 1102 is disposed to rotate through the first joint portion with respect to the base 1101 and rotates along a direction approximately horizontal to the mounting surface by driving of the actuator Ac1001 provided in the first joint portion. The trunk portion 1102 supports the arms 1103L and 1103R that are configured as separate objects, at one side (right side in FIGS. 1 and 2) and the other side (left side in FIGS. 1 and 2), respectively.

The arm 1103L is a manipulator that is provided on one side of the trunk portion 1102. The arm 1103L has a shoulder portion 1104L, an upper arm A portion 1105L, an upper arm B portion 1106L, a lower arm portion 1107L, a wrist A portion 1108L, a wrist B portion 1109L, a flange 1110L, a hand 1111L, and second to eighth joint portions in which actuators Ac1002 to Ac1008 to drive rotation of the individual portions are provided, respectively.

The shoulder portion 1104L is connected to the trunk portion 1102 to rotate through the second joint portion and rotates around a rotation axis Ax1002 approximately horizontal to the mounting surface by driving of the actuator Ac1002 provided in the second joint portion. The upper arm A portion 1105L is connected to the shoulder portion 1104L to rotate through the third joint portion and rotates around a rotation axis Ax1003 orthogonal to the rotation axis Ax1002 by driving of the actuator Ac1003 provided in the third joint portion. The upper arm B portion 1106L is connected to a front end of the upper arm A portion 1105L to rotate through the fourth joint portion and rotates around a rotation axis Ax1004 orthogonal to the rotation axis Ax1003 by driving of the actuator Ac1004 provided in the fourth joint portion. The lower arm portion 1107L is connected to the upper arm B portion 1106L to rotate through the fifth joint portion and rotates around a rotation axis Ax1005 orthogonal to the rotation axis Ax1004 by driving of the actuator Ac1005 provided in the fifth joint portion. The wrist A portion 1108L is connected to a front end of the lower arm portion 1107L to rotate through the sixth joint portion and rotates around a rotation axis Ax1006 orthogonal to the rotation axis Ax1005 by driving of the actuator Ac1006 provided in the sixth joint portion. The wrist B portion 1109L is connected to the wrist A portion 1108L to rotate through the seventh joint portion and rotates around a rotation axis Ax1007 orthogonal to the rotation axis Ax1006 by driving of the actuator Ac1007 provided in the seventh joint portion. The flange 1110L is connected to a front end of the wrist B portion 1109L to rotate through the eighth joint portion and rotates around a rotation axis Ax1008 orthogonal to the rotation axis Ax1007 by driving of the actuator Ac1008 provided in the eighth joint portion. The hand 1111L is attached to a front end of the flange 1110L and rotates according to the rotation of the flange 1110L.

The arm 1103R is a manipulator that is provided on the other side of the trunk portion 1102. Similar to the arm 1103L, the arm 1103R has a shoulder portion 1104R, an upper arm A portion 1105R, an upper arm B portion 1106R, a lower arm portion 1107R, a wrist A portion 1108R, a wrist B portion 1109R, a flange 1110R, a hand 1111R, and ninth to fifteenth joint portions in which actuators Ac1009 to Ac1015 to drive rotation of the individual portions are provided, respectively.

The shoulder portion 1104R is connected to the trunk portion 1102 to rotate through the ninth joint portion and rotates around a rotation axis Ax1009 approximately horizontal to the mounting surface by driving of the actuator Ac1009 provided in the ninth joint portion. The upper arm A portion 1105R is connected to the shoulder portion 1104R to rotate through the tenth joint portion and rotates around a rotation axis Ax1010 orthogonal to the rotation axis Ax1009 by driving of the actuator Ac1010 provided in the tenth joint portion. The upper arm B portion 1106R is connected to a front end of the upper arm A portion 1105R to rotate through the eleventh joint portion and rotates around a rotation axis Ax1011 orthogonal to the rotation axis Ax1010 by driving of the actuator Ac1011 provided in the eleventh joint portion. The lower arm portion 1107R is connected to the upper arm B portion 1106R to rotate through the twelfth joint portion and rotates around a rotation axis Ax1012 orthogonal to the rotation axis Ax1011 by driving of the actuator Ac1012 provided in the twelfth joint portion. The wrist A portion 1108R is connected to a front end of the lower arm portion 1107R to rotate through the thirteenth joint portion and rotates around a rotation axis Ax1013 orthogonal to the rotation axis Ax1012 by driving of the actuator Ac1013 provided in the thirteenth joint portion. The wrist B portion 1109R is connected to the wrist A portion 1108R to rotate through the fourteenth joint portion and rotates around a rotation axis Ax1014 orthogonal to the rotation axis Ax1013 by driving of the actuator Ac1014 provided in the fourteenth joint portion. The flange 1110R is connected to a front end of the wrist B portion 1109R to rotate through the fifteenth joint portion and rotates around a rotation axis Ax1015 orthogonal to the rotation axis Ax1014 by driving of the actuator Ac1015 provided in the fifteenth joint portion. The hand 1111R is attached to a front end of the flange 1110R and rotates according to the rotation of the flange 1110R.

In this example, each of the arms 1103L and 1103R has seven joint portions, that is, degrees of freedom of 7 (redundant degrees of freedom). However, the degrees of freedom of each of the arms 1103L and 1103R are not limited to "7".

As structural materials that form the shoulder portions 1104L and 1104R, the upper arm A portions 1105L and 1105R, the upper arm B portions 1106L and 1106R, the lower arm portions 1107L and 1107R, the wrist A portions 1108L and 1108R, the wrist B portions 1109L and 1109R, the flanges 1110L and 1110R, and the hands 1111L and 1111R of the arms 1103L and 1103R, metallic materials such as iron or aluminum are used.

As illustrated in FIG. 2, the trunk portion 1102 is formed to protrude forward in a horizontal direction from the first joint portion to the second and ninth joint portions, with respect to the base 1101, such that the rotation axis Ax1001 of the first joint portion and the rotation axiss Ax1002 and Ax1009 of the second and ninth joint portions are offset by the length D1 in a direction approximately horizontal to the mounting surface. Thereby, a space of the lower side of the shoulder portions 1104L and 1104R can be used as a work space, and a reachable range of the arms 1103L and 1103R can be enlarged by rotating the rotation axis Ax1001.

A shape of the upper arm B portion 1106R is set such that the positions of the rotation axis Ax1001 of the eleventh joint portion and the rotation axis Ax1012 of the twelfth joint portion in plan view are offset by the length D2. A shape of the lower arm portion 1107R is set such that the positions of the rotation axis Ax1012 of the twelfth joint portion and the rotation axis Ax1013 of the thirteenth joint portion in plan view are offset by the length D3. When the rotation axis Ax1011 and the rotation axis Ax1013 take an approximately horizontal posture, the offset length of the rotation axis Ax1011 and the rotation axis Ax1013 becomes (D2+D3). Thereby, when the twelfth joint portion corresponding to a human "elbow" is bent, clearance of the upper arm A portion 1105R and the upper arm B portion 1106R corresponding to a human "upper arm" and the lower arm portion 1107R corresponding to a human "lower arm" can be greatly secured. Even when the hand 1111R comes close to the trunk portion 1102, a degree of freedom of the arm 1103R at the time of an operation increases.

Although not clearly illustrated in FIG. 2, similar to the arm 1103R, in the arm 1103L, a shape of the upper arm B portion 1106L is set such that the positions of the rotation axis Ax1004 of the fourth joint portion and the rotation axis Ax1005 of the fifth joint portion in upper view are offset by the length D2. A shape of the lower arm portion 1107L is set such that the positions of the rotation axis Ax1005 of the fifth joint portion and the rotation axis Ax1006 of the sixth joint portion in upper view are offset by the length D3. When the rotation axis Ax1004 and the rotation axis Ax1006 take an approximately horizontal posture, the offset length of the rotation axis Ax1004 and the rotation axis Ax1006 becomes (D2+D3). As illustrated in FIG. 2, each of the sensor units 1120L and 1120R includes a sensor fixing jig 1121 that is provided on the inner side of a casing constituting an outer wall of the robot 1100 (in this example, casing constituting an outer wall of the trunk portion 1102) and is formed in an annular shape and at least three (in this example, three) sensors 1122 (strain sensors) that have an approximately rectangular solid shape. The sensor fixing jig 1121 of the sensor unit 1120L is attached to a base of a stator of the actuator Ac1002 of the arm 1103L that is closest to the side of a base end, and the three sensors 1122 that are provided in the sensor fixing jig 1121 can detect the force applied the arm 1103L (in detail, amount of strain caused by a vibration due to the impact force applied to the arm 1103L, not the magnitude of the force). The sensor fixing jig 1121 of the sensor unit 1120R is attached to a base of a stator of the actuator Ac1009 of the arm 1103R that is closest to the side of a base end, and the three sensors 1122 that are provided in the sensor fixing jig 1121 can detect the force applied the arm 1103R (in detail, amount of strain caused by a vibration due to the impact force applied to the arm 1103R, not the magnitude of the force). The sensor units 1120L and 1120R will be described in detail below.

In this example, the sensor fixing jigs 1121 of the sensor units 1120L and 1120R are provided in the inner side of the casing of the trunk portion 1102. However, the embodiment is not limited thereto, and the sensor fixing jigs 1121 may be provided in the inner side of the casings of the arms 1103L and 1103R, respectively. In this example, the three sensors 1122 are provided in the sensor fixing jig 1121. However, the embodiment is not limited thereto and four or more (for example, four or five) sensors may be provided in the sensor fixing jig 1121.

In the robot 1100 that has the above-described configuration, operations of individual driving portions that include the actuators Ac1001 to Ac1015 are controlled by the robot controller 1150, such that the arms 1103L and 1103R are operated toward the inner side than both sides of the product P on the belt conveyor 1002 and the product P is gripped by the hands 1111L and 1111R. Each of the actuators Ac1001 to Ac1015 is composed of a decelerator-integrated servo motor that has a hollow portion where a wiring line (not illustrated in the drawings) can be inserted, and the rotation positions of the actuators Ac1001 to Ac1015 are input as signals from encoders (not illustrated in the drawings) incorporated in the actuators Ac1001 to Ac1015 to the robot controller 1150 through the wiring line.

Figure 3:
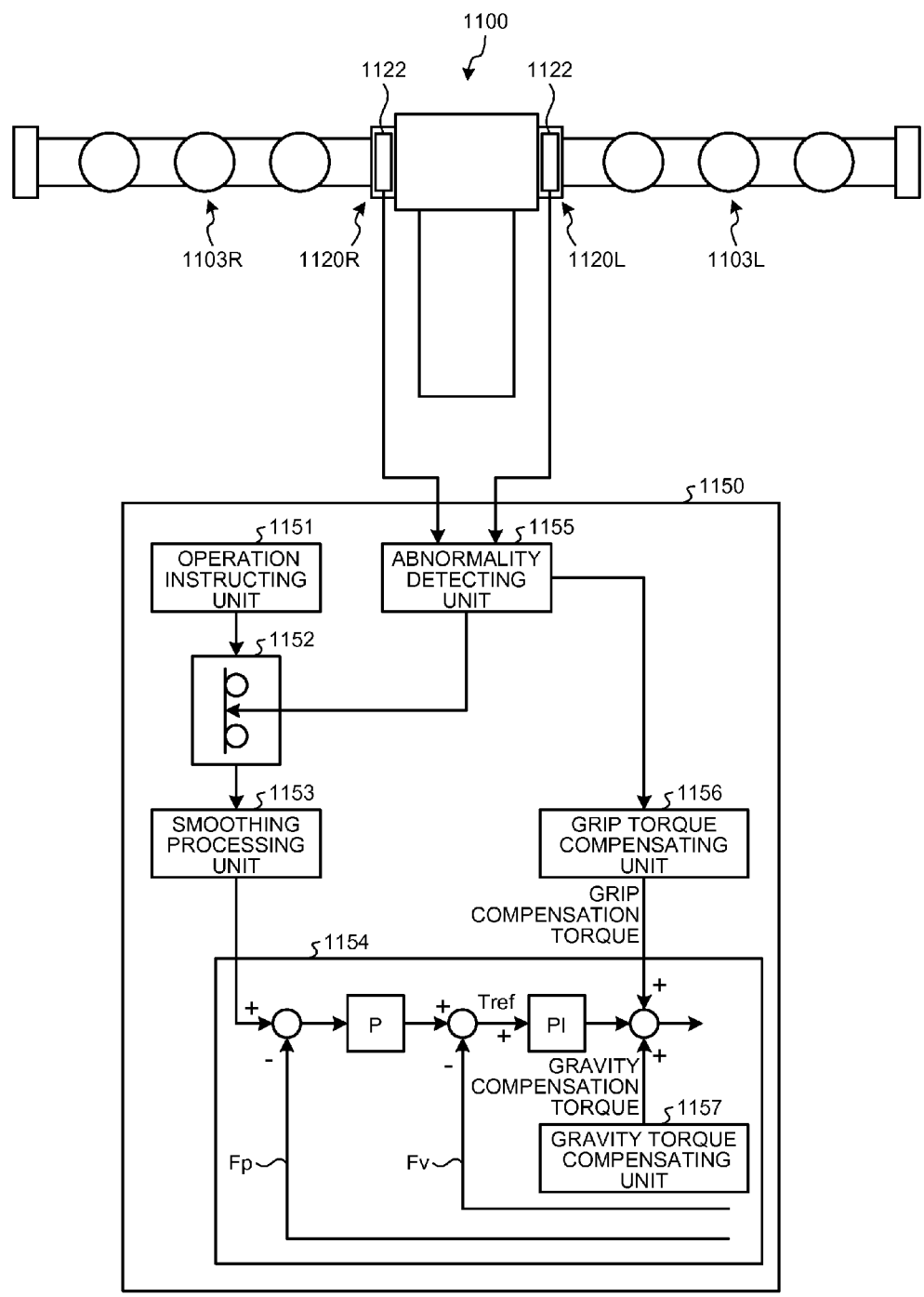
FIG. 3 is a block diagram illustrating the functional configuration of a robot controller according to the first embodiment.

FIG. 3 is a block diagram illustrating the functional configuration of the robot controller 1150 according to the first embodiment.

In FIG. 3, the robot controller 1150 is composed of a computer that includes an operator, a storage device, and an input device (not illustrated in the drawings) and is connected to the individual driving portions or the individual sensors 1122 of the robot 1100 through the wiring line to communicate with each other. The robot controller 1150 has an operation instructing unit 1151, a position instruction intercepting unit 1152, a smoothing processing unit 1153, a servo unit 1154, an abnormality detecting unit 1155, a grip torque compensating unit 1156, and a gravity torque compensating unit 1157.

The operation instructing unit 1151 calculates a position instruction (operation instruction) with respect to each of the actuators Ac1001 to Ac1015, on the basis of instruction information (information indicating the operation start position and the operation completion position) with respect to each of the arms 1103L and 1103R instructed through the input device, and pools the position instruction to the smoothing processing unit 1153 through the position instruction intercepting unit 1152.

The smoothing processing unit 1153 sequentially outputs the pooled position instruction to the servo unit 1154, for every predetermined operation cycle.

The servo unit 1154 has a joint angle feedback circuit Fp based on a detection value of the encoder of each of the actuators Ac1001 to Ac1015 and a joint angle feedback circuit Fv based on an angular speed detection value obtained from the detection value of the encoder of each of the actuators Ac1001 to Ac1015, for each of the actuators Ac1001 to Ac1015. The servo unit 1154 generates a torque instruction Tref with respect to each of the actuators Ac1001 to Ac1015 for every predetermined operation cycle, on the basis of the position instructions sequentially input by the smoothing processing unit 1153, and outputs the torque instruction.

The abnormality detecting unit 1155 detects generation or non-generation based on aging of a rotation member such as the actuators Ac1002 to Ac1015 provided in the arms 1103L and 1103R and the decelerator, on the basis of an output value V (output signal) of each sensor 1122 of the sensor units 1120L and 1120R. However, the embodiment is not limited thereto and the abnormality detecting unit 1155 may detect generation or non-generation of abnormality (including abnormality based on aging of the rotation member such as the actuators Ac1002 to Ac1015 or the decelerator or abnormality of the casings of the arms 1103L and 1103R) of the arms 1103L and 1103R. The abnormality detecting unit 1155 will be described in detail below.

When the abnormality of the actuators Ac1002 to Ac1015 of the arms 1103L and 1103R is detected by the abnormality detecting unit 1155, the position instruction intercepting unit 1152 intercepts an output of the position instruction from the operation instructing unit 1151 to the smoothing processing unit 1153 and intercepts the position instruction that is transmitted to the servo unit 1154. If the position instruction transmitted to the servo unit 1154 is intercepted, a value of the torque instruction Tref that is output by the feedback decreases and the arms 1103L and 1103R are quickly stopped.

The grip torque compensating unit 1156 adds the grip compensation torque to grip the product P by the arms 1103L and 1103R to the torque instruction Tref with respect to each of the actuators Ac1001 to Ac1015 generated by the servo unit 1154.

The gravity torque compensating unit 1157 adds the gravity compensation torque corresponding to the self weight to the torque instruction Tref with respect to each of the actuators Ac1001 to Ac1015 generated by the servo unit 1154.

Figure 4:
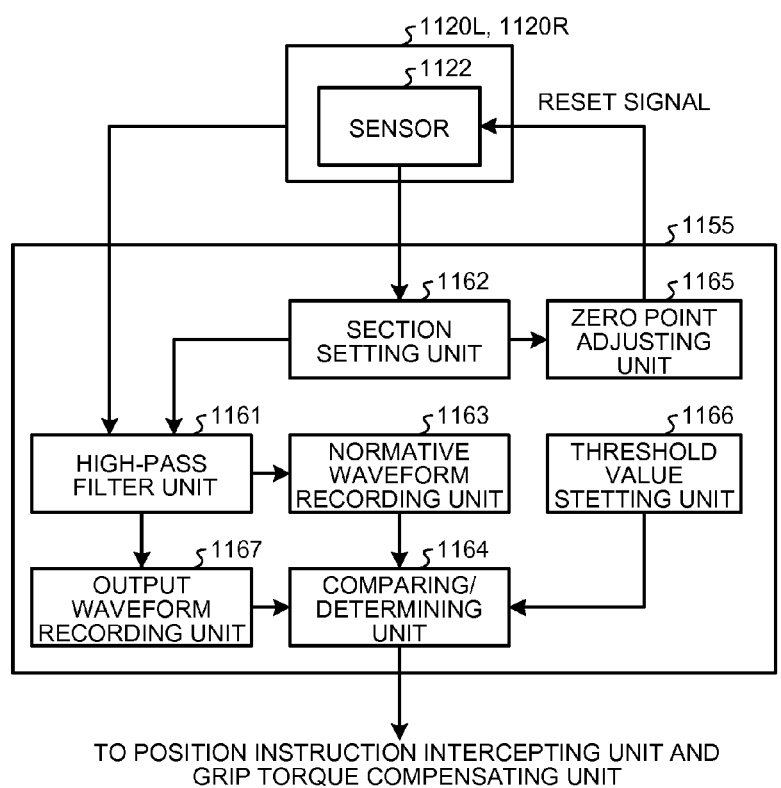
FIG. 4 is a block diagram illustrating the functional configuration of an abnormality detecting unit according to the first embodiment.

FIG. 4 is a block diagram illustrating the functional configuration of the abnormality detecting unit 1155 according to the first embodiment.

In FIG. 4, the abnormality detecting unit 1155 has a high-pass filter unit 1161, a section setting unit 1162, a normative waveform recording unit 1163, an output waveform recording unit 1167, a comparing/determining unit 1164, a zero point adjusting unit 1165, and a threshold value setting unit 1166.

The high-pass filter unit 1161 extracts a high frequency vibration component of an output signal of each sensor 1122 to remove a frequency component (for example, frequency component due to disturbance) other than a frequency due to the abnormality of the arms 1103L and 1103R, which is included in the output signal of each sensor 1122 of the sensor units 1120L and 1120R. The high-pass filter unit 1161 will be described in detail below.

The section setting unit 1162 sets a section where the normative waveform recording unit 1163 records a time history of the output value V of the sensor 1122 as a normative waveform, on the basis of input information input by the input device (hereinafter, simply referred to as "recording section").

The normative waveform recording unit 1163 records the time history of the output value V of each sensor 1122 based on the high frequency vibration component extracted by the high-pass filter unit 1161 while the arms 1103L and 1103R execute a predetermined operation corresponding to the recording section set by the section setting unit 1162 in a state in which there is no abnormality in the arms 1103L and 1103R as a normative waveform (refer to FIG. 6B to be described below) for each sensor 1122. In this case, the state in which there is no abnormality in the arms 1103L and 1103R means a state in which there is no structural or functional defect and failure in the casings (including the structure member, the cover member, and the wiring line) of the arms 1103L and 1103R and the actuators Ac1002 to Ac1015 provided in the arms 1103L and 1103R or the decelerator and the casings of the arms and the actuators or the decelerator are normally operated, and a contact or interference not to be intended is not generated in the arms 1103L and 1103R. For example, the state in which there is no abnormality in the arms 1103L and 1103R means a state immediately after it is checked that the casings of the arms 1103L and 1103R and the actuators Ac1002 to Ac1015 provided in the arms 1103L and 1103R or the decelerator are normally operated or a state at the time of initial activating in which there is no initial defect. The predetermined operation is an operation according to the position instruction that is calculated by the operation instructing unit 1151 on the basis of the instruction information (information indicating the operation start position and the operation completion position) instructed through the input device.

The output waveform recording unit 1167 may record the time history of the output value V of each sensor 1122 based on the high frequency vibration component extracted by the high-pass filter unit 1161 while the arms 1103L and 1103R execute the predetermined operation as an output waveform (refer to FIG. 7B to be described below) for each sensor 1122. In this embodiment, the output waveform recording unit 1167 records the time history of the output value V of each sensor 1122 while the arms 1103L and 1103R execute the predetermined operation as the output waveform for each sensor 1122, when the product P to be a grip object does not exist in a movable range at the time of activating (for example, immediately after starting conveyance of the product P or at the time of stopping the conveyance and performing checking). However, the embodiment is not limited thereto and the output waveform recording unit 1167 records the time history of the output value V of each sensor 1122 while the arms 1103L and 1103R execute the predetermined operation at the time of activating as an output waveform for each sensor 1122, when the product P to be a grip object exists in a movable range at the time of activating.

The threshold value setting unit 1166 sets a threshold value Dth that becomes a determination value of generation or non-generation of the abnormality in the comparing/determining unit 1164, on the basis of the input information input through the input device.

The comparing/determining unit 1164 compares the normative waveform recorded in the normative waveform recording unit 1163 for each sensor 1122 and the output waveform recorded in the output waveform recording unit 1167 for each sensor 1122, for each sensor 1122, and calculates the difference (in detail, absolute value of the difference) "D" of the normative waveform and the output waveform, for each sensor 1122. The number of times (hereinafter, referred to as number of times of excess N) where the difference "D" calculated for each sensor 1122 exceeds a threshold value Dth previously set by the threshold value setting unit 1166 for a constant time (in this example, time needed when the arms 1103L and 1103R execute the predetermined operation once)

is counted for each sensor 1122. The constant time is not limited to the time needed when the arms 1103L and 1103R execute the predetermined operation once. For example, the constant time may be time that is set through the input device. By determining whether the number of times of excess N counted for each sensor 1122 exceeds the predetermined number of times of determination Nj, for each sensor 1122, the comparing/determining unit 1164 determines whether there is abnormality in the actuators Ac1002 to Ac1015 of the arms 1103L and 1103R. The comparing/determining unit 1164 will be described in detail below.

The zero point adjusting unit 1165 outputs a reset signal to each sensor 1122 and adjusts a zero point of each sensor 1122, whenever the arms 1103L and 1103R execute the predetermined operation corresponding to the recording section set by the section setting unit 1162, to suppress the change in the ambient temperature due to heat generation of the actuators Ac1002 to Ac1015 of the arms 1103L and 1103R or an influence of the temperature drift of each sensor 1122 generated by self heat generation.

Figure 5:
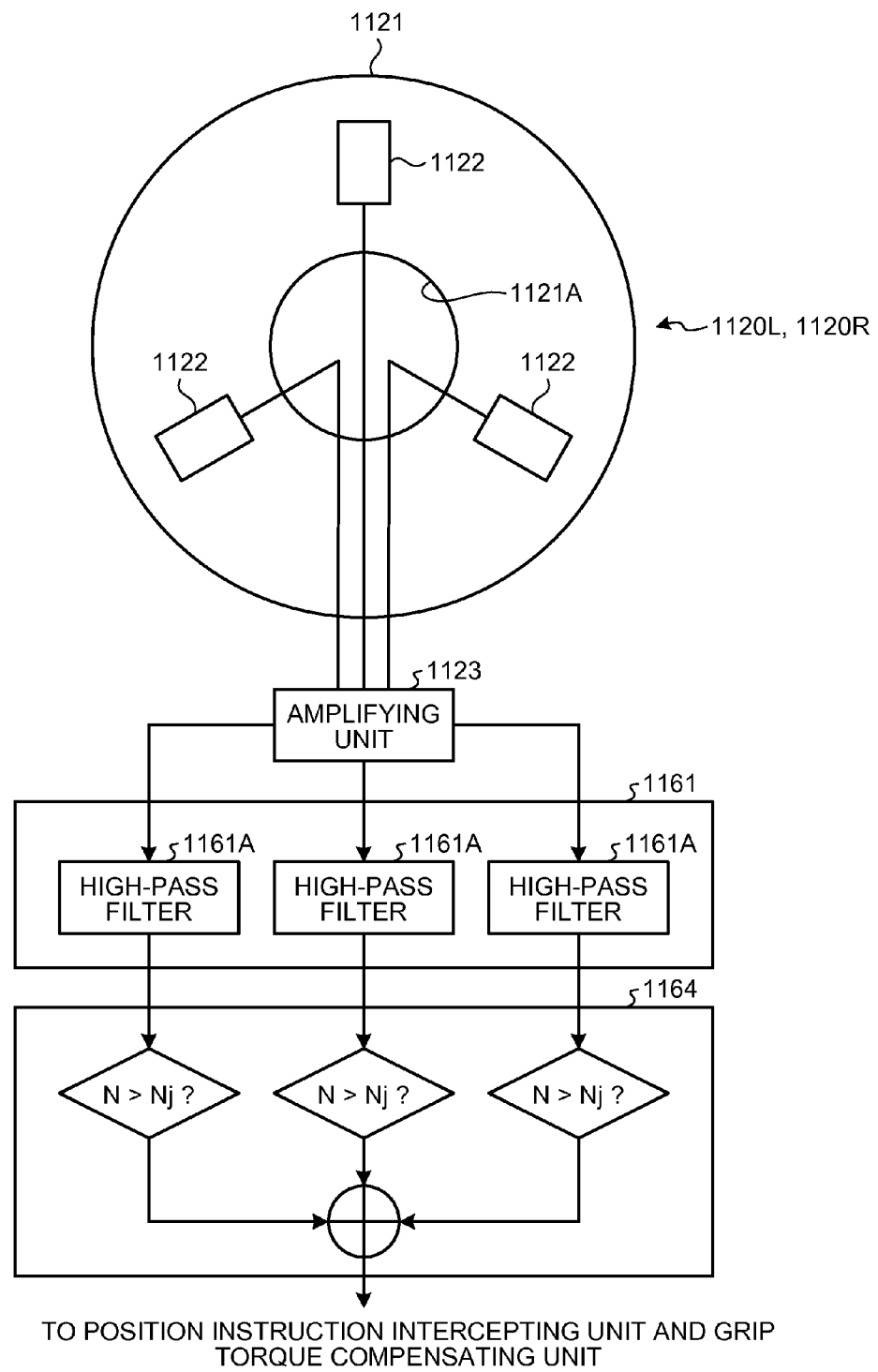
FIG. 5 is a diagram illustrating the detailed configuration of sensor units, a high-pass filter unit, and a comparing/determining unit according to the first embodiment.

FIG. 5 is a diagram illustrating the detailed configuration of the sensor units 1120L and 1120R, the high-pass filter unit 1161, and the comparing/determining unit 1164 according to the first embodiment. In FIG. 5, the normative waveform recording unit 1163 and the output waveform recording unit 1167 are not illustrated.

In FIG. 5, as described above, each of the sensor units 1120L and 1120R includes the sensor fixing jig 1121 that is provided on the inner side of the casing of the trunk portion 1102 and is formed in an annular shape and the three sensors 1122 that are provided in the sensor fixing jig 1121 and have an approximately rectangular solid shape. The sensor fixing jig 1121 of each of the sensor units 1120L and 1120R has an opening 1121A where the wiring line of the actuators Ac1002 to Ac1015 provided in the arms 1103L and 1103R can be inserted, at the approximately central portion. The three sensors 1122 of the sensor unit 1120L are disposed on an inner surface of the sensor fixing jig 1121, that is, a surface (the surface on the left side in FIG. 2 and the surface in front of a plane of paper in FIG. 5) not attached to the base of the stator of the actuator Ac1002, such that the three sensors 1122 are radially disposed at an equal interval on the same circumference. The three sensors 1122 of the sensor unit 1120R are disposed on the inner surface of the sensor fixing jig 1121, that is, a surface (the surface on the right side in FIG. 2 and the surface in front of a plane of paper in FIG. 5) not attached to the base of the stator of the actuator Ac1009, such that the three sensors 1122 are radially disposed at an equal interval on the same circumference.

In this embodiment, a force sensor that has a piezoelectric body made of a material having a natural frequency (rigidity) higher than that of the metallic material to be the structural material forming each portion of the arms 1103L and 1103R, in this example, a sensor where quartz is used as the piezoelectric body is used as each sensor 1122. This is because that the change force including a high frequency component can be detected when a natural frequency of the force sensor is high and the quartz has a natural frequency (or rigidity) higher than that of the metallic material that is the structural material forming each portion of the arms 1103L and 1103R. Therefore, a minute high frequency vibration (fast deformation and dynamic strain) that is transmitted to the structural material of each portion of the arms 1103L and 1103R can be detected.

Each sensor 1122 is not limited to the sensor where the quartz is used as the piezoelectric body and may be a force sensor that has a piezoelectric body made of a material having a natural frequency higher than that of the structural material forming each portion of the arms 1103L and 1103R. In this case, one sensor 1122 detects strain of one direction that is generated in the sensor fixing jig 1121. Meanwhile, an abnormal vibration or impact based on abnormality of the rotation member such as the actuators Ac1002 to Ac1015 of the arms 1103L and 1103R or the decelerator is transmitted to the sensor fixing jig 1121 through the structural material of each portion of the arms 1103L and 1103R in plural directions. Therefore, by providing the three sensors 1122 in each sensor fixing jig 1121 as described above, strain of three directions that is generated in each sensor fixing jig 1121 can be detected. Each sensor 1122 of the sensor unit 1120L detects the amount of strain of a radial direction of the sensor fixing jig 1121 due to the force applied to the arm 1103L as a voltage and each sensor 1122 of the sensor unit 1120R detects the amount of strain of a radial direction of the sensor fixing jig 1121 due to the force applied to the arm 1103R as a voltage. The voltage that is obtained by each sensor 1122 is amplified by the amplifying unit 1123 and is input to each high-pass filter 1161A (to be described below) of the high-pass filter unit 1161.

The high-pass filter unit 1161 has plural high-pass filters 1161A (or band-pass filters using a high frequency band as a pass-band) that can extract a high frequency vibration component of the output signal of the sensor 1122, and the high frequency component of the output signal of each sensor 1122 that is amplified by the amplifying unit 1123 is extracted by each high-pass filter 1161A. In each high-pass filter 1161A, a cut-off frequency is determined such that a frequency component other than a frequency due to abnormality of the arms 1103L and 1103R (frequency component due to an event other than a contact such as an operation of the actuators Ac1002 to Ac1015) can be removed.

By determining whether the number of times of excess N counted for each sensor 1122 exceeds the number of times of determination Nj for each sensor 1122 as described above, the comparing/determining unit 1164 determines whether there is abnormality in the actuators Ac1002 to Ac1015 of the arms 1103L and 1103R. Specifically, when the number of times of excess N for all of the sensors 1122 is within the number of times of determination Nj, the comparing/determining unit 1164 determines that there is no abnormality in the actuators Ac1002 to Ac1015. When the number of times of excess N for one sensor 1122 among all of the sensors 1122 exceeds the number of times of determination Nj, the comparing/determining unit 1164 determines that there is abnormality in the actuators Ac1002 to Ac1015.

The comparing/determining unit 1164 executes the above determination while changing the number of times of determination Nj according to the operation speed of the arms 1103L and 1103R. That is, in the case where abnormality based on aging is generated in the rotation member such as the actuators Ac1002 to Ac1015 of the arms 1103L and 1103R or the decelerator and a cyclic abnormal vibration or impact is generated at the time of the operation of the arms 1103L and 1103R, when the operation speed of the arms 1103L and 1103R is fast, the number of times of generating the cyclic abnormal vibration increases, and when the operation speed is slow, the number of times of generating the cyclic abnormal vibration decreases. For this reason, when the number of times of determination Nj is set to a constant value, erroneous detection of the abnormality is caused depending on the operation speed. Therefore, in this embodiment, the comparing/determining unit 1164 executes the above determination while changing the number of times of determination Nj according to the operation speed of the arms 1103L and 1103R, and prevents the erroneous detection.

Figure 6A:
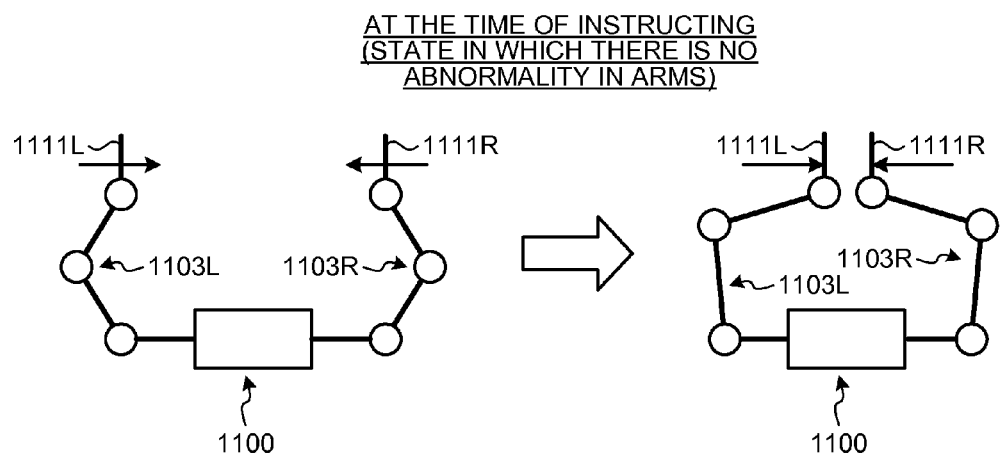
FIGS. 6A and 6B are diagrams illustrating a predetermined operation that is executed by arms according to the first embodiment in a state in which there is no abnormality and an output value of a sensor of a sensor during the predetermined operation.
Figure 6B:
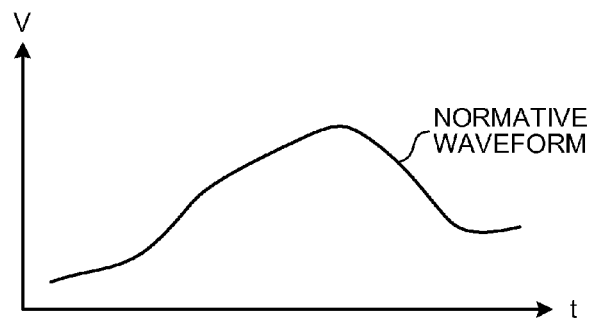

FIGS. 6A and 6B are diagrams illustrating a predetermined operation that is executed by the arms 1103L and 1103R according to the first embodiment in a state in which there is no abnormality and an output value V of the sensor 1122 during the predetermined operation.

FIG. 6A schematically illustrates an example of the predetermined operation that is executed by the arms 1103L and 1103R in a state in which there is no abnormality. In the example illustrated in FIG. 6A, in a state in which there is no abnormality in the arms 1103L and 1103R at the time of instructing and in an environment in which the product P that is an object to be gripped does not exist and there is no obstacle around the robot 1100 (within the movable range of the arms 1103L and 1103R), that is, in a state in which an object does not contact the arms 1103L and 1103R, a predetermined operation according to the position instruction from the robot controller 1150, that is, an operation from the instructed operation start position (position illustrated at the left side of FIG. 6A) to the instructed operation completion position (position illustrated at the right side of FIG. 6A) is executed. The operation completion position is set to the position where the hands 1111L and 1111R can grip the minimum product P of the products P conveyed by the belt conveyor 1002.

FIG. 6B illustrates an example of the normative waveform that is recorded in the normative waveform recording unit 1163 to correspond to the operation illustrated in FIG. 6A, in which a horizontal axis indicates time t and a vertical axis indicates an output value V of the sensor 1122. In the example illustrated in FIG. 6B, in the normative waveform recording unit 1163, the time history of the output value V of the sensor 1122 while the operation corresponding to the recording section described above and illustrated in FIG. 6A is executed once in a state in which there is no abnormality in the arms 1103L and 1103R is recorded as the normative waveform. The normative waveform can always be recorded, when there is no abnormality in the arms 1103L and 1103R. In this embodiment, an example of the case where the normative waveform is recorded at the time of instructing the predetermined operation with respect to the robot 1100 will be described.

Figure 7A:
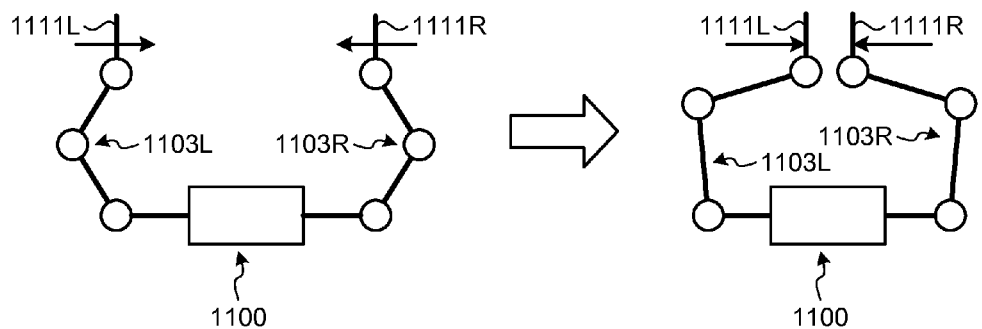
FIGS. 7A and 7B are diagrams illustrating a predetermined operation that is executed by the arms according to the first embodiment at the time of activating and an output value of the sensor during the predetermined operation.
Figure 7B:
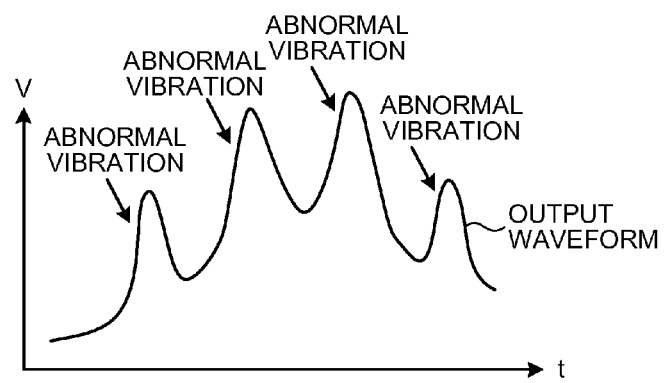

FIGS. 7A and 7B are diagrams illustrating a predetermined operation that is executed by the arms 1103L and 1103R according to the first embodiment at the time of activating and an output value V of the sensor 1122 during the predetermined operation.

FIG. 7A schematically illustrates an example of the predetermined operation that is executed by the arms 1103L and 1103R at the time of activating. In the example illustrated in FIG. 7A, when the product P to be a grip object does not exist in a movable range at the time of activating (for example, immediately after starting conveyance of the product P or at the time of stopping the conveyance and performing checking), in a state in which abnormality based on aging is generated in the rotation member such as the actuators Ac 1002 to Ac1015 of the arms 1103L and 1103R or the decelerator, the arms 1103L and 1103R execute a predetermined operation according to the position instruction from the robot controller 1150, that is, an operation from the instructed operation start position (position illustrated at the left side of FIG. 7A) to the instructed operation completion position (position illustrated at the right side of FIG. 7A). In the example that is illustrated in FIG. 7A, the case where the arms 1103L and 1103R execute the predetermined operation when the product P that is the grip object does not exist in the movable range as described above is illustrated. Therefore, similar to the case of FIG. 6A, the operation to the operation completion position is executed without gripping the product P by the hands 1111L and 1111R. Although not illustrated in the drawings, when the product P to be the grip object exists, the arms 1103L and 1103R is operated from the operation start position to the inner side more than both sides of the product P on the belt conveyor 1002. If the product P contacts the arms 1103L and 1103R, the arms 1103L and 1103R stop the operation at the corresponding position such that the product P is gripped by the hands 1111L and 1111R.

FIG. 7B illustrates an example of the normative waveform that is recorded in the output waveform recording unit 1167 to correspond to the operation illustrated in FIG. 7A, in which a horizontal axis indicates time t and a vertical axis indicates an output value V of the sensor 1122. In the example illustrated in FIG. 7B, in the output waveform recording unit 1167, the time history of the output value V of the sensor 1122 while the arms 1103L and 1103R execute the operation illustrated in FIG. 7A once in a state in which abnormality based on aging is generated in the rotation member such as the actuators Ac1002 to Ac1015 or the decelerator is recorded as an output waveform. In this example, when abnormality based on aging is generated in the rotation member such as the actuators Ac1002 to Ac1015 of the arms 1103L and 1103R or the decelerator, an abnormal place cyclically appears in a rotation phase. For this reason, when the arms 1103L and 1103R are operated, a abnormal vibration or impact is easily generated. In general, when the cyclic abnormal vibration or impact is generated in the arms 1103L and 1103R, the impact force due to the abnormal vibration or impact is transmitted to the arms 1103L and 1103R, and the output value V of the sensor 1122 increases as compared with the case where the abnormal vibration or impact is not generated. Therefore, when abnormality based on aging is generated in the rotation member such as the actuators Ac1002 to Ac1015 or the decelerator, a section where the output value V of the sensor 1122 increases cyclically exists in the output waveform. In the output waveform that is illustrated in FIG. 7B, sections of four places where the output value V of the sensor 1122 increases exist.

Figure 8A:
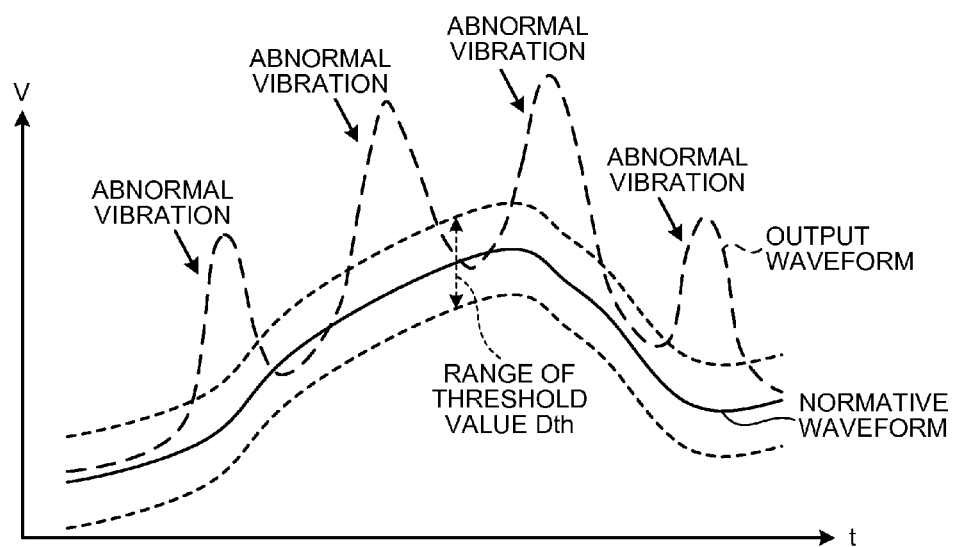
FIGS. 8A and 8B are diagrams illustrating an example of a method of detecting whether there is abnormality in the arms according to the first embodiment.
Figure 8B:
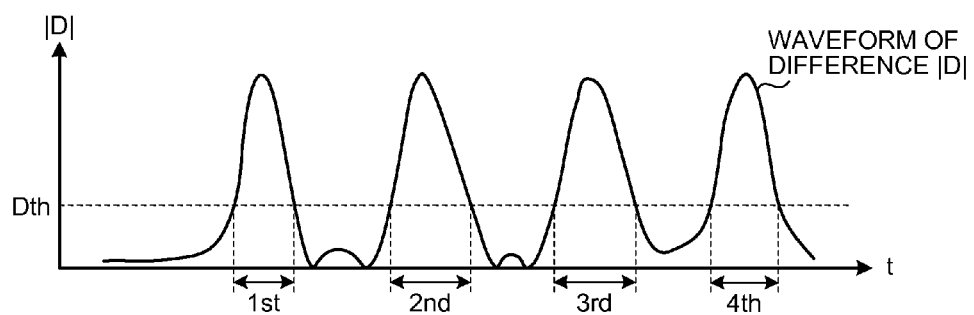

FIGS. 8A and 8B are diagrams illustrating an example of a method of detecting whether there is abnormality in the arms 1103L and 1103R according to the first embodiment. FIG. 8A illustrates the normative waveform corresponding to FIG. 6B and the output waveform corresponding to FIG. 7B, in which a horizontal axis indicates time t and a vertical axis indicates an output value V of the sensor 1122. FIG. 8B illustrates a waveform of a time-series change of the difference "D", in which a horizontal axis indicates time t and a vertical axis indicates the difference "D".

In FIGS. 8A and 8B, as described above, when there is abnormality in the arms 1103L and 1103R, a section where the output value V of the sensor 1122 increases cyclically exists in the output waveform. Therefore, by comparing the two waveforms of the normative waveform at the time of instructing recorded in the normative waveform recording unit 1163 and the output waveform at the time of activating recorded in the output waveform recording unit 1167 in a state where there is no abnormality in the arms 1103L and 1103R, the cyclic change of the output waveform with respect to the normative waveform can be detected. Therefore, it can be detected whether there is abnormality in the actuators Ac1002 to Ac1015 of the arms 1103L and 1103R. That is, by determining whether the number of times of excess N where the difference "D" of the normative waveform and the output waveform exceeding the threshold value Dth when the arms 1103L and 1103R execute the predetermined operation once exceeds the number of times of determination Nj according to the operation speed of the arms 1103L and 1103R, it can be determined whether there is abnormality in the actuators Ac1002 to Ac1015. Specifically, when the number of times of excess N is within the number of times of determination Nj, it can be determined that there is no abnormality in the actuators Ac1002 to Ac1015. When the number of times of excess N exceeds the number of times of determination Nj, it can be determined that there is abnormality in the actuators Ac1002 to Ac1015. In the examples that are illustrated in FIGS. 8A and 8B, the number of times of excess N is "4" as illustrated in FIG. 8B. Therefore, when the number of times of determination Nj is "3" or less, it is determined that there is abnormality in the actuators Ac1002 to Ac1015.

Figure 9:
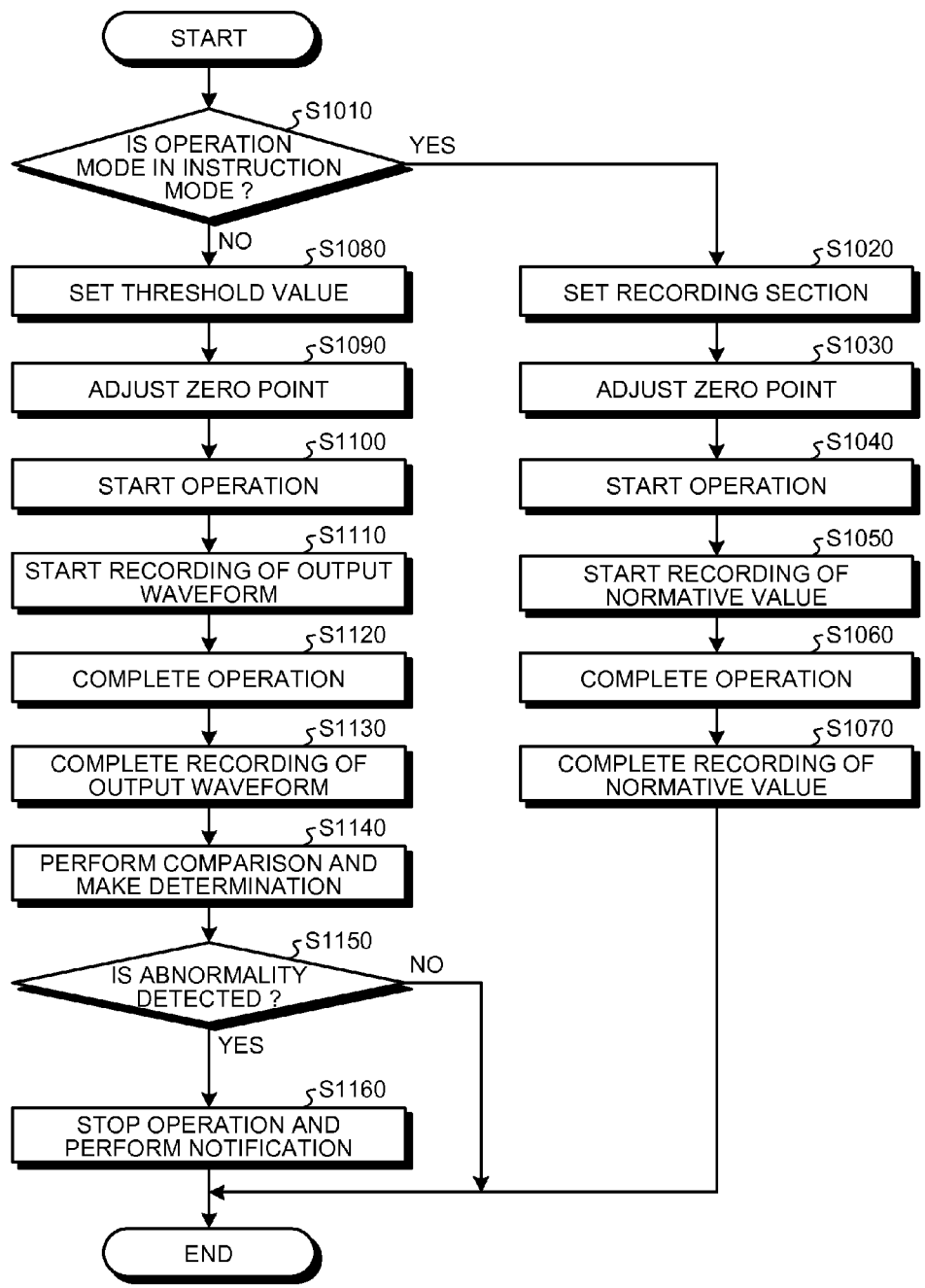
FIG. 9 is a flowchart illustrating a control sequence that is executed by the robot controller according to the first embodiment.

FIG. 9 is a flowchart illustrating a control sequence that is executed by the robot controller 1150 according to the first embodiment.

In FIG. 9, a process that is illustrated in a flow is started when a predetermined operation start manipulation is executed through the input device. First, in step S1010, the robot controller 1150 determines whether an operation mode of the robot 1100 is an "instruction mode" to perform instructing or an "activation mode" to perform activating, on the basis of input information input through the input device. When the operation mode of the robot 1100 is the "instruction mode", the determination result of step S1010 is satisfied and the process proceeds to step S1020.

In step S1020, the robot controller 1150 sets the recording section in the section setting unit 1162, on the basis of the input information input through the input device.

Then, in step S1030, the robot controller 1150 outputs the reset signal to each sensor 1122 and adjusts a zero point of each sensor 1122, in the zero point adjusting unit 1165.

Then, the process proceeds to step S1040 and the robot controller 1150 outputs a position instruction with respect to each of the actuators Ac1001 to Ac1015 calculated in the operation instructing unit 1151 on the basis of the instruction information (information indicating the operation start position and the operation completion position) with respect to each of the arms 1103L and 1103R instructed through the input device, to each of the actuators Ac1001 to Ac1015, and starts the predetermined operation (refer to FIG. 6A) according to the position instruction in the arms 1103L and 1103R, in a state in which there is no abnormality in the arms 1103L and 1103R and an object does not contact the arms 1103L and 1103R.

Then, in step S1050, the robot controller 1150 starts recording of the normative waveform for each sensor 1122, in the normative waveform recording unit 1163. Therefore, while the arms 1103L and 1103R executes the predetermined operation corresponding to the recording section set in step S1020 and started in step S1040 in a state in which there is no abnormality in the arms 1103L and 1103R and an object does not contact the arms 1103L and 1103R, the normative waveform recording unit 1163 records the time history of the output value V of each sensor 1122 based on the high frequency vibration component amplified by the amplifying unit 1123 and extracted by each high-pass filter 1161A as the normative waveform for each sensor 1122.

If the arms 1103L and 1103R are operated until the operation completion position, the process proceeds to step S1060 and the robot controller 1150 completes the operation in the arms 1103L and 1103R.

Then, in step S1070, the robot controller 1150 completes recording of the normative waveform for each sensor 1122, in the normative waveform recording unit 1163. The robot controller 1150 ends the process that is illustrated in the flow. The process that is illustrated in the flow is executed by the robot controller 1150, whenever the predetermined operation start manipulation is executed through the input device.

Meanwhile, in step S1010, when the operation mode of the robot 1100 is the "activation mode", the determination result of step S1010 is not satisfied and the process proceeds to step S1080.

In step S1080, the robot controller 1150 sets the threshold value Dth in the threshold value setting unit 1166, on the basis of the input information input through the input device.

Then, the process proceeds to step S1090 and the robot controller 1150 adjusts a zero point of each sensor 1122 in the zero point setting unit 1165, similar to step S1030.

Then, in step S1100, the robot controller 1150 outputs a position instruction with respect to each of the actuators Ac1001 to Ac1015 calculated in the operation instructing unit 1151 on the basis of the instruction information (information indicating the operation start position and the operation completion position) with respect to each of the arms 1103L and 1103R instructed through the input device, to each of the actuators Ac1001 to Ac1015, and starts the predetermined operation (refer to FIG. 7A) according to the position instruction in the arms 1103L and 1103R, when the product P to be the grip object does not exist within the movable range of the arms 1103L and 1103R.

Then, the process proceeds to step S1110 and the robot controller 1150 starts recording of the output waveform for each sensor 1122, in the output waveform recording unit 1167. Therefore, when the product P to be the grip object does not exist within the movable range of the arms 1103L and 1103R, while the predetermined operation started in step S1040 is executed by the arms 1103L and 1103R, the output waveform recording unit 1167 records the time history of the output value V of each sensor 1122 based on the high frequency vibration component amplified by the amplifying unit 1123 and extracted by each high-pass filter 1161A as the output waveform for each sensor 1122.

Then, if the arms 1103L and 1103R are operated until the operation completion position, the process proceeds to step S1120 and the robot controller 1150 completes the operations in the arms 1103L and 1103R.

Then, the process proceeds to step S1130 and the robot controller 1150 completes recording of the output waveform for each sensor 1122, in the output waveform recording unit 1167.

Then, in step S1140, the robot controller 1150 compares the normative waveform recorded in the normative waveform recording unit 1163 for each sensor 1122 and the output waveform recorded in the output waveform recording unit 1167 for each sensor 1122, for each sensor 1122 in the comparing/determining unit 1164, and calculates the difference "D" for each sensor 1122. The robot controller 1150 counts the number of times of excess N where the difference "D" calculated for each sensor 1122 exceeds the threshold value Dth set in step S1080 when the arms 1103L and 1103R execute the predetermined operation started in step S1100 and completed in step S1120 once, for each sensor 1122. By determining whether the number of times of excess N counted for each sensor 1122 exceeds the number of times of determination Nj set according to the operation speed of the arms 1103L and 1103R for each sensor 1122, it is determined whether there is abnormality in the actuators Ac1002 to Ac1015 of the arms 1103L and 1103R. Specifically, when the number of times of excess N for all of the sensors 1122 is within the number of times of determination Nj, it is determined that there is no abnormality in the actuators Ac1002 to Ac1015 of the arms 1103L and 1103R. When the number of times of excess N for one sensor 1122 among all of the sensors 1122 exceeds the number of times of determination Nj, it is determined that there is abnormality in the actuators Ac1002 to Ac1015.

Then, the process proceeds to step S1150 and the robot controller 1150 determines whether it is determined in step S1140 that there is abnormality in the actuators Ac1002 to Ac1015. When it is determined that there is no abnormality in the actuators Ac1002 to Ac1015, the determination result of step S1150 is not satisfied and the process that is illustrated in the flow ends. Meanwhile, when it is determined that there is abnormality in the actuators Ac1002 to Ac1015, the determination result of step S1150 is satisfied and the process proceeds to step S1160.

In step S1160, the robot controller 1150 intercepts the output of the position instruction from the operation instructing unit 1151 to the smoothing processing unit 1153 in the position instruction intercepting unit 1152, outputs the torque instruction Tref generated by the servo unit 1154 to each of the actuators Ac1001 to Ac1015, stops the operation instructed to the arms 1103L and 1103R, and notifies an external device of the abnormality of the arms 1103L and 1103R in a notifying unit (not illustrated in the drawings).

As described above, the robot 1100 according to this embodiment has the arms 1103L and 1103R, and in each of the sensor fixing jigs 1121 that are provided in the bases of the actuators Ac1002 and Ac1009 of the arms 1103L and 1103R closest to the side of the base end, the sensors 1122 (in the above example, three sensors) that have a piezoelectric body having a natural frequency higher than that of the structure material (metallic material such as iron or aluminum in the above example) forming each portion of the arms 1103L and 1103R are provided. By configuring the sensor 1122 as the sensor the piezoelectric body having a natural frequency higher than that of the structure material forming each portion of the arms 1103L and 1103R, the following effect can be obtained. That is, when abnormality based on aging is generated in the rotation member such as the actuators Ac1002 to Ac1015 of the arms 1103L and 1103R or the decelerator, the cyclic abnormal vibration or impact may be generated during the operation of the arms 1103L and 1103R. Therefore, by providing the sensors 1122 having the piezoelectric body having a natural frequency higher than that of the structure material forming each portion of the arms 1103L and 1103R, the high frequency abnormal vibration or the impact that is generated in the structure material of each portion of the arms 1103L and 1103R due to the abnormality can be detected, and it can be detected whether there is abnormality in the actuators Ac1002 to Ac1015 of the arms 1103L and 1103R. As a result, functionality of the robot 1100 can be improved.

Since the sensors 1122 are provided in the bases of the actuators Ac1002 and Ac1009 of the arms 1103L and 1103R closest to the side of the base end, the abnormal vibration based on the rotation member such as all of the actuators Ac1002 to Ac1015 at the side of the front end or the decelerator can be detected. That is, abnormality with respect to the entire arms 1103L and 1103R can be detected.

In this embodiment, the sensor fixing jig 1121 is provided on the inner side of the casing of the trunk portion 1102. Thereby, since each sensor 1122 can be provided in the casing, each sensor 1122 can be prevented from being destroyed due to the contact or collision of the object from the outside of the casing. Further, the sensor 1122 can be protected from a droplet or dust from the outside of the casing.

In this embodiment, particularly, the three sensors 1122 are provided in the sensor fixing jig 1121. The three sensors 1122 are radially disposed at an equal interval on the same circumference. By providing the three sensors 1122, the strain of the three directions that is generated in the sensor fixing jig 1121 can be detected and the abnormal vibration or the impact can be detected with high precision. By radially disposing the three sensors 1122 at an equal interval on the same circumference, detection sensitivity of the sensors 1122 can be approximately equalized in a circumferential direction without deviating the detection sensitivity in one direction. Therefore, the abnormal vibration or the impact that is transmitted to the sensor fixing jig 1121 from the plural directions through the structural material of each portion of the arms 1103L and 1103R can be detected with high precision.

In this embodiment, in particular, the sensor fixing jig 1121 is formed in an annular shape with the opening 1121A at the approximately central portion. By forming the sensor fixing jig 1121 positioned at the side of the base end of each of the arms 1103L and 1103R in the annular shape with the opening 1121A at the approximately central portion, the wiring line of the actuators Ac1002 to Ac1015 of the arms 1103L and 1103R can be inserted into the opening 1121A of the sensor fixing jig 1121 and can be drawn (around the side of the trunk portion 1102). Thereby, since the wiring line can be drawn without being exposed to the outside of the casing, the wiring line can be protected and an exterior appearance of the robot 1100 can be improved.

In this embodiment, particularly, each sensor 1122 is the sensor where the quartz is used as the piezoelectric body. Thereby, the high frequency abnormal vibration or the impact that is generated in the structural material of each portion of the arms 1103L and 1103R due to the abnormality based on aging of the rotation member such as the actuators Ac1002 and Ac1015 of the arms 1103L and 1103R or the decelerator can be securely detected, and it can be detected with high precision whether there is abnormality in the actuators Ac1002 and Ac1015 of the arms 1103L and 1103R.

The first embodiment has been described. However, the embodiment may be implemented by various different embodiments other than the first embodiment. Therefore, the various different embodiments are hereinafter described as modifications.

(1) Case where the Robot is Applied to Detection of a Contact of an Object

In the above embodiment, the robot disclosed in the present application is applied to the detection of the abnormality of the arms 1103L and 1103R. However, the embodiment is not limited thereto and the robot disclosed in the present application may be applied to detection of a contact of the object with respect to the arms 1103L and 1103R.

In this modification, a contact detecting unit (not illustrated in the drawings) of the robot controller 1150 detects whether the object contacts the arms 1103L and 1103R, on the basis of the output value V (output signal) of each sensor 1122 of the sensor units 1120L and 1120R. In this specification, the object is defined as a meaning including the product P gripped by the robot 1100, the robot 1100, a work apparatus such as the belt conveyor 1002, a part of a building such as a wall, and an organism such as a living body.

As described above, each sensor 1122 of the sensor units 1120L and 1120R detects the force that is applied to the arms 1103L and 1103R. As the force that is applied to the arms 1103L and 1103R, the internal force that is generated by the operation of the arms 1103L and 1103R and the external force that is applied to the arms 1103L and 1103R from the outside are considered. The external force is not applied to the arms 1103L and 1103R when the arms 1103L and 1103R are operated in a state in which the object illustrated in FIG. 6A does not contact the arms 1103L and 1103R. Therefore, each sensor 1122 detects only the vibration due to the internal force. Meanwhile, when the object contacts the arms 1103L and 1103R, the internal force and the external force are applied to the arms 1103L and 1103R. Therefore, each sensor 1122 detects the vibrations due to the internal force and the external force. For this reason, when the object contacts the arms 1103L and 1103R, the output value V of the sensor 1122 increases by the amount corresponding to the external force. Therefore, in this modification, the contact detecting unit compares the output value V of the sensor 1122 when the arms 1103L and 1103R execute the predetermined operation at the time of activating with the normative waveform previously recorded as the output value V of the sensor 1122 when the arms 1103L and 1103R execute the predetermined operation in a state in which the object does not contact the arms 1103L and 1103R, and determines whether the object contacts the arms 1103L and 1103R.

Figure 10:
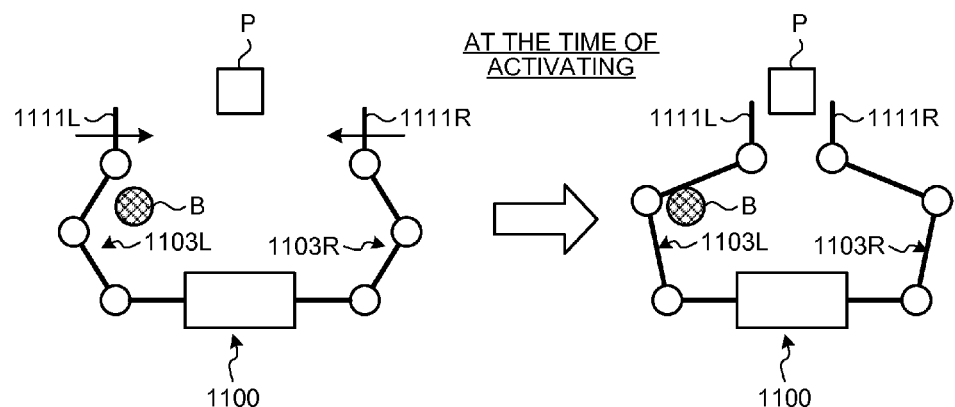
FIG. 10 is a schematic view illustrating a predetermined operation that is executed by the arms at the time of activating, in a modification that is applied to detection of a contact of an object.

FIG. 10 schematically illustrates an example of the predetermined operation that is executed by the arms 1103L and 1103R at the time of activating. In the example that is illustrated in FIG. 10, at the time of activating, under an environment in which an obstacle B exists around the robot 1100 (within the movable range of the arms 1103L and 1103R), the arms 1103L and 1103R execute the predetermined operation according to the position instruction from the robot controller 1150, that is, the operation from the instructed operation start position (position illustrated at the left side of FIG. 10) to the instructed operation completion position. At this time, the contact detecting unit determines whether the object contacts the arms 1103L and 1103R, using the above method. The arms 1103L and 1103R are operated from the operation start position to the inner side more than both sides of the product P on the belt conveyor 1002 (not illustrated in FIG. 10). When the contact detecting unit detects the contact of the object (obstacle B in this example) with respect to the arms 1103L and 1103R while the arms 1103L and 1103R execute the operation until the operation completion position, the robot controller 1150 stops the operation of the arms 1103L and 1103R at the corresponding position (position illustrated at the right side of FIG. 10).

In this example, the case where the control operation is performed such that the contact of the obstacle B with respect to the arms 1103L and 1103R is detected and the operation is stopped when the contact is detected is described. However, the embodiment is not limited thereto and the control operation may be performed such that the contact of the product P with respect to the arms 1103L and 1103R is detected, the operation is stopped when the contact is detected, and the product P is gripped by the hands 1111L and 1111R.

Even in this modification, the same effect as that of the above embodiment can be obtained. Since the external force applied to the arms 1103L and 1103R can be detected by the sensor 1122, it can be detected whether the object contacts the arms 1103L and 1103R. As described above, since the sensors 1122 are provided in the bases of the actuators Ac1002 and Ac1009 of the arms 1103L and 1103R closest to the side of the base end, a contact at the side of the front end can be detected. That is, a contact with respect to the entire arms 1103L and 1103R can be detected. Therefore, an excessive load can be avoided from being generated with respect to the robot 1100 or the object existing around the robot 1100.

(2) Case where the Robot is Applied to a Single-Arm Robot

In the above embodiment, the robot disclosed in the present application is applied to the robot 1100 to be the dual-arm robot that has the two arms 1103L and 1103R. However, the embodiment is not limited thereto and the robot disclosed in the present application may be applied to a single-arm robot that has one robot arm. Even in this case, the same effect as that of the above embodiment or the modification of (1) can be obtained.

In addition to the configuration described above, the configuration where the methods according to the embodiment and the modifications are appropriately combined may be used.

Although not specifically described, this embodiment can be variously changed in a range that does not depart from the sprit and scope of the embodiment.

Next, a second embodiment will be described.

In a field of robots, it is preferable to avoid an excessive load from being generated with respect to a robot or an object existing around the robot. For this reason, various technologies for detecting generation or non-generation of a contact (external force) with respect to the robot are studied.

For example, a technology for attaching a force detector to detect the external force to a base end of a robot arm and stopping an operation of the robot arm on the basis of the detection result of the force detector or operating the robot arm in a reduction direction of the external force when the excessive external force is applied is disclosed in Japanese Patent Application Laid-Open (JP-A) No. 2006-21287.

A sensory inspection to evaluate a quality by human five senses and bodily sensation is used in various fields. In a manufacturing/assembling process of various mechanical products or electronic apparatuses, when it is inspected whether the mechanical products or the electronic apparatuses are in a normal state or an abnormal state (it is inspected whether there is abnormality), a sensory inspection based on a tactile sense is generally used.

However, since a human sensory organ is used as a measuring instrument in the sensory inspection, the inspection result is affected by a skill or a physical condition of an inspector. Therefore, it is preferable to develop a robot that can inspect inspected object such as the mechanical product or the electronic apparatus with high precision without depending on the sensor inspection.

When the inspected object is inspected by the robot, it is needed to detect the change of the minute force or the vibration that is generated in the front end of the robot arm. However, in the configuration according to the related art in which the force detector is provided in the robot, an inspection with high precision is not possible.

According to one aspect of an embodiment, a robot that can detect with high precision whether the robot and the inspected object are in a normal state or an abnormal state is provided.

According to the robot in this embodiment, it can be detected with high precision whether the robot and the inspected object are in a normal state or an abnormal state.

Hereinafter, this embodiment will be described with reference to the drawings. This embodiment is an example of the case where the robot disclosed in the present application is applied to detection of abnormality of the inspected object to be the mechanical product.

Figure 11:
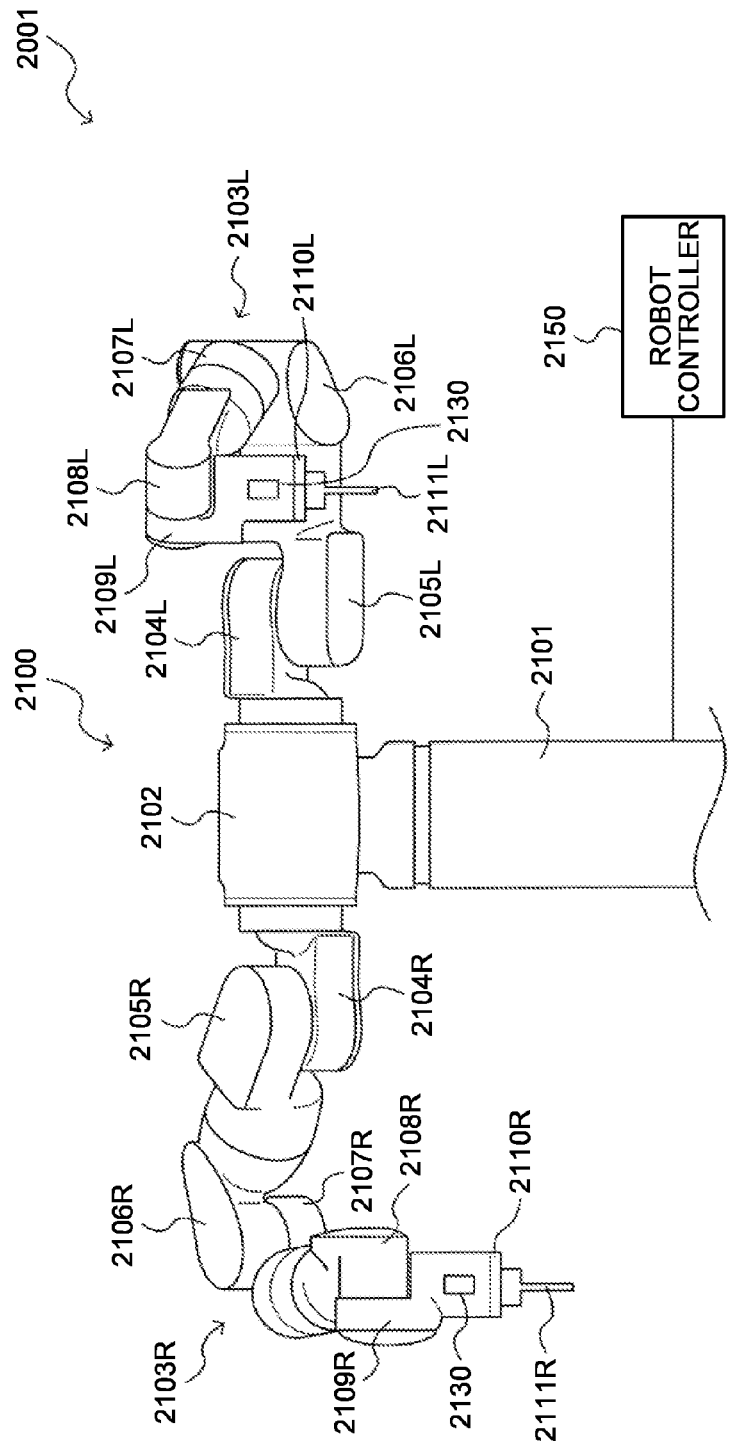
FIG. 11 is a conceptual diagram illustrating the entire configuration of a robot system that includes a robot according to a second embodiment.
Figure 12:
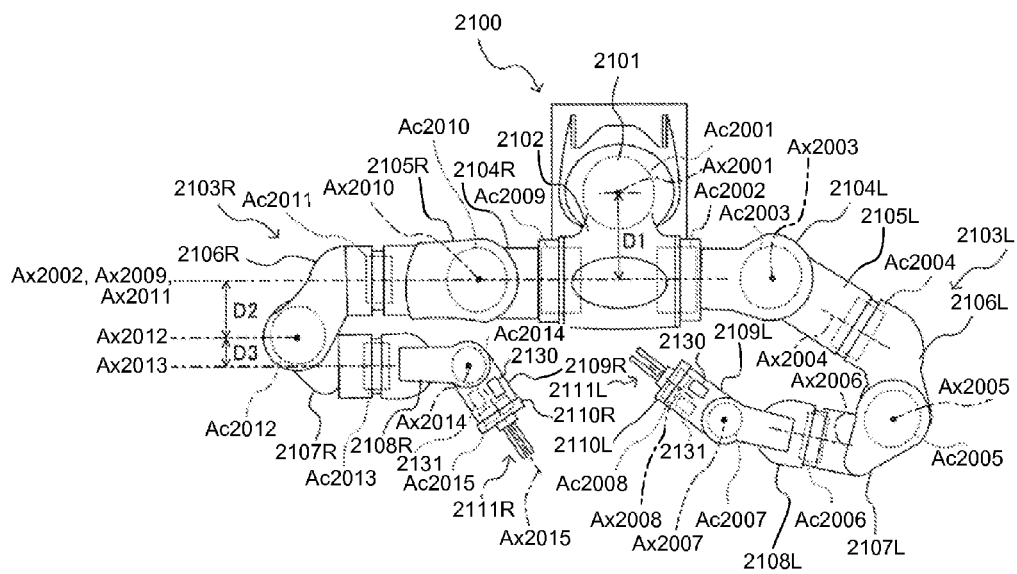
FIG. 12 is a top view illustrating the configuration of the robot according to the second embodiment.

FIG. 11 is a conceptual diagram illustrating the entire configuration of a robot system that includes the robot according to the second embodiment. FIG. 12 is a top view illustrating the configuration of the robot according to the second embodiment.

In FIGS. 11 and 12, a robot system 2001 according to this embodiment is a system that detects whether the inspected object to be the mechanical product is normal (described below) or abnormal (described below). The robot system 2001 includes a robot 2100 and a robot controller 2150 that controls the robot 2100. The robot 2100 is a dual-arm robot and has a base 2101, a trunk portion 2102, two arms 2103L and 2103R (robot arms), and a sensor 2130 (first strain sensor), and an A/D converter 2131.

The base 2101 is fixed to a mounting surface (floor) by an anchor bolt (not illustrated in the drawings). The trunk portion 2102 has a joint portion in which an actuator Ac2001 driven to rotate around a rotation axis Ax2001 is provided. The trunk portion 2102 is disposed to rotate with respect to the base 2101 through the first joint portion and rotates in a direction approximately horizontal to the mounting surface by driving of the actuator Ac2001 provided in the first joint portion. The trunk portion 2102 supports the arms 2103L and 2103R that are configured as separate objects, at one side (right side in FIGS. 11 and 12) and the other side (left side in FIGS. 11 and 12), respectively.

The arm 2103L is a manipulator that is provided on one side of the trunk portion 2102. The arm 2103L has a shoulder portion 2104L, an upper arm A portion 2105L, an upper arm B portion 2106L, a lower arm portion 2107L, a wrist A portion 2108L, a wrist B portion 2109L, a flange 2110L, a hand 2111L, and second to eighth joint portions in which actuators Ac2002 to Ac2008 configured to rotate the individual portions are provided, respectively.

The shoulder portion 2104L is connected to the trunk portion 2102 to rotate through the second joint portion and rotates around a rotation axis Ax2002 approximately horizontal to the mounting surface by driving of the actuator Ac2002 provided in the second joint portion. The upper arm A portion 2105L is connected to the shoulder portion 2104L to rotate through the third joint portion and rotates around a rotation axis Ax2003 orthogonal to the rotation axis Ax2002 by driving of the actuator Ac2003 provided in the third joint portion. The upper arm B portion 2106L is connected to a front end of the upper arm A portion 2105L shoulder portion 2104L to rotate through the fourth joint portion and rotates around a rotation axis Ax2004 orthogonal to the rotation axis Ax2003 by driving of the actuator Ac2004 provided in the fourth joint portion. The lower arm portion 2107L is connected to the upper arm B portion 2106L to rotate through the fifth joint portion and rotates around a rotation axis Ax2005 orthogonal to the rotation axis Ax2004 by driving of the actuator Ac2005 provided in the fifth joint portion. The wrist A portion 2108L is connected to a front end of the lower arm portion 2107L to rotate through the sixth joint portion and rotates around a rotation axis Ax2006 orthogonal to the rotation axis Ax2005 by driving of the actuator Ac2006 provided in the sixth joint portion. The wrist B portion 2109L is connected to the wrist A portion 2108L to rotate through the seventh joint portion and rotates around a rotation axis Ax2007 orthogonal to the rotation axis Ax2006 by driving of the actuator Ac2007 provided in the seventh joint portion. The flange 2110L is connected to a front end of the wrist B portion 2109L to rotate through the eighth joint portion and rotates around a rotation axis Ax2008 orthogonal to the rotation axis Ax2007 by driving of the actuator Ac2008 provided in the eighth joint portion. The hand 2111L is attached to a front end of the flange 2110L and rotates according to the rotation of the flange 2110L.

The arm 2103R is a manipulator that is provided on the other side of the trunk portion 2102. Similar to the arm 2103L, the arm 2103R has a shoulder portion 2104R, an upper arm A portion 2105R, an upper arm B portion 2106R, a lower arm portion 2107R, a wrist A portion 2108R, a wrist B portion 2109R, a flange 2110R, a hand 2107R, and ninth to fifteenth joint portions in which actuators Ac2009 to Ac2015 to drive rotation of the individual portions are provided, respectively.

The shoulder portion 2104R is connected to the trunk portion 2102 to rotate through the ninth joint portion and rotates around a rotation axis Ax2009 approximately horizontal to the mounting surface by driving of the actuator Ac2009 provided in the ninth joint portion. The upper arm A portion 2105R is connected to the shoulder portion 2104R to rotate through the tenth joint portion and rotates around a rotation axis Ax2010 orthogonal to the rotation axis Ax2009 by driving of the actuator Ac2010 provided in the tenth joint portion. The upper arm B portion 2106R is connected to a front end of the upper arm A portion 2105R shoulder portion 2104L to rotate through the eleventh joint portion and rotates around a rotation axis Ax2011 orthogonal to the rotation axis Ax2010 by driving of the actuator Ac2011 provided in the eleventh joint portion. The lower arm portion 2107R is connected to the upper arm B portion 2106R to rotate through the twelfth joint portion and rotates around a rotation axis Ax2012 orthogonal to the rotation axis Ax2011 by driving of the actuator Ac2012 provided in the twelfth joint portion. The wrist A portion 2108R is connected to a front end of the lower arm portion 2107R to rotate through the thirteenth joint portion and rotates around a rotation axis Ax2013 orthogonal to the rotation axis Ax2012 by driving of the actuator Ac2013 provided in the thirteenth joint portion. The wrist B portion 2109R is connected to the wrist A portion 2108R to rotate through the fourteenth joint portion and rotates around a rotation axis Ax2014 orthogonal to the rotation axis Ax2013 by driving of the actuator Ac2014 provided in the fourteenth joint portion. The flange 2110R is connected to a front end of the wrist B portion 2109R to rotate through the fifteenth joint portion and rotates around a rotation axis Ax2015 orthogonal to the rotation axis Ax2014 by driving of the actuator Ac2015 provided in the fifteenth joint portion. The hand 2111R is attached to a front end of the flange 2110R and rotates according to the rotation of the flange 2110R.

In this example, each of the arms 2103L and 2103R has seven joint portions, that is, degrees of freedom of 7 (redundant degree of freedom). However, the degrees of freedom of each of the arms 2103L and 2103R are not limited to "7".

As structural materials that form the shoulder portions 2104L and 2104R, the upper arm A portion 2105L and 2105R, the upper arm B portions 2106L and 2106R, the lower arm portions 2107L and 2107R, the wrist A portions 2108L and 2108R, the wrist B portions 2109L and 2109R, the flanges 2110L and 2110R, and the hands 2111L and 2111R of the arms 2103L and 2103R, metallic materials such as iron or aluminum are used. The arms 2103L and 2103R are configured to be thin and light like the front end side (side of the hands 2111L and 2111R), in order to suppress an increase in the operation torque of the actuators positioned at the side of the base end (side of the shoulder portions 2104L and 2104R) and secure a smoothing operation. For this reason, in the vicinity of the front end of each of the arms 2103L and 2103R, an extra space in the casing decreases.

As illustrated in FIG. 12, the trunk portion 2102 is formed to protrude forward in a horizontal direction from the first joint portion to the second and ninth joint portions, with respect to the base 2101, such that the rotation axis Ax2001 of the first joint portion and the rotation axiss Ax2002 and Ax2009 of the second and ninth joint portions are offset by the length D1 in a direction approximately horizontal to the mounting surface. Thereby, a space of the lower side of the shoulder portions 2104L and 2104R can be used as a work space, and a reachable range of the arms 2103L and 2103R can be enlarged by rotating the rotation axis Ax2001.

A shape of the upper arm B portion 2106R is set such that the positions of the rotation axis Ax2001 of the eleventh joint portion and the rotation axis Ax2012 of the twelfth joint portion in plan view are offset by the length D2. A shape of the lower arm portion 2107R is set such that the positions of the rotation axis Ax2012 of the twelfth joint portion and the rotation axis Ax2013 of the thirteenth joint portion in plan view are offset by the length D3. When the rotation axis Ax2011 and the rotation axis Ax2013 takes an approximately horizontal posture, the offset length of the rotation axis Ax2011 and the rotation axis Ax2013 becomes (D2+D3). Thereby, when the twelfth joint portion corresponding to a human "elbow" is bent, clearance of the upper arm A portion 2105R and the upper arm B portion 2106R corresponding to a human "upper arm" and the lower arm portion 2107R corresponding to a human "lower arm" can be greatly secured. Even when the hand 2111R comes close to the trunk portion 2102, a freedom degree of the arm 2103R at the time of an operation increases.

Although not clearly illustrated in FIG. 12, similar to the arm 2103R, in the arm 2103L, a shape of the upper arm B portion 2106L is set such that the positions of the rotation axis Ax2004 of the fourth joint portion and the rotation axis Ax2005 of the fifth joint portion in upper view are offset by the length D2. A shape of the lower arm portion 2107L is set such that the positions of the rotation axis Ax2005 of the fifth joint portion and the rotation axis Ax2006 of the sixth joint portion in upper view are offset by the length D3. When the rotation axis Ax2004 and the rotation axis Ax2006 takes an approximately horizontal posture, the offset length of the rotation axis Ax2004 and the rotation axis Ax2006 becomes (D2+D3).

One sensor 2130 is provided in the vicinity of the front end of the casing of each of the arms 2103L and 2103R, in this example, on an external surface of the casing of each of the wrist B portions 2109L and 2109R. In this embodiment, as each sensor 2130, a force sensor that has a piezoelectric body made of a material having a natural frequency (or rigidity) higher than that of the metallic material to be the structural material forming each portion of the arms 2103L and 2103R, in this example, a sensor where the quartz is used as the piezoelectric body is used. This is because that the change force including a higher frequency component can be detected as the force sensor has a higher natural frequency and the quartz has a natural frequency (or rigidity) higher than that of the metallic material to be the structural material forming each portion of the arms 2103L and 2103R. Therefore, a minute high frequency vibration (fast deformation and dynamic strain) that is transmitted to the front ends (hands 2111L and 2111R) of the arms 2103L and 2103R can be detected. The sensor 2130 that is provided on the external surface of the casing of the wrist B portion 2109L detects the force (in detail, amount of strain caused by a vibration due to the impact force applied to the front end side more than the wrist B portion 2109L, not the magnitude of the force) applied to the front end side (hand 2111L) more than the wrist B portion 2109L of the arm 2103L as a voltage. The sensor 2130 that is provided on the external surface of the casing of the wrist B portion 2109R detects the force (in detail, amount of strain caused by a vibration due to the impact force applied to the front end side more than the wrist B portion 2109L, not the magnitude of the force) applied to the front end side (hand 2111R) more than the wrist B portion 2109R of the arm 2103R as a voltage. The voltage that is obtained by each sensor 2130 is input to the high-pass filter unit 2161 (refer to FIG. 15 to be described below) of the robot controller 2150 through an amplifying unit 2132 (refer to FIG. 15 to be described below) and the A/D converter 2131.

In this example, one sensor 2130 is provided on the external surface of the casing of each of the wrist B portions 2109L and 2109R. However, the embodiment is not limited thereto and the sensor 2130 may be provided at the different position (for example, on the external surface of the casing of each of the hands 2111L and 2111R or in the casing of each of the wrist B portions 2109L and 2109R) in the vicinity of the front end of the casing of each of the arms 2103L and 2103R. In this example, the sensor 2130 is provided for each of the arms 2103R and 2103L. However, the embodiment is not limited thereto and two or more sensors may be provided for each of the arms 2130R and 2130L and one or more sensors may be provided for either the arm 2130R or the arm 2130L. In this example, as each sensor 2130, the sensor where the quartz is used as the piezoelectric body is used. However, the embodiment is not limited thereto and a force sensor that has a piezoelectric body made of a material having a natural frequency higher than that of the metallic material to be the structural material forming each portion of the arms 2103L and 2103R may be used as each sensor 2130.

As illustrated in FIG. 12, one A/D converter 2131 is provided in the vicinity of each sensor 2130, in this example, in the casing of each of the wrist B portions 2109L and 2109R. The A/D converter 2131 that is provided in the casing of the wrist B portion 2109L is connected to the sensor 2130 provided on the external surface of the casing of the wrist B portion 2109L through a cable (not illustrated in the drawings) and is connected to the side of the trunk portion 2102 through a cable for a digital signal (not illustrated in the drawings) that is provided in the casing of the arm 2130L and has superior flexibility. The A/D converter 2131 converts an output signal (analog signal) of the sensor 2130 input through the cable into a digital signal and is transmitted to the side of the trunk portion 2102 through the cable for the digital signal. The A/D converter 2131 that is provided in the casing of the wrist B portion 2109R is connected to the sensor 2130 provided on the external surface of the casing of the wrist B portion 2109R through a cable (not illustrated in the drawings) and is connected to the side of the trunk portion 2102 through a cable for a digital signal (not illustrated in the drawings) that is provided in the casing of the arm 2103R and has superior flexibility. The A/D converter 2131 converts an output signal (analog signal) of the sensor 2130 input through the cable into a digital signal and is transmitted to the side of the trunk portion 2102 through the cable for the digital signal. The output signal of each sensor 2130 that is transmitted to the side of the trunk portion 2102 is input to the robot controller 2150 through the cable.

In the robot 2100 that has the above-described configuration, operations of individual driving portions that include the actuators Ac2001 to Ac2015 are controlled by the robot controller 2150. Each of the actuators Ac2001 to Ac2005 is composed of a decelerator-integrated servo motor that has a hollow portion where a cable (not illustrated in the drawings) can be inserted, and the rotation positions of the actuators Ac2001 to Ac2005 are converted into signals from encoders (not illustrated in the drawings) incorporated in the actuators Ac2001 to Ac2015 and the signals are input to the robot controller 2150 through the cable.

In this case, in a manufacturing/assembling process of a mechanical product or an electronic apparatus, a sensory inspection to evaluate a quality by human five senses (in particular, tactile sense) and bodily sensation is used when it is inspected whether the mechanical products or the electronic apparatuses are in a normal state or an abnormal state (for example, it is inspected whether there is abnormality). In particular, in a mechanical product that includes components where plural members such as gears or couplings are engaged and the torque is transmitted, the sensory inspection is used when rattling (backlash) is detected.

Figure 13:
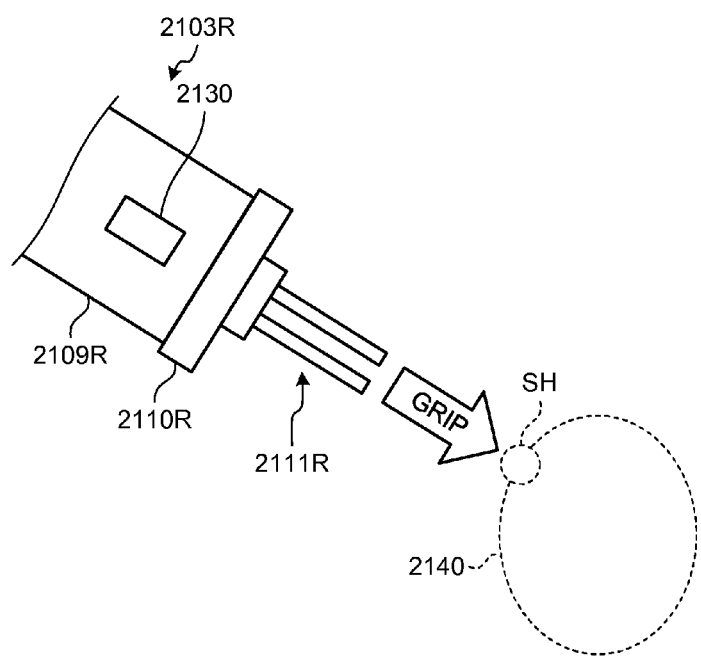
FIG. 13 is a diagram illustrating an inspected object according to the second embodiment.

FIG. 13 is a diagram illustrating an inspected object according to the second embodiment.

In FIG. 13, an inspected object 2140 according to this embodiment is a mechanical product that includes components engaged with each other.

In this case, in the inspected object 2140, when the inspected object 2140 is abnormal like when processing precision of the components is low or when assembling precision of the components is low, the minute change, deformation, and vibration may be generated in the inspected object 2140. For this reason, in a manufacturing/assembling process of the inspected object 2140, it is determined whether the inspected object 2140 is in a normal state or an abnormal state. However, when it is determined by the sensory inspection whether the inspected object 2140 is in a normal state or an abnormal state, because a human sensory organ is used as a measuring instrument in the sensory inspection, the inspection result is affected by a skill or a physical condition of an inspector. Therefore, it is preferable to develop a robot that can inspect with high precision whether the inspected object 2140 is in a normal state or an abnormal state without depending on the sensor inspection.

The robot 2100 according to this embodiment is a robot that is made in view of the above requirement, and can inspect whether the inspected object 2140 is in a normal state or an abnormal state without depending on the sensor inspection. In this specification, a state in which the inspected object 2140 is normal is defined as a normal state and a state in which the inspected object 2140 is abnormal is defined as an abnormal state. That is, the robot 2100 according to this embodiment can inspect whether the inspected object 2140 is in a normal state or an abnormal state without depending on the sensor inspection. Hereinafter, an example of a predetermined operation that is related to an inspection of abnormality of the inspected object 2140 executed by the arms 2103L and 2103R of the robot 2100 in a state in which manufacturing precision of the inspected object 2140 is set as an inspection object will be described. In this case, only one of the arms 2103L and 2103R (in this example, arm 2103R) executes the predetermined operation. That is, the arm 2103R executes an operation for rotating the flange 2110R in a state in which a movable portion SH of the inspected object 2140 is gripped by the hands 2111R, as the predetermined operation. Thereby, the hands 2111R are rotated by the rotation of the flange 2110R and the movable portion SH is rotated by the predetermined rotational number (for example, 4) in a state where the movable portion is engaged with the engaged component. In this way, the robot controller 2150 detects whether there is abnormality in the inspected object 2140, on the basis of an output signal of the sensor 2130 while the arm 2103R executes the predetermined operation with respect to the inspected object 2140 (which is described in detail below).

In this example, the case where the arm 2103R is operated is described. However, the embodiment is not limited thereto and the arm 2103L may be operated or both the arms 2103L and 2103R may be operated in cooperation with each other.

Figure 14:
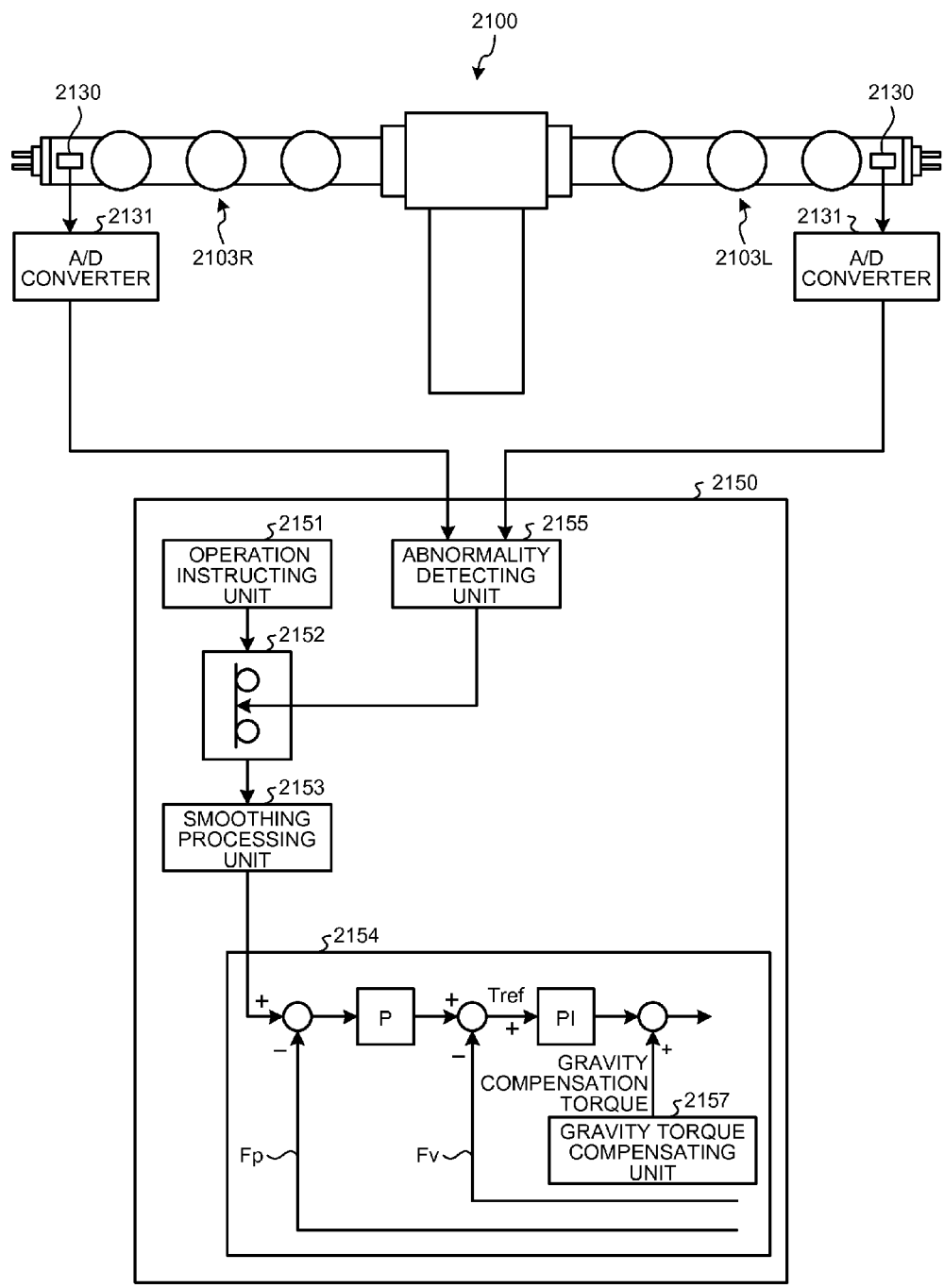
FIG. 14 is a block diagram illustrating the functional configuration of a robot controller according to the second embodiment.

FIG. 14 is a block diagram illustrating the functional configuration of the robot controller 2150 according to the second embodiment. In FIG. 14, for the purpose of easy understanding in the drawing, the A/D converter 2131 that is provided in the casing of each of the arms 2103L and 2103R is illustrated outside the casing.

In FIG. 14, the robot controller 2150 is composed of a computer that includes an operator, a storage device, and an input device (not illustrated in the drawings) and is connected to the individual driving portions or the individual A/D converts 2131 of the robot 2100 through the cable to communicate with each other. The robot controller 2150 has an operation instructing unit 2151, a position instruction intercepting unit 2152, a smoothing processing unit 2153, a servo unit 2154, an abnormality detecting unit 2155, and a gravity torque compensating unit 1157.

The operation instructing unit 2151 calculates a position instruction (operation instruction) with respect to each of the actuators Ac2001 to Ac2015, on the basis of instruction information with respect to each of the arms 2103L and 2103R instructed through the input device, and pools the position instruction to the smoothing processing unit 2153 through the position instruction intercepting unit 2152.

The smoothing processing unit 2153 sequentially outputs the pooled position instruction to the servo unit 2154, for every predetermined operation cycle.

The servo unit 2154 has a joint angle feedback circuit Fp based on a detection value of the encoder of each of the actuators Ac2001 to Ac2015 and a joint angle feedback circuit Fv based on an angular speed detection value obtained from the detection value of the encoder of each of the actuators Ac2001 to Ac2015, for each of the actuators Ac1001 to Ac1015. The servo unit 2154 generates and outputs a torque instruction Tref with each of the actuators Ac2001 to Ac2015 for every predetermined operation cycle, on the basis of the position instructions sequentially input by the smoothing processing unit 2153.

The abnormality detecting unit 2155 detects whether there is abnormality in the inspected object 2140, on the basis of an output value V of the sensor 2130 converted into the digital signal by the A/D converter 2131. The abnormality detecting unit 2155 will be described in detail below.

When the abnormality of the inspection object 2140 is detected by the abnormality detecting unit 2155, the position instruction intercepting unit 2152 intercepts an output of the position instruction from the operation instructing unit 2151 to the smoothing processing unit 2153 and intercepts the position instruction that is transmitted to the servo unit 2154. If the position instruction transmitted to the servo unit 2154 is intercepted, a value of the torque instruction Tref that is output by the feedback decreases and the arms 2103L and 2103R are quickly stopped.

The gravity torque compensating unit 2157 adds gravity compensation torque corresponding to the self weight to the torque instruction Tref with respect to each of the actuators Ac2001 to Ac2015 generated by the servo unit 2154.

Figure 15:
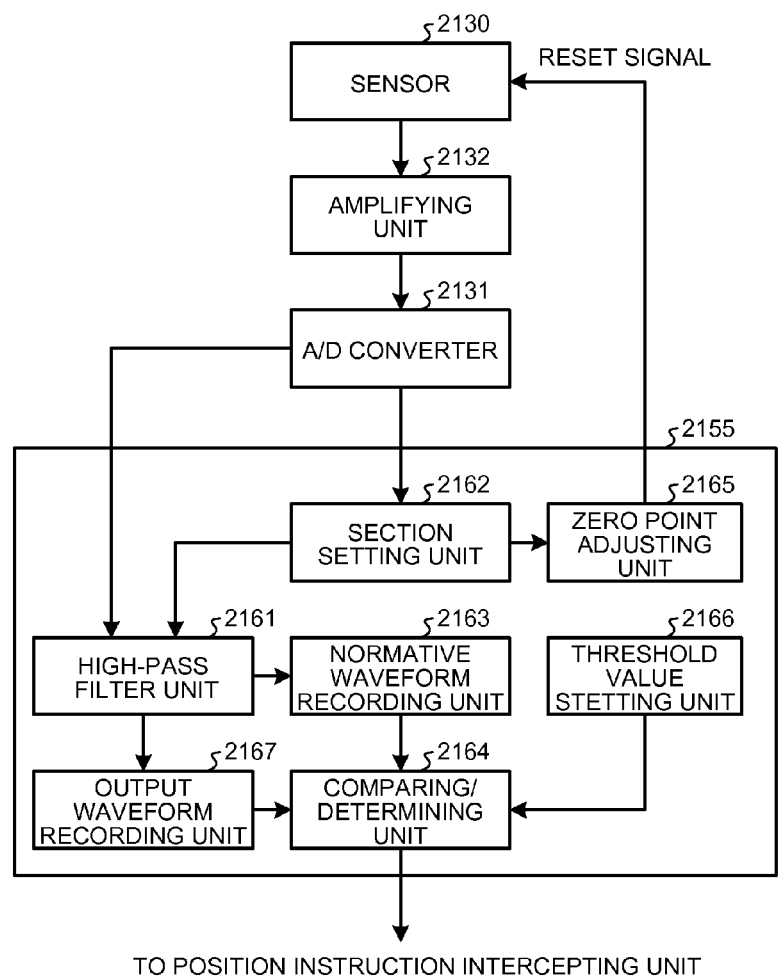
FIG. 15 is a block diagram illustrating the functional configuration of an abnormality detecting unit according to the second embodiment.

FIG. 15 is a block diagram illustrating the functional configuration of the abnormality detecting unit 2155 according to the second embodiment.

In FIG. 15, the abnormality detecting unit 2155 has a high-pass filter unit 2161, a section setting unit 2162, a normative waveform recording unit 2163, an output waveform recording unit 2167, a comparing/determining unit 2164, a zero point adjusting unit 2165, and a threshold value setting unit 2166.

The high-pass filter unit 2161 has a high-pass filter (or it may be a band-pass filter that uses a high frequency band as a pass-band), and extracts a high frequency vibration component of an output signal of the sensor 2130 that is amplified by the amplifying unit 2132 and is converted into the digital signal by the A/D converter 2131, to remove a frequency component (for example, frequency component due to disturbance) other than a frequency due to the abnormality of the inspected object 2140, which is included in the output signal of the sensor 2130. In the high-pass filter of the high-pass filter unit 2161, a cutoff frequency is determined such that the frequency component (for example, frequency component due to disturbance) other than the frequency due to the abnormality of the inspected object 2140 can be removed.

The section setting unit 2162 sets a section in which the normative waveform recording unit 2163 records a time history of the output value V of the sensor 2130 as the normative waveform, on the basis of input information input by the input device (hereinafter, simply referred to as "recording section").

The normative waveform recording unit 2163 records the time history of the output value V of the sensor 2130 based on the high frequency vibration component extracted by the high-pass filter unit 2161 while the arms 2103L and 2103R execute a predetermined operation corresponding to the recording section set by the section setting unit 2162 with respect to the inspected object 2140 where there is no abnormality as a normative waveform (refer to FIG. 16 to be described below). The predetermined operation is an operation according to the position instruction that is calculated by the operation instructing unit 2151 on the basis of the instruction information instructed through the input device.

The output waveform recording unit 2167 records the time history of the output value V of the sensor 2130 based on the high frequency vibration component extracted by the high-pass filter unit 2161 while the arms 2103L and 2103R perform the predetermined operation with respect to the inspected object 2140 at the time of inspecting as an output waveform (refer to FIG. 17 to be described below.

The threshold value setting unit 2166 sets a threshold value Dth that becomes a determination value of generation or non-generation of the abnormality in the comparing/determining unit 2164, on the basis of the input information input through the input device.

The comparing/determining unit 2164 compares the normative waveform recorded in the normative waveform recording unit 2163 and the output waveform recorded in the output waveform recording unit 2167, and calculates the difference (in detail, absolute value of the difference) "D" of the normative waveform and the output waveform. The number of times (hereinafter, referred to as number of times of excess N) of the calculated difference "D" exceeding a threshold value Dth previously set by the threshold value setting unit 2166 for a constant time (in this example, time needed when the arms 2103L and 2103R executes the predetermined operation once with respect to the inspected object 2140) is calculated. The constant time is not limited to the time needed when the arms 2103L and 2103R executes the predetermined operation once with respect to the inspected object 2140. For example, the constant time may be time that is set through the input device. By determining whether the number of times of excess N counted for each sensor 1122 exceeds the predetermined number of times of determination Nj, the comparing/determining unit 2164 determines whether there is abnormality in the inspected object 2140. Specifically, when the number of times of excess N is within the predetermined number of times of determination Nj, the comparing/determining unit 2164 determines that there is no abnormality in the inspected object 2140. When the number of times of excess N exceeds the predetermined number of times of determination Nj, the comparing/determining unit 2164 determines that there is abnormality in the inspected object 2140.

The zero point adjusting unit 2165 outputs a reset signal to each sensor 2130 and adjusts a zero point of each sensor 2130, whenever the arms 2103L and 2103R execute the predetermined operation corresponding to the recording section set by the section setting unit 2162 with respect to the inspected object 2140, to suppress the change in the ambient temperature due to heat generation of the actuators Ac2002 to Ac2015 of the arms 2103L and 2103R or an influence of the temperature drift of each sensor 2130 generated by self heat generation.

Figure 16:
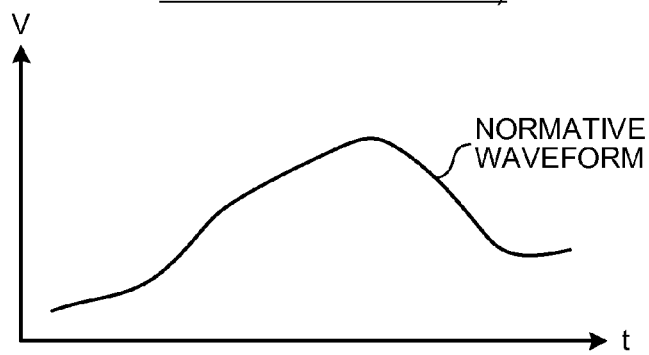
FIG. 16 is a diagram illustrating an output value V of a sensor when arms according to the second embodiment execute a predetermined operation with respect to an inspected object in which there is no abnormality.

FIG. 16 is a diagram illustrating an output value V of the sensor 2130 when the arms 2103L and 2103R according to the second embodiment execute a predetermined operation with respect to the inspected object 2140 where there is no abnormality. FIG. 16 illustrates an example of the normative waveform that is recorded in the normative waveform recording unit 2163 to correspond to the predetermined operation executed by the arms 2103L and 2103R with respect to the inspected object 2140 where there is no abnormality, in which in which a horizontal axis indicates time t and a vertical axis indicates an output value V of the sensor 2130.

In FIG. 16, at the time of instructing, the arms 2103L and 2103R executes the predetermined operation according to the position instruction from the robot controller 2150, with respect to the inspected object 2140 where there is no abnormality, and rotates the movable SH by the predetermined rotational number. In the normative waveform recording unit 2163, the time history of the output value V of the sensor 1122 while the arms 2103L and 2103R execute the operation corresponding to the recording section once with respect to the inspected object 2140 is recorded as the normative waveform. The normative waveform can always be recorded, when there is no abnormality in the inspected object 2140. In this embodiment, an example of the case where the normative waveform is recorded at the time of instructing the predetermined operation with respect to the robot 2100 will be described.

Figure 17:
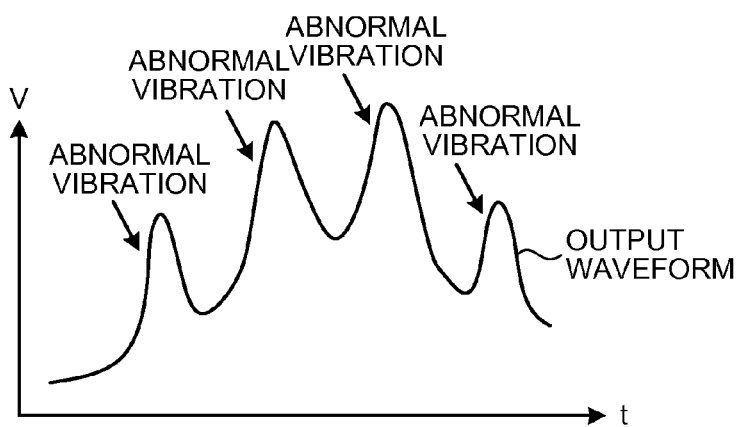
FIG. 17 is a diagram illustrating an output value V of a sensor when the arm according to the second embodiment executes a predetermined operation with respect to the inspected object, at the time of activating.

FIG. 17 is a diagram illustrating an output value V of the sensor 2130 when the arms 2103L and 2103R according to the second embodiment execute a predetermined operation with respect to the inspected object 2140 at the time of inspecting. FIG. 17 illustrates an example of the output waveform that is recorded in the output waveform recording unit 2167 to correspond to the predetermined operation executed by the arms 2103L and 2103R with respect to the inspected object 2140 where there is no abnormality at the time of inspecting, in which in which a horizontal axis indicates time t and a vertical axis indicates an output value V of the sensor 2130.

In FIG. 17, at the time of instructing, the arms 2103L and 2103R executes the predetermined operation according to the position instruction from the robot controller 2150, with respect to the inspected object 2140 (in this example, inspected object 2140 where there is no abnormality), and rotates the movable SH by the predetermined rotational number. In the output waveform recording unit 2167, the time history of the output value V of the sensor 2130 while the arms 2103L and 2103R execute the predetermined operation once with respect to the inspected object 2140 (in this example, inspected object 2140 where there is no abnormality) is recorded as the output waveform. As in this example, when there is abnormality in the inspected object 2140 (for example, when processing precision of the components is low or when assembling precision of the components is high), during the operation of the arms 2103L and 2103R, a cyclic abnormal vibration or impact is generated in the inspected object 2140 due to rattling during a rotation operation. In general, when an abnormal vibration or impact such as rattling is generated in the inspected object 2140, because the force due to the abnormal vibration or impact is applied to the arms 2103L and 2103R (the arms 2103L and 2103R are twisted, the output value V of the sensor 2130 is likely to increase, as compared with when the abnormal vibration or impact is not generated. Therefore, when there is abnormality in the inspected object 2140, a section where the output value V of the sensor 2130 increases cyclically exists in the output waveform. In the output waveform that is illustrated in FIG. 17, sections of the four places where the output value V of the sensor 2130 exist.

Figure 18A:
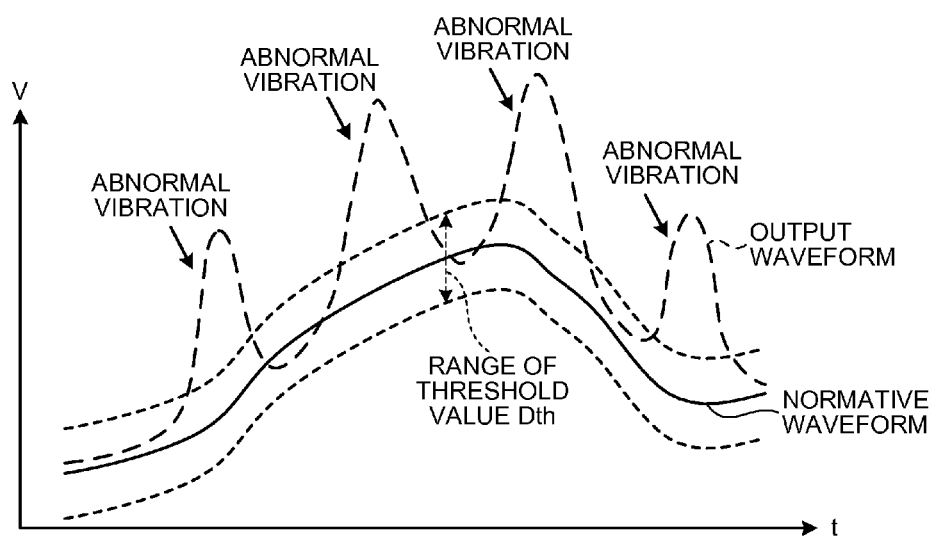
FIGS. 18A and 18B are diagrams illustrating an example of a method of detecting whether there is abnormality in the inspected object according to the second embodiment.
Figure 18B:
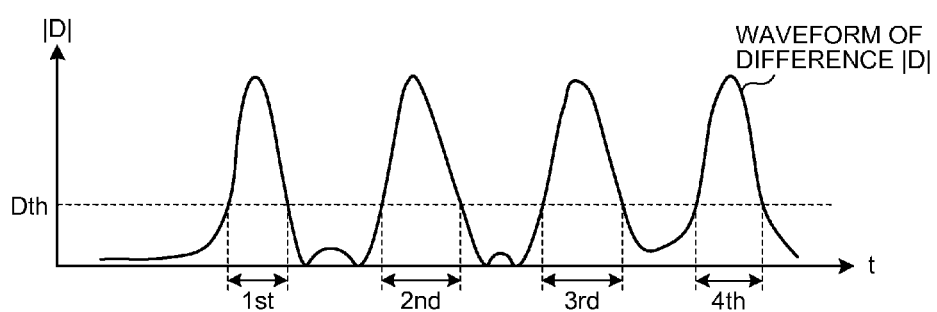

FIGS. 18A and 18B are diagrams illustrating an example of a method of detecting whether there is abnormality in the inspected object 2130 according to the second embodiment. FIG. 18A illustrates the normative waveform corresponding to FIG. 16 and the output waveform corresponding to FIG. 17, in which a horizontal axis indicates time t and a vertical axis indicates an output value V of the sensor 2130. FIG. 18B illustrates a waveform of a time-series change of the difference "D", in which a horizontal axis indicates time t and a vertical axis indicates the difference "D".

In FIGS. 18A and 18B, as described above, when there is abnormality in the inspected object 2140, a section where the output value V of the sensor 2130 increases cyclically exists in the output waveform. Therefore, by comparing the two waveforms of the normative waveform at the time of instructing recorded in the normative waveform recording unit 2163 and the output waveform at the time of activating recorded in the output waveform recording unit 2167 in a state where there is no abnormality in the inspected object 2140, the cyclic change of the output waveform with respect to the normative waveform can be detected. Therefore, it can be detected whether there is abnormality in the inspected object 2140. That is, by determining whether the number of times of excess N where the difference "D" of the normative waveform and the output waveform exceeding the threshold value Dth when the arms 2103L and 2103R perform the predetermined operation once with respect to the injected object 2140 exceeds the number of times of determination Nj described above, it can be determined whether there is abnormality in the injected object 2140. Specifically, when the number of times of excess N is within the number of times of determination Nj, it can be determined that there is no abnormality in the injected object 2140. When the number of times of excess N exceeds the number of times of determination Nj, it can be determined that there is abnormality in the injected object 2140. In the examples that are illustrated in FIGS. 18A and 18B, the number of times of excess N is "4" as illustrated in FIG. 18. Therefore, when the number of times of determination Nj is "3" or less, it is determined that there is abnormality in the injected object 2140.

Figure 19:
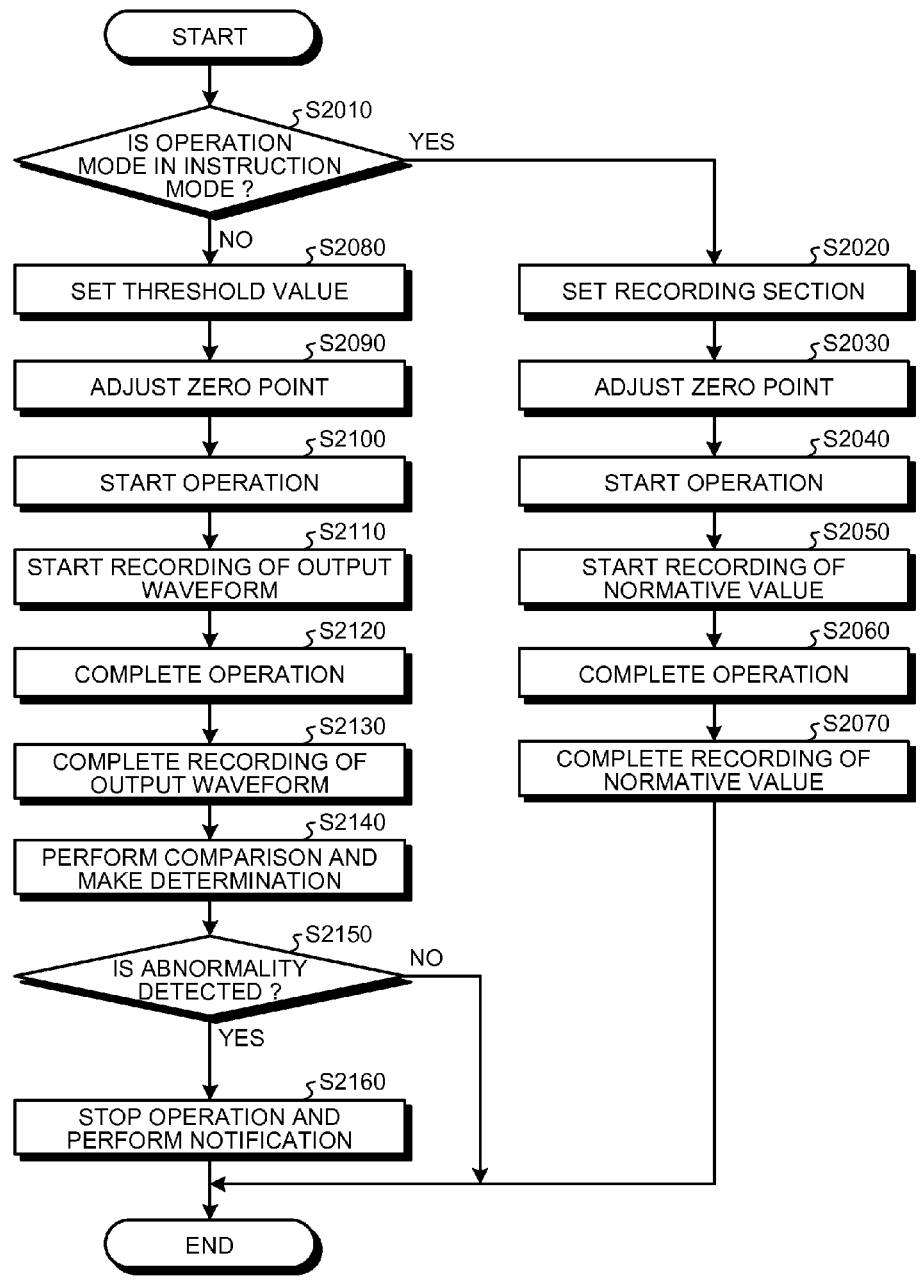
FIG. 19 is a flowchart illustrating a control sequence that is executed by the robot controller according to the second embodiment.

FIG. 19 is a flowchart illustrating a control sequence that is executed by the robot controller 2150 according to the second embodiment.

In FIG. 19, a process that is illustrated in a flow is started when a predetermined operation start manipulation is executed through the input device. First, in step S2010, the robot controller 2150 determines whether an operation mode of the robot 2100 is an "instruction mode" to perform instructing or an "activation mode" to perform activating, on the basis of input information input through the input device. When the operation mode of the robot 2100 is the "instruction mode", the determination result of step S2010 is satisfied and the process proceeds to step S2020.

In step S2020, the robot controller 2150 sets the recording section in the section setting unit 2162, on the basis of the input information input through the input device.

Then, in step S2030, the robot controller 2150 outputs the reset signal to each sensor 2130 and adjusts a zero point of each sensor 2130, in the zero point adjusting unit 2165.

Then, the process proceeds to step S2040 and the robot controller 2150 outputs a position instruction with respect to each of the actuators Ac2001 to Ac2015, which is calculated in the operation instructing unit 2151 on the basis of the instruction information with respect to each of the arms 2103L and 2103R instructed through the input device, to each of the actuators Ac2001 to Ac2015, and starts the predetermined operation according to the corresponding position instruction in the arms 2103L and 2103R, with respect to the inspected object 2140 where there is no abnormality.

Then, in step S2050, the robot controller 2150 starts recording of the normative waveform, in the normative waveform recording unit 2163. Therefore, while the predetermined operation corresponding to the recording section set in step S2020 and started in step S2040 is executed by the arms 2103L and 2103R with respect to the instructed object 2140, the normative waveform recording unit 2163 records the time history of the output value V of each sensor 2130 based on the high frequency vibration component amplified by the amplifying unit 2132, converted into the digital signal by the A/D converter 2131, and extracted by each high-pass filter 2161 as the normative waveform.

If the arms 2103L and 2103R are operated until the operation completion position, the process proceeds to step S2060 and the robot controller 2150 completes the operations of the arms 2103L and 2103R.

Then, in step S2070, the robot controller 2150 completes recording of the normative waveform, in the normative waveform recording unit 2163. The robot controller 2150 ends the process that is illustrated in the flow. The process that is illustrated in the flow is executed by the robot controller 2150, whenever the predetermined operation start manipulation is executed through the input device.

Meanwhile, in step S2010, when the operation mode of the robot 2100 is the "inspection mode", the determination result of step S2010 is not satisfied and the process proceeds to step S2080.

In step S2080, the robot controller 2150 sets the threshold value Dth in the threshold value setting unit 2166, on the basis of the input information input through the input device.

Then, the process proceeds to step S2090 and the robot controller 2150 adjusts a zero point of each sensor 2122 in the zero point setting unit 2165, similar to step S2030.

Then, in step S2100, the robot controller 2150 outputs a position instruction with respect to each of the actuators Ac2001 to Ac2015, which is calculated in the operation instructing unit 2151 on the basis of the instruction information with respect to each of the arms 2103L and 2103R instructed through the input device, to each of the actuators Ac2001 to Ac2015, and starts the predetermined operation according to the position instruction in the arms 2103L and 2103R, with respect to the instructed object 2140.

Then, the process proceeds to step S2110 and the robot controller 2150 starts recording of the output waveform for each sensor 2122, in the output waveform recording unit 2167. Therefore, while the predetermined operation started in step S2040 is executed by the arms 2103L and 2103R with respect to the inspected object 2140, the output waveform recording unit 2167 records the time history of the output value V of the sensor 2130 based on the high frequency vibration component amplified by the amplifying unit 2123, converted into the digital signal by the A/D converter 2131, and extracted by the A/D converter 2131 as the output waveform.

Then, if the arms 2103L and 2103R are operated until the operation completion position, the process proceeds to step S2120 and the robot controller 2150 completes the operations of the arms 2103L and 2103R.

Then, the process proceeds to step S2130 and the robot controller 2150 completes recording of the output waveform, in the output waveform recording unit 2167.

Then, in step S2140, the robot controller 2150 compares the two waveforms of the normative waveform recorded in the normative waveform recording unit 2163 and the output waveform in the output waveform recording unit 2167 in the comparing/determining unit 2164, and calculates the difference "D". The robot controller 2150 counts the number of times of excess N where the calculated difference "D" exceeds the threshold value Dth set in step S2080 when the arms 2103L and 2103R executes the predetermined operation started in step S2100 and completed in step S2120 once with respect to the inspected object 2140. By determining whether the number of times of excess N top be counted exceeds the number of times of determination Nj, it is determined whether there is abnormality in the inspected object 2140. Specifically, when the number of times of excess N is within the predetermined number of times of determination Nj, it is determined that there is no abnormality in the inspected object 2140. When the number of times of excess N exceeds the predetermined number of times of determination Nj, it is determined that there is abnormality in the inspected object 2140.

Then, the process proceeds to step S2150 and the robot controller 2150 determines whether it is determined in step S2140 that there is abnormality in the inspected object 2140. When it is determined that there is no abnormality in the inspected object 2140, the determination result of step S2150 is not satisfied and the process that is illustrated in the flow ends. Meanwhile, when it is determined that there is abnormality in the inspected object 2140, the determination result of step S2150 is satisfied and the process proceeds to step S2160.

In step S2160, the robot controller 2150 intercepts the output of the position instruction from the operation instructing unit 2151 to the smoothing processing unit 2153 in the position instruction intercepting unit 2152, outputs the torque instruction Tref generated by the servo unit 1154 to each of the actuators Ac2001 to Ac2015, stops the operation instructed to the arms 2103L and 2103R, and notifies an external device of the abnormality of the arms 2103L and 2103R in a notifying unit (not illustrated in the drawings).

As described above, the robot 2100 according to this embodiment has the arms 2103L and 2103R. In the vicinity of the front end of the casing of each of the arms 2103L and 2103R (in this example, on the external surface of the casing of each of the twist B portions 2109L and 2109R), the sensor 2130 is provided. Thereby, the change of the minute force that is generated in the front ends (hands 2111L and 2111R) of the arms 2103L and 2103R due to the abnormality of the inspected object 2140 can be detected. As each sensor 2130, the force sensor that has a piezoelectric body that has a natural frequency higher than that of the structural material (metallic material such as iron or aluminum in the above example) forming each portion of the arms 2103L and 2103R is provided. Thereby, since the high frequency vibration or the impact generated in the structural material of each of the arms 2103L and 2103R due to the abnormality of the inspected object 2140 can be detected, it can be detected with high precision whether there is abnormality in the inspected object 2140. Since the external force applied to the arms 2103L and 2103R (for example, hands 2111L and 2111R) can be detected with high precision by the sensor 2130, it can be detected with high precision whether the robot 2100 is in a normal state or an abnormal state, that is, whether the object contacts the arms 2103L and 2103R. Therefore, according to the robot 2100, it can be detected with high precision whether there is abnormality in the robot 2100 and the inspected object 2140.

In this embodiment, particularly, a next effect can be obtained. That is, the output signal of the sensor 2130 that is provided in the vicinity of the front end of each of the arms 2103L and 2103R is transmitted (to the side of the trunk portion 2102) through the cable provided in the casing of each of the arms 2103L and 2103R. In this case, the output signal of each sensor 2130 is an analog signal. At the time of transmitting the analog signal, a coaxial cable is generally used to suppress noise. However, since the coaxial cable has inferior flexibility, the signals may be erroneously transmitted when the arms 2103L and 2103R are bent. Therefore, in this embodiment, the A/D converter 2131 that converts the output signal of the sensor 2130 into the digital signal is provided in the vicinity of the front end of each of the arms 2103L and 2103R (in casing of each of the twist B portions 2109L and 2109R in the above example). Thereby, a cable for a digital signal that has superior flexibility can be provided in the casing of each of the arms 2103L and 2103R. Therefore, the output signal of the sensor 2130 can be securely transmitted without depending on the operation of the arms 2103L and 2103R and reliability can be improved.

In this embodiment, particularly, the sensor 2130 is provided on the external surface of the casing of each of the twist B portions 2109L and 2109R. Thereby, an arrangement space of the sensor 2130 does not need to be secured in the casing of each of the arms 2103L and 2103R, and the thickness of the front ends of the arms 2103L and 2103R can be prevented from increasing.

In this embodiment, particularly, each sensor 2130 is the sensor where the quartz is used as the piezoelectric body. By using the sensor where the quartz is used as the piezoelectric body as each sensor 2130, the high frequency vibration that is generated in the casing of each of the arms 2103L and 2103R due to abnormality of the inspected object 2140 can be securely detected. Therefore, it can be detected with high precision whether there is abnormality in the inspected object 2140.

The second embodiment has been described. However, the embodiment may be implemented by various different embodiments other than the second embodiment. Therefore, the various different embodiments are hereinafter described as modifications.

(1) Case where the Robot is Applied to Detection of a Contact of an Object

In the above embodiment, the robot disclosed in the present application is applied to the detection of the abnormality of the inspected object 2140. However, the embodiment is not limited thereto and the robot disclosed in the present application may be applied to detection of a contact of the object with respect to the arms 2103L and 2103R.

Figure 20:
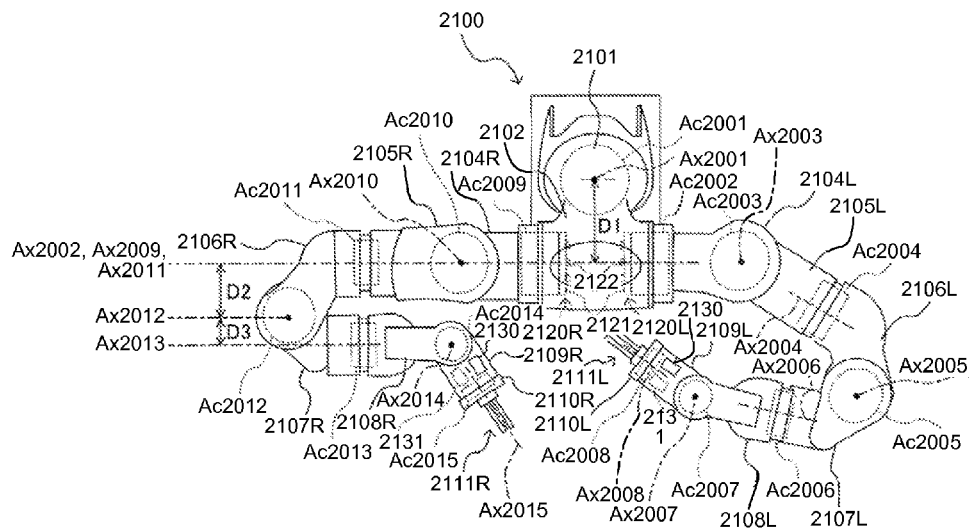
FIG. 20 is a top view illustrating the configuration of a robot according to a modification that is applied to detection of a contact of an object.

FIG. 20 is a top view illustrating the configuration of a robot 2100 according to this modification. FIG. 20 corresponds to FIG. 12 described above. The same components as those of FIG. 12 are denoted by the same reference numeral and the description thereof is appropriately described.

As illustrated in FIG. 20, the robot 2100 according to this modification is different from the robot 2100 according to the second embodiment in that two sensor units 2120L and 2120R are additionally provided. Each of the sensor units 2120L and 2120R includes a disk-shaped sensor fixing jig 2121 and at least one sensor 2122 (second strain sensor) (in this example, three sensors) that has an approximately rectangular solid shape. The sensor fixing jig 2121 of the sensor unit 2120L is attached to a base of a stator of the actuator Ac2002 of the arm 2103L that is positioned to be closest to the side of the base end, and each sensor 2122 that is provided in the sensor fixing jig 2121 can detect the force applied the arm 2103L (in detail, amount of strain caused by a vibration due to the impact force applied to the arm 2103L, not the magnitude of the force). The sensor fixing jig 2121 of the sensor unit 2120R is attached to a base of a stator of the actuator Ac2002 of the arm 2103R that is positioned to be closest to the side of the base end, and each sensor 2122 that is provided in the sensor fixing jig 2121 can detect the force applied the arm 2103R (in detail, amount of strain caused by a vibration due to the impact force applied to the arm 2103R, not the magnitude of the force).

In this modification, as each sensor 2122, a force sensor that has a piezoelectric body made of a material having a natural frequency (or rigidity) higher than that of the metallic material to be the structural material forming each portion of the arms 2103L and 2103R, in this example, a sensor where the quartz is used as the piezoelectric body is used. Each sensor 2122 is not limited to the sensor where the quartz is used as the piezoelectric body, and may be the force sensor that has a piezoelectric body having a natural frequency higher than that of the metallic material to be the structural material forming each portion of the arms 2103L and 2103R. Each sensor 2122 of the sensor unit 2120L detects the amount of strain of a radial direction of the sensor fixing jig 2121 due to the force applied to the arm 2103L as a voltage and each sensor 2122 of the sensor unit 2120R detects the amount of strain of a radial direction of the sensor fixing jig 2121 due to the force applied to the arm 2103R as a voltage. The voltage that is obtained by each sensor 2122 is amplified by the amplifying unit 2132 and is input to the high-pass filter unit 2161.

The other configuration is the same as that of the robot 2100 according to the second embodiment. In this modification, a contact detecting unit (not illustrated in the drawings) of the robot controller 2150 detects whether the object contacts the arms 2103L and 2103R, on the basis of the output value V (output signal) of each sensor 2122 of the sensor units 2120L and 2120R. In this specification, the object is defined as a meaning including the inspected object 2140, the robot 2100, a work apparatus, a part of a building such as a wall, and an organism such as a living body.

That is, as described above, each sensor 2122 of the sensor units 2120L and 2120R detects the force that is applied to the arms 2103L and 2103R. As the force that is applied to the arms 2103L and 2103R, the internal force that is generated by the operation of the arms 2103L and 2103R and the external force that is applied to the arms 2103L and 2103R from the outside are considered. The external force is not applied to the arms 2103L and 2103R when the arms 2103L and 2103R are operated in a state in which the object does not contact the arms 2103L and 2103R. Therefore, each sensor 2122 detects only the vibration due to the internal force. Meanwhile, when the object contacts the arms 2103L and 2103R, the internal force and the external force are applied to the arms 2103L and 2103R. Therefore, each sensor 2122 detects the vibrations due to the internal force and the external force. For this reason, when the object contacts the arms 2103L and 2103R, the output value V of the sensor 2122 increases by the amount corresponding to the external force. Therefore, in this modification, the contact detecting unit compares output data of the output value V of the sensor 2122 when the arms 2103L and 2103R execute the predetermined operation with respect to the inspected object 2140 at the time of inspecting and the normative waveforms previously recorded as the time history of the output value V of the sensor 2122 while the arms 2103L and 2103R execute the predetermined operation with respect to the inspected object 2140 in a state in which the object does not contact the arms 2103L and 2103R, and determines whether the object contacts the arms 2103L and 2103R.

Figure 21:
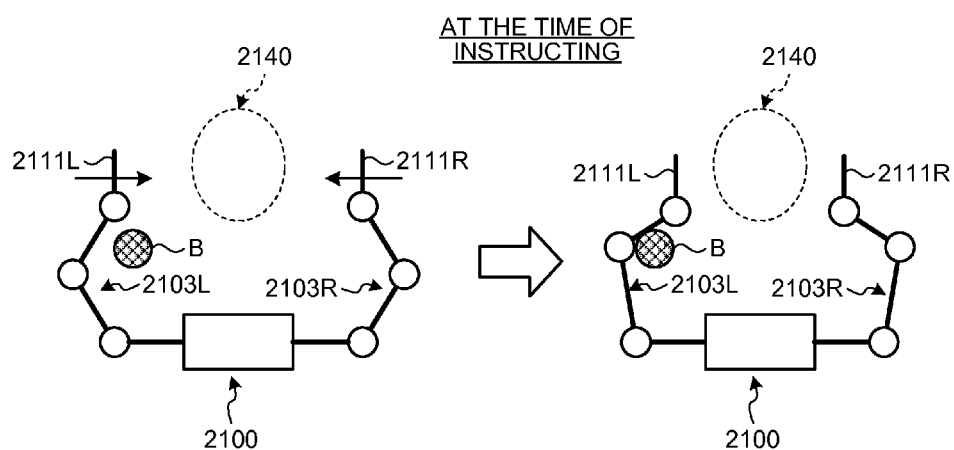
FIG. 21 is a schematic diagram illustrating an example of a predetermined operation that is executed by the arms with respect to the inspected object, at the time of inspecting.

FIG. 21 schematically illustrates an example of the predetermined operation that is executed by the arms 2103L and 2103R with respect to the inspected object 2140 at the time of inspecting. In the example that is illustrated in FIG. 21, at the time of inspecting, under an environment in which an obstacle B exists around the robot 2100 (within the movable range of the arms 2103L and 2103R), the arms 2103L and 2103R perform the predetermined operation according to the position instruction from the robot controller 2150, with respect to the inspected object 2140. At this time, the contact detecting unit compares the output data of the output value V of each sensor 2122 and the previously recorded normative waveform and determines whether the object contacts the arms 2103L and 2103R. When the contact detecting unit detects the contact of the object (obstacle B in this example) with respect to the arms 2103L and 2103R during a period until the arms 2103L and 2103R completes the predetermined operation, the robot controller 2150 stops the operation of the arms 2103L and 2103R at the corresponding position (position illustrated at the right side of FIG. 21).

In this example, the case where the contact of the obstacle B with respect to the arms 2103L and 2103R is detected and the operation is stopped when the contact is detected is described. However, the embodiment is not limited thereto and the contact of the inspected object 2140 with respect to the arms 2103L and 2103R may be detected, the operation may be stopped when the contact is detected, and the product P may be gripped by the hands 2111L and 2111R.

In this modification described above, the sensor 2122 that has a piezoelectric body having a natural frequency higher than that of the metallic material to be the structural material forming each portion of the arms 2103L and 2103R is provided in the bases of the actuators Ac2002 and Ac2009 of the arms 2103L and 2103R closest to the side of the base end. Since the external force applied to the arms 2103L and 2103R can be detected by the sensor 2122, it can be detected whether the object contacts the arms 2103L and 2103R. Since the sensor 2122 is provided in the bases of the actuators Ac2002 and Ac2009 of the arms 2103L and 2103R closest to the side of the base end, a contact at the side of the front end thereof can be detected. That is, a contact with respect to the entire arms 2103L and 2103R can be detected. Therefore, excessive load can be avoided from being applied to the robot 2100 or the object existing around the robot 2100.

(2) Case where the Robot is Applied to Detection of Abnormality of the Arms

In the above embodiment, the robot disclosed in the present application is applied to detection of abnormality of the inspected object 2140 and detection of a contact of the object with respect to the arms 2103L and 2103R. However, the embodiment is not limited thereto and the robot disclosed in the present application may be applied to detection of abnormality of the arms 2103L and 2103R.

The configuration of the robot 2100 according to this modification is the same as that of the robot 2100 according to the modification of (1). In this modification, the robot controller 2150 detects generation or non-generation based on aging of a rotation member such as the actuators Ac2002 to Ac2015 provided in the arms 2103L and 2103R and the decelerator, on the basis of an output value V (output signal) of each sensor 2122 of the sensor units 2120L and 2120R. However, the embodiment is not limited thereto and the robot controller 2150 may detect generation or non-generation (including abnormality based on aging of the rotation member such as the actuators Ac2002 to Ac2015 or the decelerator or abnormality of the casings of the arms 2103L and 2103R) of the arms 2103L and 2103R.

In this case, when the abnormality based on aging is generated in a rotation member such as the actuators Ac2002 to Ac2015 of the arms 2103L and 2103R and the decelerator, an abnormal place cyclically appears in a rotation phase. For this reason, when the arms 2103L and 2103R are operated, a cyclic abnormal vibration or impact is easily generated. In general, when the cyclic abnormal vibration or impact is generated in the arms 2103L and 2103R, because the force due to the cyclic abnormal vibration or impact is transmitted to the arms 2103L and 2103R (the arms 2103L and 2103R are twisted), the output value V of the sensor 2122 is likely to increase, as compared with when the abnormal vibration or the impact is not generated. Therefore, when the abnormality based on aging is generated in a rotation member such as the actuators Ac2002 to Ac2015 of the arms 2103L and 2103R and the decelerator, a section where the output value V of the sensor 1122 increases cyclically exists in the output waveform that is the time history of the output value of the sensor 2122. Therefore, in this modification, the robot controller 2150 compares the normative waveform to be the time history of the output value V of each sensor 2122 previously recorded in a state where there is no abnormality in the arms 2103L and 2103R and the output waveform to be the time history of the output value V of each sensor 2122 while the arms 2103L and 2103R execute the predetermined operation once with respect to the inspected object 2140 at the time of inspecting, detects the cyclic change of the output waveform with respect to the normative waveform, and determines whether there is abnormality in the actuators Ac2002 to Ac2015 of the arms 2103L and 2103R.

In this modification, a next effect can be obtained. That is, by providing the sensors 2122 having the piezoelectric body having a natural frequency higher than that of the structural material forming each portion of the arms 2103L and 2103R, the high frequency abnormal vibration or the impact that is generated in the structural material of each portion of the arms 2103L and 2103R due to the abnormality based on the aging of the rotation member such as the actuators Ac2002 to Ac2015 of the arms 2103L and 2103R and the decelerator can be detected, and it can be detected whether there is abnormality in the arms 2103L and 2103R. Since the sensors 2122 are provided in the bases of the actuators Ac2002 and Ac2009 of the arms 2103L and 2103R closest to the side of the base end, the abnormal vibration based on the rotation member such as all of the actuators at the side of the front end thereof or the decelerator can be detected. That is, abnormality with respect to the entire arms 2103L and 2103R can be detected.

In this embodiment, particularly, as each sensor 2122, the sensor where the quartz is used as the piezoelectric body is used. Thereby, the high frequency abnormal vibration or the impact that is generated in the structural material of each portion of the arms 2103L and 2103R due to the abnormality based on the aging of the rotation member such as the actuators Ac2002 and Ac2009 of the arms 2103L and 2103R or the decelerator can be securely detected. Therefore, it can be detected with high precision whether there is abnormality in the arms 2103L and 2103R.

(3) Case where the Robot is Applied to a Single-Arm Robot

In the above embodiment, the robot disclosed in the present application is applied to the robot 2100 to be the dual-arm robot that has the two arms 2103L and 2103R. However, the embodiment is not limited thereto and the robot disclosed in the present application may be applied to a single-arm robot that has one robot arm. Even in this case, the same effect as that of the above embodiment can be obtained.

(4) Others

In the above embodiment, the mechanical product that includes the components engaged with each other is used as the inspection object. However, the embodiment is not limited thereto and various mechanical products or electric products may be used as inspection objects.

For example, the robot according to this embodiment may be applied to detection of abnormality of a closing state of a plastic cover or detection of abnormality of an operation button of a cellular phone.

In the above embodiment, the configuration where only the robot controller 2150 is provided as the control system is used. A control device that has a function as a contact detecting unit connected to a sensor system may be provided separately from the robot controller 2150 to control an operation of the robot 2100 to form one control system.

In addition to the configuration described above, the configuration where the methods according to the embodiment and the modifications are appropriately combined may be used.

Although not specifically described, this embodiment can be variously changed in a range that does not depart from the sprit and scope of the embodiment.

Next, a third embodiment will be described.

In a field of robots, it is preferable to avoid an excessive load from being generated with respect to a robot or an object existing around the robot. For this reason, various technologies for detecting generation or non-generation of a contact (external force) with respect to the robot are studied.

For example, a technology for attaching a force detector to detect the external force to a base end of a robot arm and stopping an operation of the robot arm on the basis of the detection result of the force detector or operating the robot arm in a reduction direction of the external force when the excessive external force is applied is disclosed in Japanese Patent Application Laid-Open (JP-A) No. 2006-21287.

In the related art, it is preferable to detect a contact or a non-contact with respect to the robot arm with high precision in order to improve functionality of the robot.

In the related art, the actual external force that is applied to the robot arm is calculated by subtracting the internal force generated by an operation of the robot arm from the force detected by the force detector. For this reason, responsiveness with respect to the contact of the robot arm is late. In the case of a slight contact or a momentary contact, the contact may not be detected with high precision.

According to one aspect of an embodiment, a robot system that can improve functionality of a robot and a robot state determining method are provided.

According to this embodiment, the functionality of the robot can be improved.

Hereinafter, the third embodiment will be described with reference to the drawings. This embodiment is an example of the case where the robot system and the robot state determining method disclosed in the present application is applied to product grip control based on a dual-arm robot having two robot arms.

Figure 22:
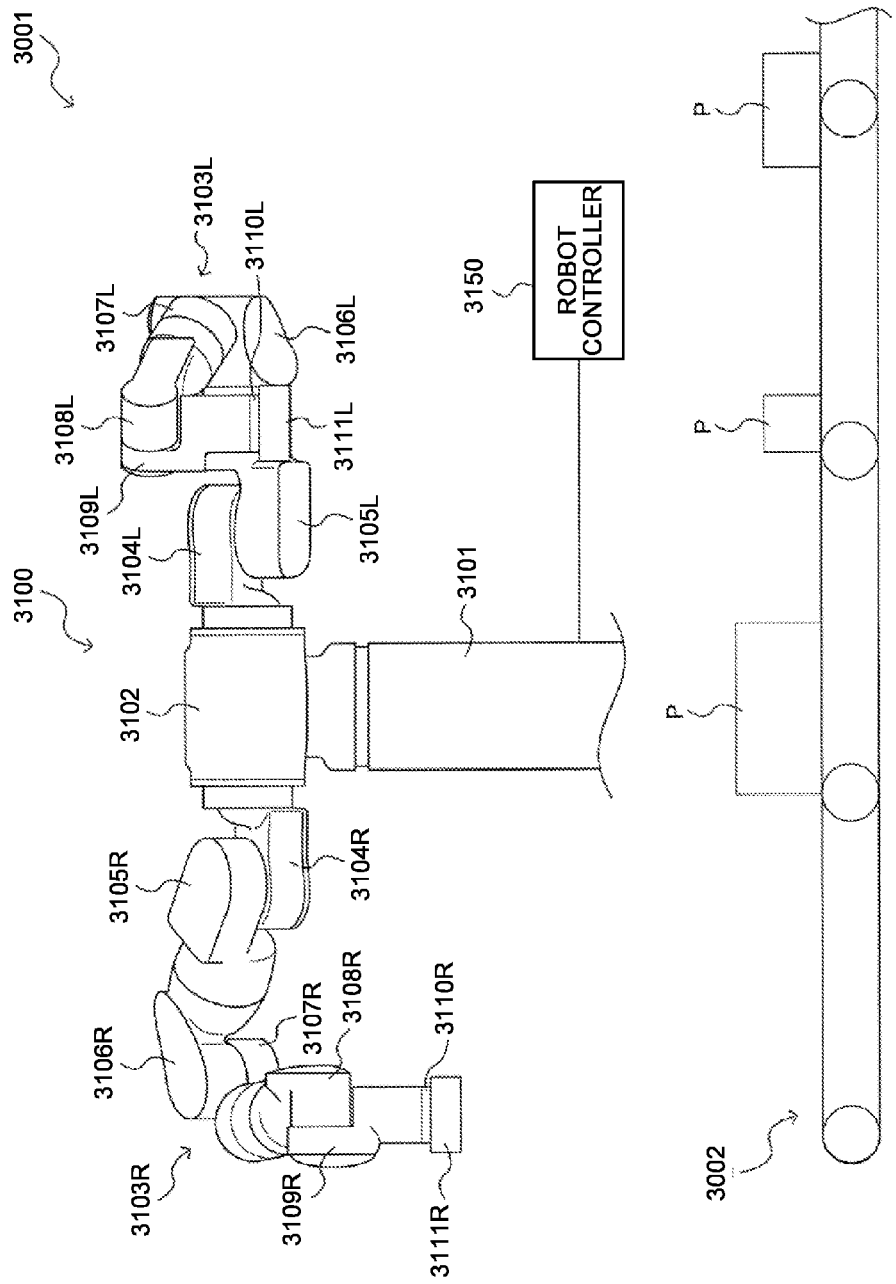
FIG. 22 is a conceptual diagram illustrating the entire configuration of a robot system according to a third embodiment.
Figure 23:
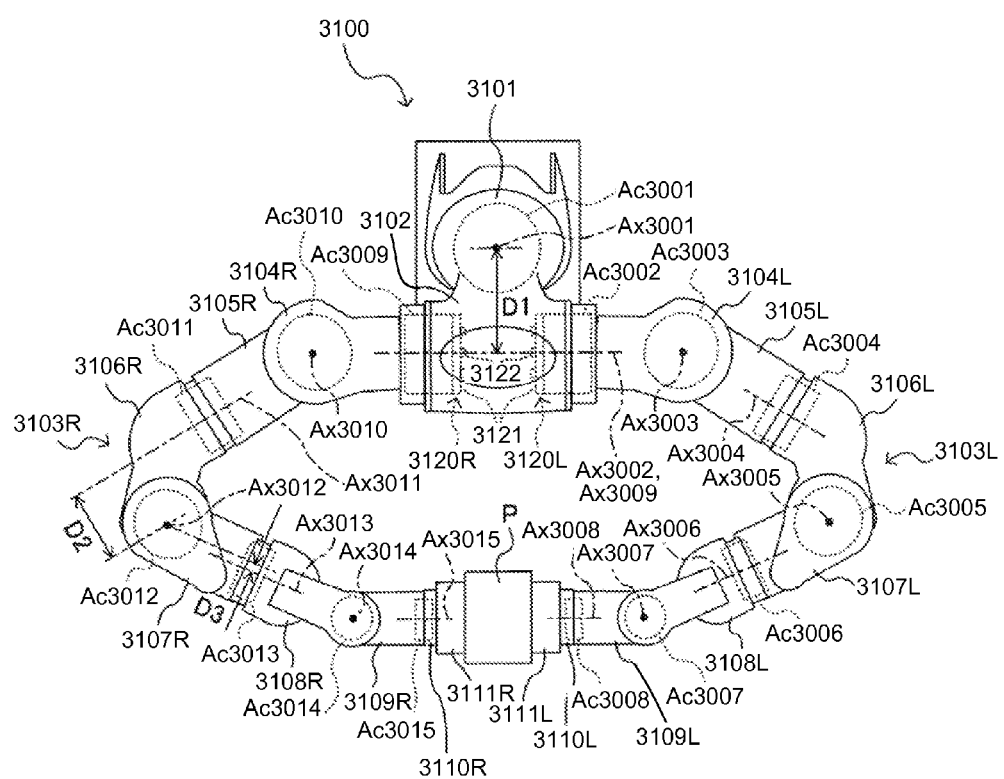
FIG. 23 is a top view illustrating the configuration of the robot according to the third embodiment.

FIG. 22 is a conceptual diagram illustrating the entire configuration of the robot system according to the third embodiment. FIG. 23 is a top view illustrating the configuration of the robot according to the third embodiment.

In FIGS. 22 and 23, a robot system 3001 according to this embodiment is a system that includes a robot 3001 provided on one side of a belt conveyor 3002 to convey plural products P and a robot controller 3150 (control unit) to control the robot 3100. The robot 3100 is a dual-arm robot and has a base 3101, a trunk portion 3102, two arms 3103L and 3103R (robot arms), and two sensor units 3120L and 3120R.

The base 3101 is fixed to a mounting surface (floor) by an anchor bolt (not illustrated in the drawings). The trunk portion 3102 has a first joint portion in which an actuator Ac3001 driven to rotate around a rotation axis Ax3001 is provided. The trunk portion 3102 is disposed to rotate with respect to the base 3101 through the first joint portion and rotates in a direction approximately horizontal to the mounting surface by driving of the actuator Ac3001 provided in the first joint portion. The trunk portion 3102 supports the arms 3103L and 3103R that are configured as separate objects, at one side (right side in FIGS. 22 and 23) and the other side (left side in FIGS. 22 and 23), respectively.

The arm 3103L is a manipulator that is provided on one side of the trunk portion 3102. The arm 3103L has a shoulder portion 3104L, an upper arm A portion 3105L, an upper arm B portion 3106L, a lower arm portion 3107L, a wrist A portion 3108L, a wrist B portion 3109L, a flange 3110L, a hand 3111L, and second to eighth joint portions in which actuators Ac3002 to Ac3008 to drive rotation of the individual portions are provided, respectively.

The shoulder portion 3104L is connected to the trunk portion 3102 to rotate through the second joint portion and rotates around a rotation axis Ax3002 approximately horizontal to the mounting surface by driving of the actuator Ac3002 provided in the second joint portion. The upper arm A portion 3105L is connected to the shoulder portion 3104L to rotate through the third joint portion and rotates around a rotation axis Ax3003 orthogonal to the rotation axis Ax3002 by driving of the actuator Ac3003 provided in the third joint portion. The upper arm B portion 3106L is connected to a front end of the upper arm A portion 3105L shoulder portion 3104L to rotate through the fourth joint portion and rotates around a rotation axis Ax3004 orthogonal to the rotation axis Ax3003 by driving of the actuator Ac3004 provided in the fourth joint portion. The lower arm portion 3107L is connected to the upper arm B portion 3106L to rotate through the fifth joint portion and rotates around a rotation axis Ax3005 orthogonal to the rotation axis Ax3004 by driving of the actuator Ac3005 provided in the fifth joint portion. The wrist A portion 3108L is connected to a front end of the lower arm portion 3107L to rotate through the sixth joint portion and rotates around a rotation axis Ax3006 orthogonal to the rotation axis Ax3005 by driving of the actuator Ac3006 provided in the sixth joint portion. The wrist B portion 3109L is connected to the wrist A portion 3108L to rotate through the seventh joint portion and rotates around a rotation axis Ax3007 orthogonal to the rotation axis Ax3006 by driving of the actuator Ac3007 provided in the seventh joint portion. The flange 3110L is connected to a front end of the wrist B portion 3109L to rotate through the eighth joint portion and rotates around a rotation axis Ax3008 orthogonal to the rotation axis Ax3007 by driving of the actuator Ac3008 provided in the eighth joint portion. The hand 3111L is attached to a front end of the flange 3110L and rotates according to the rotation of the flange 3110L.

The arm 3103R is a manipulator that is provided on the other side of the trunk portion 3102 and has the same structure as that of the arm 3103L. The arm 3103R has a shoulder portion 3104R, an upper arm A portion 3105R, an upper arm B portion 3106R, a lower arm portion 3107R, a wrist A portion 3108R, a wrist B portion 3109R, a flange 3110R, a hand 3107R, and ninth to fifteenth joint portions in which actuators Ac3009 to Ac3015 to drive rotation of the individual portions are provided, respectively.

The shoulder portion 3104R is connected to the trunk portion 3102 to rotate through the ninth joint portion and rotates around a rotation axis Ax3009 approximately horizontal to the mounting surface by driving of the actuator Ac3009 provided in the ninth joint portion. The upper arm A portion 3105R is connected to the shoulder portion 3104R to rotate through the tenth joint portion and rotates around a rotation axis Ax3010 orthogonal to the rotation axis Ax3009 by driving of the actuator Ac3010 provided in the tenth joint portion. The upper arm B portion 3106R is connected to a front end of the upper arm A portion 3105R to be rotatable through the eleventh joint portion and rotates around a rotation axis Ax3011 orthogonal to the rotation axis Ax3010 by driving of the actuator Ac3011 provided in the eleventh joint portion. The lower arm portion 3107R is connected to the upper arm B portion 3106R to rotate through the twelfth joint portion and rotates around a rotation axis Ax3012 orthogonal to the rotation axis Ax3011 by driving of the actuator Ac3012 provided in the twelfth joint portion. The wrist A portion 3108R is connected to a front end of the lower arm portion 3107R to rotate through the thirteenth joint portion and rotates around a rotation axis Ax3013 orthogonal to the rotation axis Ax3012 by driving of the actuator Ac32013 provided in the thirteenth joint portion. The wrist B portion 3109R is connected to the wrist A portion 3108R to rotate through the fourteenth joint portion and rotates around a rotation axis Ax3014 orthogonal to the rotation axis Ax3013 by driving of the actuator Ac3014 provided in the fourteenth joint portion. The flange 3110R is connected to a front end of the wrist B portion 3109R to rotate through the fifteenth joint portion and rotates around a rotation axis Ax3015 orthogonal to the rotation axis Ax3014 by driving of the actuator Ac3015 provided in the fifteenth joint portion. The hand 311R is attached to a front end of the flange 3110R and rotates according to the rotation of the flange 3110R.

In this example, each of the arms 3103L and 3103R has seven joint portions, that is, degrees of freedom of 7 (redundant degree of freedom). However, the degrees of freedom of each of the arms 3103L and 3103R are not limited to "7".

As structural materials that form the shoulder portions 3104L and 3104R, the upper arm A portion 3105L and 3105R, the upper arm B portions 3106L and 3106R, the lower arm portions 3107L and 3107R, the wrist A portions 3108L and 3108R, the wrist B portions 3109L and 3109R, the flanges 3110L and 3110R, and the hands 3111L and 3111R of the arms 3103L and 3103R, metallic materials such as iron or aluminum are used.

As illustrated in FIG. 23, the trunk portion 3102 is formed to protrude forward in a horizontal direction from the first joint portion to the second and ninth joint portions, with respect to the base 3101, such that the rotation axis Ax3001 of the first joint portion and the rotation axiss Ax3002 and Ax3009 of the second and ninth joint portions are offset by the length D1 in a direction approximately horizontal to the mounting surface. Thereby, a space of the lower side of the shoulder portions 3104L and 3104R can be used as a work space, and a reachable range of the arms 3103L and 3103R can be enlarged by rotating the rotation axis Ax3001.

A shape of the upper arm B portion 3106R is set such that the positions of the rotation axis Ax3001 of the eleventh joint portion and the rotation axis Ax3012 of the twelfth joint portion in plan view are offset by the length D2. A shape of the lower arm portion 3107R is set such that the positions of the rotation axis Ax3012 of the twelfth joint portion and the rotation axis Ax3013 of the thirteenth joint portion in plan view are offset by the length D3. When the rotation axis Ax3011 and the rotation axis Ax3013 takes an approximately horizontal posture, the offset length of the rotation axis Ax3011 and the rotation axis Ax3013 becomes (D2+D3). Thereby, when the twelfth joint portion corresponding to a human "elbow" is bent, clearance of the upper arm A portion 3105R and the upper arm B portion 3106R corresponding to a human "upper arm" and the lower arm portion 3107R corresponding to a human "lower arm" can be greatly secured. Even when the hand 3111R comes close to the trunk portion 3102, a freedom degree of the arm 3103R at the time of an operation increases.

Although not clearly illustrated in FIG. 23, similar to the arm 3103R, in the arm 3103L, a shape of the upper arm B portion 3106L is set such that the positions of the rotation axis Ax3004 of the fourth joint portion and the rotation axis Ax3005 of the fifth joint portion in upper view are offset by the length D2. A shape of the lower arm portion 3107L is set such that the positions of the rotation axis Ax3005 of the fifth joint portion and the rotation axis Ax3006 of the sixth joint portion in upper view are offset by the length D3. When the rotation axis Ax3004 and the rotation axis Ax3006 takes an approximately horizontal posture, the offset length of the rotation axis Ax3004 and the rotation axis Ax3006 becomes (D2+D3).

As illustrated in FIG. 23, each of the sensor units 3120L and 3120R includes a disk-shaped sensor fixing jig 3121 and at least one sensor 3122 (second strain sensor) (in this example, three sensors) that has an approximately rectangular solid shape. The sensor fixing jig 3121 of the sensor unit 3120L is attached to a base of a stator of the actuator Ac3002 of the arm 3103L that is positioned to be closest to the side of the base end, and each sensor 3122 that is provided in the sensor fixing jig 3121 can detect the force applied the arm 3103L (in detail, amount of strain caused by a vibration due to the impact force applied to the arm 3103L, not the magnitude of the force). The sensor fixing jig 3121 of the sensor unit 3120R is attached to a base of a stator of the actuator Ac2002 of the arm 3103R that is positioned to be closest to the side of the base end, and each sensor 3122 that is provided in the sensor fixing jig 3121 can detect the force applied the arm 3103R (in detail, amount of strain caused by a vibration due to the impact force applied to the arm 3103R, not the magnitude of the force). The sensor units 3120L and 3120R will be descried in detail below.

In the robot 3100 that has the above-described configuration, operations of individual driving portions that include the actuators Ac3001 to Ac3015 are controlled by the robot controller 3150, such that the operation is stopped and the product P is gripped by the hands 3111L and 3111R, when the arms 3103L and 3103R are operated toward the inner side more than both sides of the product P on the belt conveyor 3002 and a contact of the object with respect to the arms 3103L and 3103R is detected. Each of the actuators Ac3001 to Ac3015 is composed of a decelerator-integrated servo motor that has a hollow portion where a cable (not illustrated in the drawings) can be inserted, and the rotation positions of the actuators Ac3001 to Ac3015 are converted into signals from encoders (not illustrated in the drawings) incorporated in the actuators Ac3001 to Ac3015 and the signals are input to the robot controller 3150 through the cable.

Figure 24:
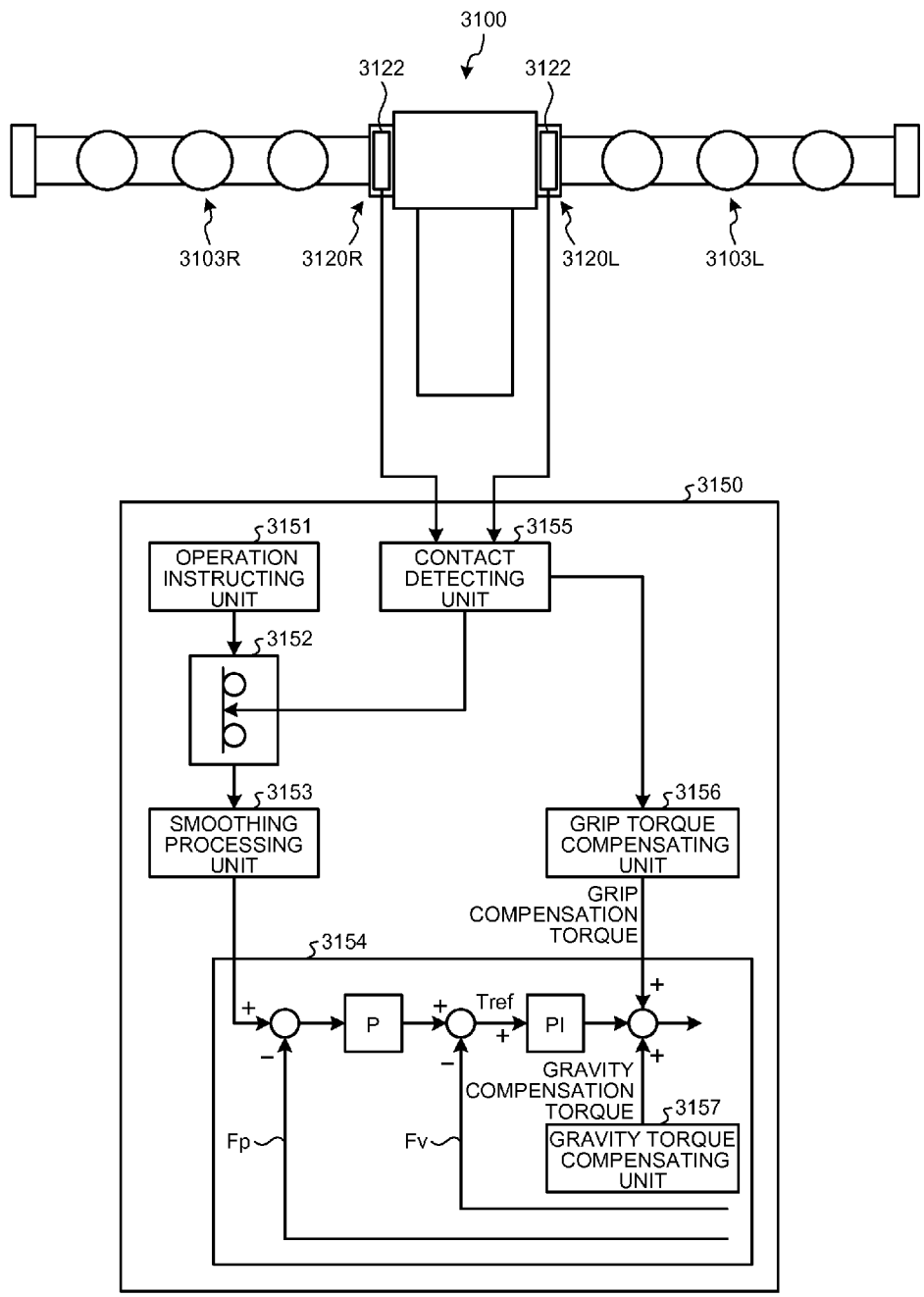
FIG. 24 is a block diagram illustrating the functional configuration of a robot controller according to the third embodiment.

FIG. 24 is a block diagram illustrating the functional configuration of the robot controller 3150 according to the third embodiment.

In FIG. 24, the robot controller 3150 is composed of a computer that includes an operator, a storage device, and an input device (not illustrated in the drawings) and is connected to each driving portion or each sensor 3122 of the robot 3100 through the cable to communicate with each other. The robot controller 3150 has an operation instructing unit 3151, a position instruction intercepting unit 3152, a smoothing processing unit 3153, a servo unit 3154, a contact detecting unit 3155, a grip torque compensating unit 3156, and a gravity torque compensating unit 3157.

The operation instructing unit 3151 calculates a position instruction (operation instruction) with respect to each of the actuators Ac3001 to Ac3015, on the basis of instruction information with respect to each of the arms 3103L and 3103R instructed through the input device, and pools the position instruction to the smoothing processing unit 3153 through the position instruction intercepting unit 3152.

The smoothing processing unit 3153 sequentially outputs the pooled position instruction to the servo unit 3154, for every predetermined operation cycle.

The servo unit 3154 has a joint angle feedback circuit Fp based on a detection value of the encoder of each of the actuators Ac3001 to Ac3015 and a joint angle feedback circuit Fv based on an angular speed detection value obtained from the detection value of the encoder of each of the actuators Ac3001 to Ac3015, for each of the actuators Ac3001 to Ac3015. The servo unit 3154 generates and outputs a torque instruction Tref with each of the actuators Ac3001 to Ac3015 for every predetermined operation cycle, on the basis of the position instructions sequentially input by the smoothing processing unit 3153.

The contact detecting unit 3155 detects whether the robot 3100 is in a normal state or an abnormal state, on the basis of an output value V of each sensor 31222 of the sensor units 3120L and 3120R. In this specification, a state in which the object does not contact the arms 3103L and 3103R is defined as a normal state and a state in which the object contacts the arms 3103L and 3103R is defined as an abnormal state. Therefore, the object is defined as a meaning including the robot 3100, a work apparatus such as the belt conveyor 3002, a part of a building such as a wall, and an organism such as a living body, in addition to the product P to be the grip object. That is, in this embodiment, the contact detecting unit 3155 detects whether the object contacts the arms 3103L and 3103R, on the basis of the output value V (output signal) of each sensor 3122 of the sensor units 3120L and 3120R. The contact detecting unit 3155 will be described in detail below.

When a contact of the object with respect to the arms 3103L and 3103R is detected by the contact detecting unit 3155, the position instruction intercepting unit 3152 intercepts an output from the operation instructing unit 3151 to the smoothing processing unit 3153 and intercepts the position instruction that is transmitted to the servo unit 3154. If the position instruction transmitted to the servo unit 3154 is intercepted, a value of the torque instruction Tref that is output by the feedback decreases and the arms 3103L and 3103R are quickly stopped.

The grip torque compensating unit 3156 adds grip compensation torque corresponding to the self weight to grip the product P by the arms 3103L and 3103R to the torque instruction Tref with respect to each of the actuators Ac3001 to Ac3015 generated by the servo unit 3154.

The gravity torque compensating unit 3157 adds gravity compensation torque corresponding to the self weight to the torque instruction Tref with respect to each of the actuators Ac3001 to Ac3015 generated by the servo unit 3154.

Figure 25:
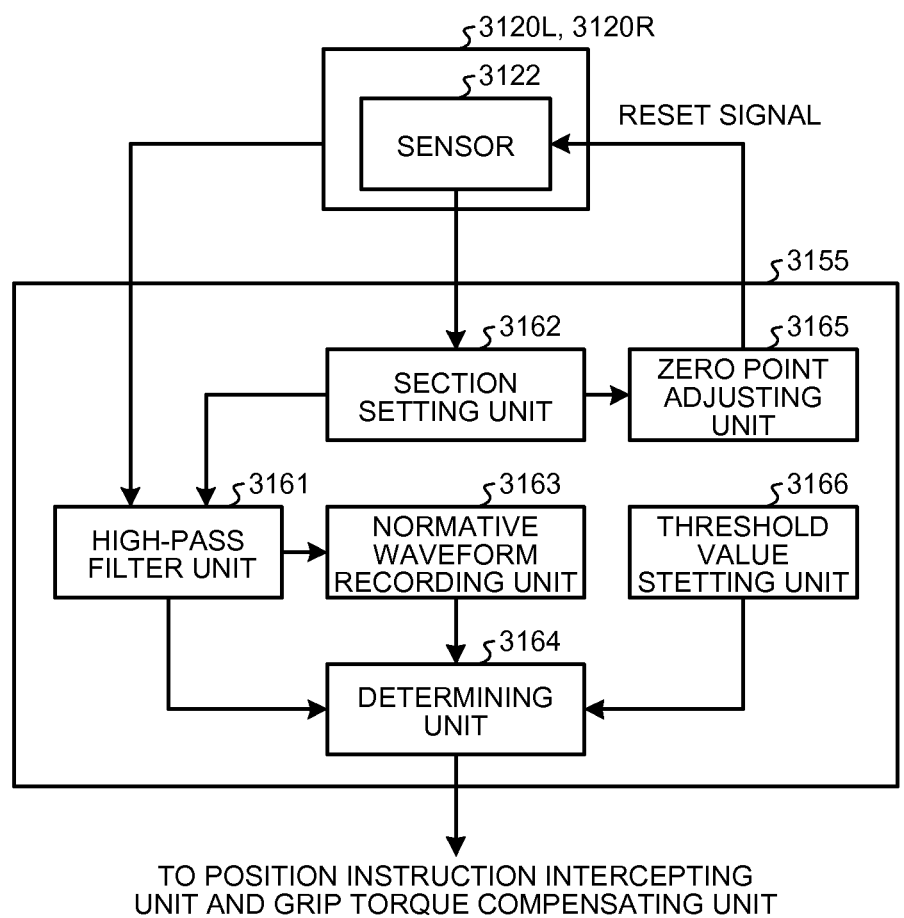
FIG. 25 is a block diagram illustrating the functional configuration of a contact detecting unit according to the third embodiment.

FIG. 25 is a block diagram illustrating the functional configuration of the abnormality detecting unit 3155 according to the third embodiment.

In FIG. 25, the contact detecting unit 3155 has a high-pass filter unit 3161, a section setting unit 3162, a normative data recording unit 3163, a determining unit 3164, a zero point adjusting unit 3165, and a threshold value setting unit 3166.

The high-pass filter unit 3161 extracts a high frequency vibration component of an output signal of each sensor 3122 to remove a frequency component due to disturbance included in the output signal of each sensor 3122 of the sensor units 3120L and 3120R. The high-pass filter unit 3161 will be described in detail below.

The section setting unit 3162 sets a section in which the normative data recording unit 3163 records a time history of the output value V of the sensor unit 3122 as the normative waveform (normative data), on the basis of input information input by the input device (hereinafter, simply referred to as "recording section").

The normative waveform recording unit 3163 records the time history of the output value V of each sensor 3122 based on the high frequency vibration component extracted by the high-pass filter unit 3161 while the arms 3103L and 3103R execute a predetermined operation corresponding to the recording section set by the section setting unit 3162 in a normal state, that is, in a state in which the object does not contact, as a normative waveform for each sensor 3122. The predetermined operation is an operation according to the position instruction that is calculated by the operation instructing unit 3151 on the basis of the instruction information (information indicating the operation start position and the operation completion position) instructed through the input device.

The threshold value setting unit 3166 sets a threshold value Dth that becomes a determination value of a contact or a non-contact in the determining unit 3164, on the basis of the input information input through the input device.

The determining unit 3164 compares output data of the output value V of each sensor 3122 based on the high frequency vibration component extracted by the high-pass filter unit 3161 when the arms 3013L and 3013R execute the predetermined operation at the time of activating and the normative waveform recorded in the normative data recording unit 3163 for each sensor 3122, for each sensor 3122, and calculates the difference (in detail, absolute value of the difference) "D" of the output data and the normative waveform for each sensor 3122. By comparing the difference "D" calculated for each sensor 3122 and a threshold value Dth previously set by the threshold value setting unit 3166 for each sensor 3122, the determining unit 3164 determines whether the robot 3100 is in a normal state or an abnormal state, that is, whether the object contacts the arms 3013L and 3103R. The determining unit 3164 will be described in detail below.

The zero point adjusting unit 3165 outputs a reset signal to each sensor 3122 and adjusts a zero point of each sensor 3122, whenever the arms 3103L and 3103R execute the predetermined operation corresponding to the recording section set by the section setting unit 3162, to suppress the change in the ambient temperature due to heat generation of the actuators Ac3002 to Ac3015 of the arms 3103L and 3103R or an influence of the temperature drift of each sensor 3122 generated by self heat generation.

Figure 26:
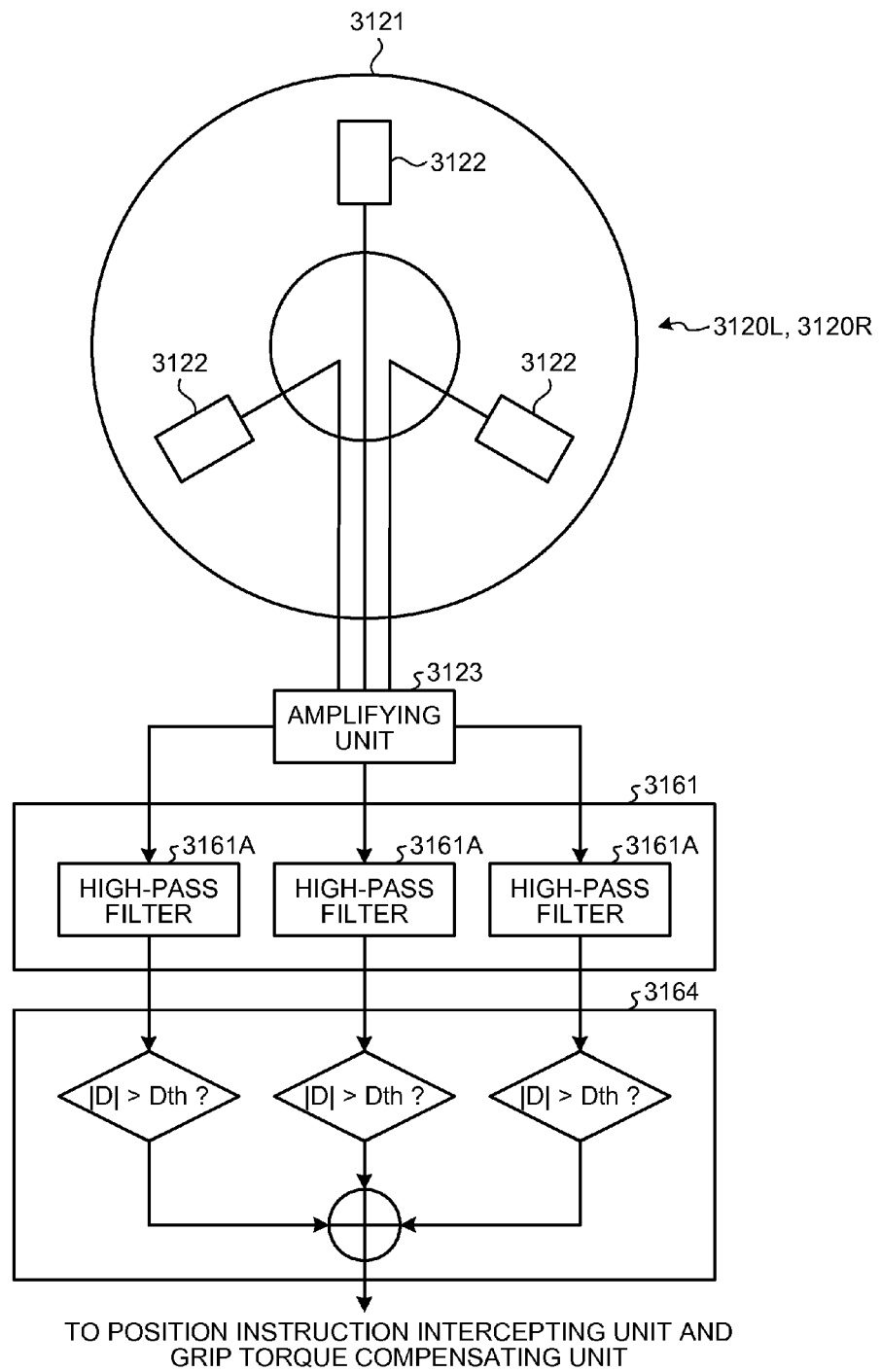
FIG. 26 is a diagram illustrating the detailed configuration of sensor units, a high-pass filter unit, and a determining unit according to the third embodiment.

FIG. 26 is a diagram illustrating the detailed configuration of the sensor unit 3120L and 3120R, the high-pass filter unit 3161, and the determining unit 3164 according to the third embodiment.

In FIG. 26, as described above, each of the sensor units 3120L and 3120R includes a disk-shaped sensor fixing jig 3121 and three sensors 3122 that have an approximately rectangular parallelepiped shape. The three sensors 3122 of the sensor unit 3120L are disposed on an inner surface of the sensor fixing jig 3121, that is, a surface, (the surface on the left in FIG. 23 and the surface in front of a plane of paper in FIG. 26), which is not attached to the base of the stator of the actuator Ac3002, such that the three sensors 3122 are disposed at an equal interval on the same circumference and are radially disposed. The three sensors 3122 of the sensor unit 3120R are disposed on the inner surface of the sensor fixing jig 3121, that is, a surface, (the surface on the right side in FIG. 23 and surface in front of a plane of paper in FIG. 26), which is not attached to the base of the stator of the actuator Ac3009, such that the three sensors 3122 are disposed at an equal interval on the same circumference and are radially disposed.

In this embodiment, a force sensor that has a piezoelectric body made of a material having a natural frequency (rigidity) higher than that of the metallic material to be the structural material forming each portion of the arms 3103L and 3103R, in this example, a sensor where quartz is used as the piezoelectric body is used as each sensor 3122. This is because that the change force including a high frequency component can be detected when a natural frequency is high and the quartz has a natural frequency (or rigidity) higher than that of the metallic material to be the structural material forming each portion of the arms 3103L and 3103R. Therefore, a minute high frequency vibration (fast deformation and dynamic strain) that is transmitted to the structural material of each portion of the arms 3103L and 3103R can be detected.

Each sensor 3122 is not limited to the sensor where the quartz is used as the piezoelectric body and may be a force sensor that has a piezoelectric body made of a material having a natural frequency higher than that of the metallic material to be the structural material forming each portion of the arms 3103L and 3103R. Each sensor 3122 of the sensor unit 3120L detects the amount of strain of a radial direction of the sensor fixing jig 3121 due to the force applied to the arm 3103L and each sensor 3122 of the sensor unit 3120R detects the amount of strain of a radial direction of the sensor fixing jig 3121 due to the force applied to the arm 3103R. The voltage that is obtained by each sensor 3122 is amplified by an amplifying unit 3123 and is input to each high-pass filter 3161A (to be described below) of the high-pass filter unit 3161.

The high-pass filter unit 3161 has plural high-pass filters 3161A (or band-pass filters using a high frequency band as a pass-band) that can extract a high frequency vibration component of the output signal of the sensor 3122, and the high frequency component of the output signal of each sensor 3122 that is amplified by the amplifying unit 3123 is extracted by each high-pass filter 3161A. In each high-pass filter 3161A, a cut-off frequency is determined to remove a frequency component due to an event other than a contact such as an operation of the actuators Ac3002 to Ac3015.

By comparing the difference "D" calculated for each sensor 3122 at the time of activating with a threshold value Dth previously set by the threshold value setting unit 3166 for each sensor 3122, the determining unit 3164 determines whether the object contacts the arms 3103L and 3103R. Specifically, when among the difference "D" for each sensor 3122, the difference "D" for every sensor 3122 is within the threshold value Dth, the determining unit 3164 determines that the object does not contact the arms 3103L and 3103R. When the difference "D" for any one of all of the sensors 3122 exceeds the threshold value Dth, the determining unit 3164 determines that the object contacts the arms 3103L and 3103R.

Figure 27A:
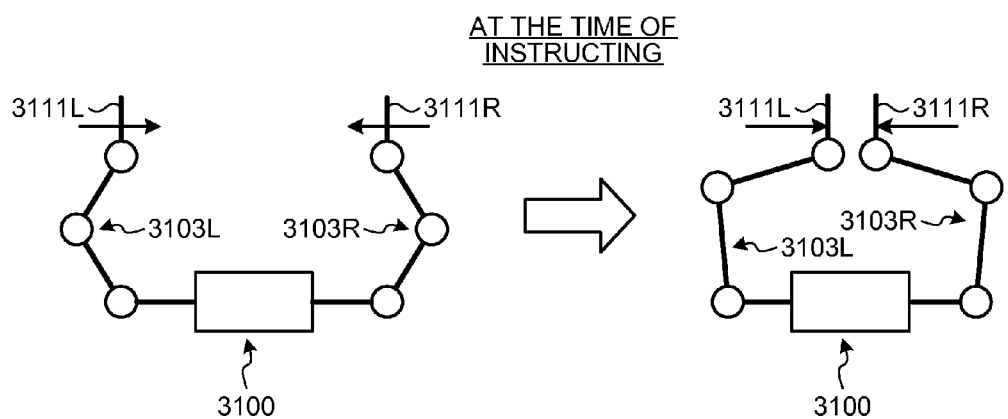
FIGS. 27A and 27B are diagrams illustrating a predetermined operation that is executed by arms according to the third embodiment in a state in which an object does not contact the arm and an output value of a sensor during the predetermined operation.
Figure 27B:
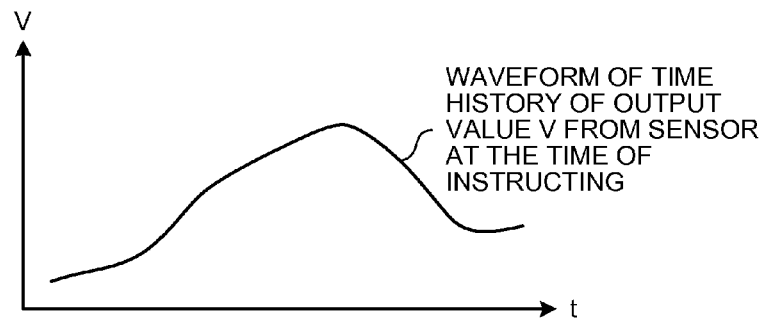

FIGS. 27A and 27B are diagrams illustrating a predetermined operation that is executed by the arms 3103L and 3103R according to the third embodiment in a state in which there is no contact between the arms 3103L and 3103R, and an object, and illustrating an output value V of the sensor 3122 during the predetermined operation. FIG. 27A schematically illustrates the predetermined operation that is executed by the arms 3103L and 3103R in a state in which the arms 3103L and 3103R do not contact the object. FIG. 27B illustrates a waveform of a time history of the output value V of the sensor 3122 while the arms 3103L and 3013R execute the operation illustrated in FIG. 27A, in which a horizontal axis indicates time t and a vertical axis indicates an output value V of the sensor 3122

In FIGS. 27A and 27B, at the time of inspecting, under an environment in which the product P to be the grip object does not exist and an object (obstacle) does not exist around the robot 3100 (within the movable range of the arms 3103L and 3103R), that is, in a state in which the object does not contact the arms 3103L and 3103R, the arms 3103L and 3103R execute the predetermined operation according to the position instruction from the robot controller 3150, that is, the operation from the instructed operation start position (position illustrated at the left side of FIG. 27A) to the instructed operation completion position (position illustrated at the right side of FIG. 27A). The operation completion position is set to the position where the hands 3111L and 3111R can grip the minimum product p among the products P conveyed by the belt conveyor 3002.

In this case, as described above, each sensor 3122 of the sensor units 3120L and 3120R detects the force that is applied to the arms 3103L and 3103R. As the force that is applied to the arms 3103L and 3103R, the internal force that is generated by the operation of the arms 3103L and 3103R and the external force that is applied to the arms 3103L and 3103R from the outside are considered. The external force is not applied to the arms 3103L and 3103R when the arms 3103L and 3103R are operated in a state in which the object illustrated in FIG. 27A does not contact the arms 3103L and 3103R. Therefore, each sensor 3122 detects only the vibration due to the internal force.

Figure 28A:
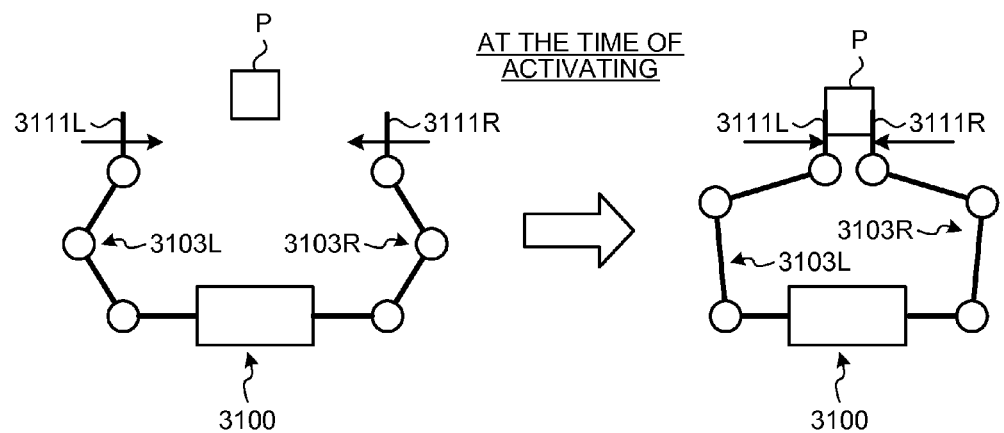
FIGS. 28A and 28B are diagrams illustrating a predetermined operation that is executed by the arms according to the third embodiment at the time of activating and an output value of a sensor during the predetermined operation
Figure 28B:
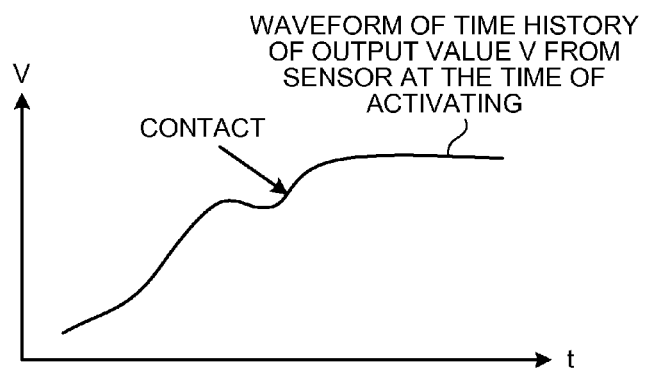

FIGS. 28A and 28B are diagrams illustrating a predetermined operation that is executed by the arms 3103L and 3103R according to the third embodiment at the time of activating and an output value V of the sensor 3122 during the predetermined operation. FIG. 28A schematically illustrates the predetermined operation that is executed by the arms 3103L and 3103R at the time of activating. FIG. 28B illustrates a waveform of a time history of the output value V of the sensor 3122 while the arms 3103L and 3013R execute the operation illustrated in FIG. 28A, in which a horizontal axis indicates time t and a vertical axis indicates an output value V of the sensor 3122.

In FIGS. 28A and 28B, at the time of activating, the arms 3103L and 3103R execute the predetermined operation according to the position instruction from the robot controller 3150, that is, the operation from the instructed operation start position (position illustrated at the left side of FIG. 28A) to the instructed operation completion position (position illustrated at the right side of FIG. 28A). At this time, the arms 3103L and 3103R are operated from the operation start position to the inner side more than both sides of the product P on the belt conveyor 3002 (not illustrated in FIG. 28A). If the contact of the object with respect to the arms 3103L and 3103R during the operation until the operation completion position, the arms 3103L and 3103R stop the operation at the corresponding position such that the product P is gripped by the hands 3111L and 3111R.

In this case, the external force is not applied to the arms 3103L and 3103R when the arms 3103L and 3103R are operated in a state in which the object does not contact the arms 3103L and 3103R. Therefore, each sensor 3122 detects only the vibration due to the internal force. When the object contacts the arms 3103L and 3103R during the activation (in this example, when the product P contacts the inner side of the hands 3111L and 3111R), the internal force and the external force are applied to the arms 3103L and 3103R. Therefore, each sensor 3122 detects the vibration due to the internal force and the external force. For this reason, as illustrated in FIG. 28B, when the object contacts the arms 3103L and 3103R during the activation, the output value V of the sensor 3122 is increased by the amount corresponding to the external force. The arms 3103L and 3103R stop the operation when the object contacts the arms 3103L and 3103R and grip the product P. Therefore, after the object contacts the arms 3103L and 3103R, the output value V of the sensor 3122 becomes almost a constant value, as illustrated in FIG. 28B.

Figure 29A:
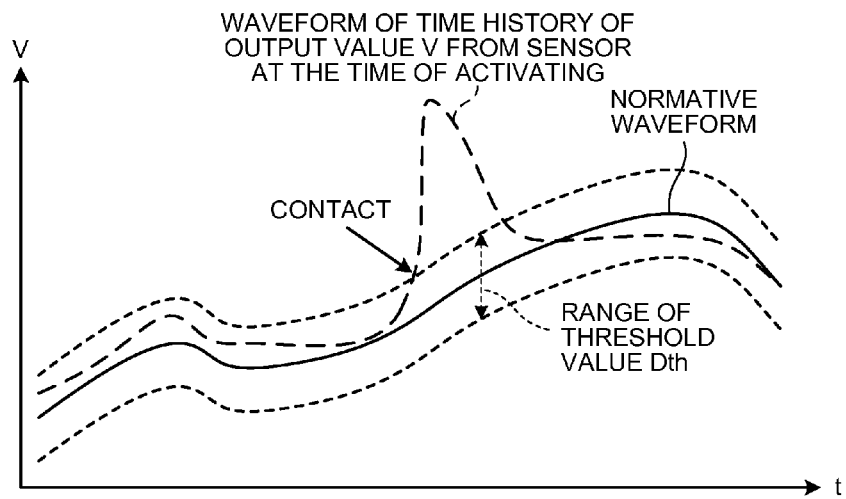
FIGS. 29A and 29B are diagrams illustrating a method of detecting whether the object contacts the arms according to the third embodiment.
Figure 29B:
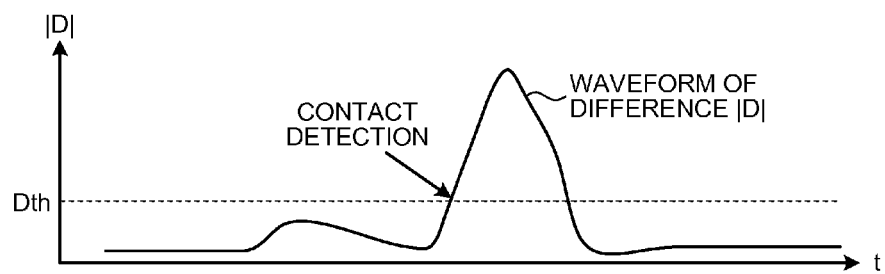

FIGS. 29A and 29B are diagrams illustrating an example of a method of detecting a contact of an object with respect the arms 3103L and 3103R according to the third embodiment. FIG. 29A illustrates the normative waveform and a waveform of the time history of the output value V of the sensor 3122 at the time of activating, in which a horizontal axis indicates time t and a vertical axis indicates an output value V of the sensor 3122. FIG. 29B illustrates a waveform of a time-series change of the difference "D", in which a horizontal axis indicates time t and a vertical axis indicates the difference "D".

In FIGS. 29A and 29B, as described above, in the normative data recording unit 3163, the time history of the output value V of each sensor 3122 while the arms 3103L and 3103R execute the predetermined operation corresponding to the recording section set by the section setting unit 3162 is recorded as the normative waveform. The normative waveform can always be recorded in a state in which the object does not contact the arms 3013L and 3103R. In this embodiment, an example of the case where the normative waveform is recorded at the time of instructing the predetermined operation with respect to the robot 3100 will be described. The normative waveform is data of the time history of the output value V of the sensor 3122 actually recorded while the arms 3103L and 3103R are operated in a state in which the object does not contact at the time of instructing. Therefore, the normative waveform corresponds to the internal force. Therefore, by comparing the normative waveform and the output data of the output value V of the sensor 3122 at the time of activating, specifically, calculating the difference "D" of the output data and the normative waveform, the external force that is applied to the arms 3013L and 3103R during the activation can be detected. That is, the difference "D" corresponds to the external force. By comparing the difference "D" and the threshold value Dth to be the determination value of a contact or a non-contact previously set by the threshold value setting unit 3166, it can be determined whether the external force is applied to the arms 3103L and 3103R, that is, it can be determined where the object contacts the arms 3103L and 3103R. Specifically, when the difference "D" is within the range of the threshold value Dth, it is determined that the external force is not applied to the arms 3103L and 3103R, that is, that the object does not contact the arms 3103L and 3103R. When the difference "D" exceeds the threshold value Dth, it can be determined that the external force is applied to the arms 3103L and 3103R, that is, that the object does not contact the arms 3103L and 3103R.

The waveform of the time history of the output value V of the sensor 3122 at the time of activating illustrated in FIG. 29A is illustrated as an example of a waveform when the object momentarily contacts (when the external force is not immediately applied after the contact), like when a ball hits the arms 3103L and 3103R. According to the above method, a momentary contact can be detected. As described in this embodiment, when this method is applied to product grip control based on the dual-arm robot, the waveform of the time history of the output value V of the sensor 3122 becomes have almost a constant value after the contact, as described above in FIG. 28B.

Figure 30:
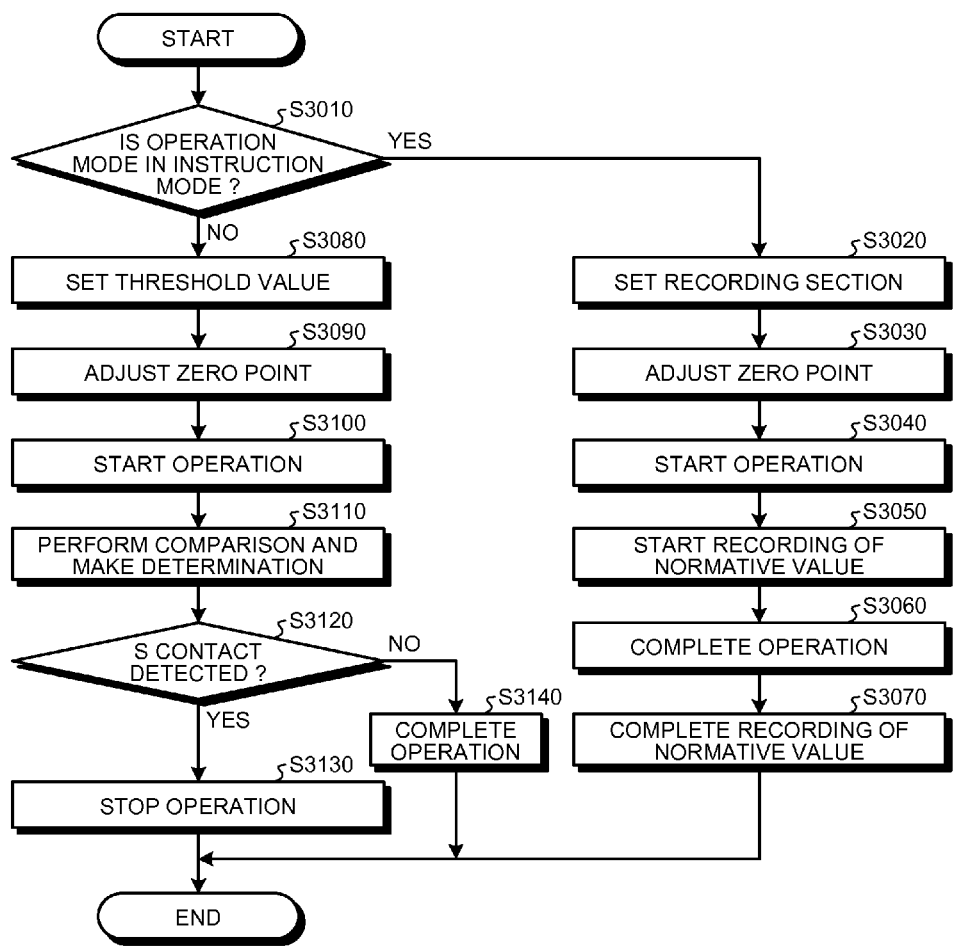
FIG. 30 is a flowchart illustrating a control sequence of a state determining method of the robot that is executed by the robot controller according to the third embodiment.

FIG. 30 is a flowchart illustrating a control sequence based on the robot state determining method that is executed by the robot controller 3150 according to the third embodiment.

In FIG. 30, a process that is illustrated in a flow is started when a predetermined operation start manipulation is executed through the input device. First, in step S3010, the robot controller 3150 determines whether an operation mode of the robot 3100 is an "instruction mode" to perform instructing or an "activation mode" to perform activating, on the basis of input information input through the input device. When the operation mode of the robot 3100 is the "instruction mode", the determination result of step S3010 is satisfied and the process proceeds to step S3020.

In step S3020, the robot controller 3150 sets the recording section in the section setting unit 3162, on the basis of the input information input through the input device.

Then, in step S3030, the robot controller 3150 outputs the reset signal to each sensor 3122 and adjusts a zero point of each sensor 3122, in the zero point adjusting unit 3165.

Then, the process proceeds to step S3040 and the robot controller 3150 outputs a position instruction with respect to each of the actuators Ac3001 to Ac3015, which is calculated in the operation instructing unit 3151 on the basis of the instruction information (information indicating the operation start position and the operation completion position) with respect to each of the arms 3103L and 3103R instructed through the input device, to each of the actuators Ac3001 to Ac3015, and starts the predetermined operation (refer to FIG. 27A) according to the position instruction in the arms 3103L and 3103R in a state in which the object does not contact.

Then, in step S3050, the robot controller 3150 starts inputting (acquiring) of the output value V of each sensor 3122 and starts recording of the normative waveform for each sensor 3122, in the normative waveform recording unit 3163. Therefore, when the predetermined operation corresponding to the recording section set in step S3020 and started in step S3040 is executed by the arms 3103L and 3103R in a state in which the object does not contact, the output value V of each sensor 3122 based on the high frequency vibration component amplified by the amplifying unit 3123 and extracted by each high-pass filter 3161A is input and the normative data recording unit 3163 records the time history of the input output value V of each sensor 3122 as the normative waveform for each sensor 3122.

If the arms 3103L and 3103R are operated until the operation completion position, the process proceeds to step S3060 and the robot controller 3150 completes the operations of the arms 3103L and 3103R.

Then, in step S3070, the robot controller 3150 completes the inputting (acquiring) of the output value V of each sensor 3122 and completes recording of the normative waveform for each sensor 3122 in the normative waveform recording unit 3163. The robot controller 3150 ends the process that is illustrated in the flow. The process that is illustrated in the flow is executed by the robot controller 3150, whenever the predetermined operation start manipulation is executed through the input device.

Meanwhile, in step S3010, when the operation mode of the robot 3100 is the "activation mode", the determination result of step S3010 is not satisfied and the process proceeds to step S3080.

In step S3080, the robot controller 3150 sets the threshold value Dth in the threshold value setting unit 3166, on the basis of the input information input through the input device.

Then, the process proceeds to step S3090 and the robot controller 3150 adjusts a zero point of each sensor 3122 in the zero point setting unit 3165, similar to step S3030.

Then, in step S3100, the robot controller 3150 outputs a position instruction with respect to each of the actuators Ac3001 to Ac3015, which is calculated in the operation instructing unit 3151 on the basis of the instruction information (information indicating the operation start position and the operation completion position) with respect to each of the arms 3103L and 3103R instructed through the input device, to each of the actuators Ac3001 to Ac3015, and starts the predetermined operation according to the position instruction in the arms 3103L and 3103R (refer to FIG. 28A).

Then, the process proceeds to step S3110 and the robot controller 3150 compares the output data of the input output value V of each sensor 3122 when the predetermine operation stated in step S3100 is executed by the arms 3103L and 3103R and the normative waveform recorded in the normative data recording unit 3163 for each sensor 3122, for each sensor 3122 in the determining unit 3164, while inputting the output value V of each sensor 3122 based on the high frequency vibration component amplified by the amplifying unit 3123 and extracted by each high-pass filter 3161A, and calculates the difference "D" for each sensor 3122. By comparing the difference "D" calculated for each sensor 3122 and the threshold value Dth previously set by the threshold value setting unit 3166 for each sensor 3122, it is determined whether the object contacts the arms 3013L and 3103R. Specifically, as described above, when the difference "D" for all of the sensors 3122 is within the threshold value Dth, it is determined that the object does not contact the arms 3103L and 3103R. When the difference "D" for one of all of the sensors 3122 exceeds the threshold value Dth, it is determined that the object contacts the arms 3103L and 3103R.

Then, the process proceeds to step S3120 and the robot controller 3150 determines whether it is determined in step S3110 that the object contacts the arms 3103L and 3103R during the operation of the arms 3103L and 3103R until the operation completion position. When it is determined in step S3110 that the object contacts the arms 3103L and 3103R during the operation of the arms 3103L and 3103R until the operation completion position, the determination result of step S3120 is satisfied and the process proceeds to step S3130.

In step S3130, the robot controller 3150 intercepts the output of the position instruction from the operation instructing unit 3151 to the smoothing processing unit 3153 in the position instruction intercepting unit 3152, adds the grip compensation torque to the torque instruction Tref generated by the servo unit 3154, outputs the resultant of the addition to each of the actuators Ac3001 to Ac3015 to stop the operation in the arms 3103L and 3103R, and grips the product P by the hands 3111L and 3111R. Then, the robot controller 3150 ends the process that is illustrated in the flow.

Meanwhile, in step S3120, when it is determined in step S3110 that the object does not contact the arms 3103L and 3103R during the operation of the arms 3103L and 3103R until the operation completion position (when the product P to be the grip object does not exist), the determination result of step S3120 is not satisfied, the process proceeds to step S3140, and the robot controller 3150 completes the operation in the arms 3103L and 3103R. The robot controller 3150 ends the process that is illustrated in the process.

In the above description, the sequence of steps S3050 and S3070 corresponds to a normative data recording sequence that is described in claims and the sequence of step S3110 corresponds to a determining sequence. The sequence of steps S3050, S3070, and S3110 functions as an output value acquiring sequence.

As described above, in the robot system 3001 according to this embodiment, in the normative data recording unit 3163, the time history of the output value V of each sensor 3122 while the arms 3103L and 3103R execute the predetermined operation in a state in which the object does not contact the arms is recorded as the normative waveform. By comparing the output data of the output value V of each sensor 3122 when the arms 3103L and 3103R execute the predetermined operation at the time of activating and the normative waveform recorded in the normative data recording unit 3163 (comparing the different "D" and the threshold value Dth in the above example), the determining unit 3164 determines whether the object contacts the arms 3103L and 3103R. As described above, the normative waveform is data of the time history of the output value V of the sensor 3122 actually recorded while the arms 3103L and 3103R are operated in a state in which the object does not contact. Therefore, the normative waveform corresponds to the internal force that is generated by the operation of the arms 3103L and 3103R. For this reason, by comparing the normative waveform and the output data of the output value V of the sensor 3122 at the time of activating, the external force that is applied to the arms 3013L and 3103R during the activation can be detected, and it can be determined with high precision whether the object contacts the arms 3103L and 3103R. As a result, control for stopping the operation of the arms 3103L and 3103R on the basis of whether the object contacts the arms or operating the arms 3103L and 3103R in a direction where the external force based on the contact is reduced can be performed with high precision. Therefore, functionality of the robot 3100 can be improved.

In this embodiment, the force sensor that has a piezoelectric body that has a natural frequency higher than that of the structural material (metallic material such as iron or aluminum in the above example) forming each portion of the arms 3103L and 3103R is used as each sensor 3122. In the above example, particularly, the sensor where the quartz is used as the piezoelectric body is used as each sensor. Thereby, the high frequency vibration or the impact that is generated in the structural material of each portion of the arms 3103L and 3103R due to collision of the obstacle can be detected, and it can be detected with high precision whether the object contacts the arms 3103L and 3103R.

In this embodiment that is applied to the product grip control, a next effect is obtained. That is, in order to grip an object having an indefinite shape in the related art, a means for attaching a special sensor to the hands 3111L and 3111R of the arms 3103L and 3103R and detecting and confirming a grip state needs to be provided. Meanwhile, in this embodiment, a control operation is executed such that the two arms 3103L and 3103R are operated toward the inner side of both sides of the product P, the operation is stopped when the contact is detected, and the product P is gripped by the hands 3111L and 3111R. Therefore, the special sensor does not need to be provided, and product grip control based on the robot 3100 that has the hands 3111L and 3111R with the simple configuration and can securely grip the object having the indefinite shape can be realized.

In this embodiment, particularly, when the difference "D" of the output data and the normative waveform is within of the predetermined threshold value Dth, the determining unit 3164 determines whether the object does not contact the arms 3103L and 3103R. When the difference "D" exceeds the predetermined threshold value Dth, the determining unit 3164 determines whether the object contacts the arms 3103L and 3103R. That is, since the difference "D" of the output data and the normative waveform corresponds to the external force applied to the arms 3103L and 3103R as described above, the determining unit 3164 can perform the determination based on the difference "D" and can detect with high precision whether the object contacts the arms 3103L and 3103R. By setting the predetermined threshold value Dth as a determination value of a contact or a non-contact, erroneous detection based on disturbance can be suppressed.

In this embodiment, particularly, the robot controller 3150 has the threshold value setting unit 3166 that sets the threshold value Dth. Since the threshold value setting unit 3166 can set an arbitrary value as the threshold value Dth according to a specification or an activation environment of the robot 3100, the robot controller 3150 can suppress the erroneous detection based on the disturbance and can detect with high precision whether the object contacts the arms 3103L and 3103R.

In this embodiment, particularly, the robot controller 3150 has the section setting unit 3162 that sets the recording section where the time history of the output value V of the sensor 3122 is recorded as the normative waveform by the normative data recording unit 3163. By the section setting unit 3162, a section where the arms 3103L and 3103R execute an arbitrary operation can be set as the recording section. Thereby, a section where the same operation as the predetermined operation executed by the arms 3103L and 3103R at the time of activating is executed can be set as the recording section. If the normative waveform is recorded, it can be securely detected whether the object contacts the arms 3103L and 3103R. Since a normative waveform can be recorded for each different operation, a normative waveform can be recorded to correspond to each of various operations executed by the arms 3103L and 3103R at the time of activating.

In this embodiment, particularly, the robot controller 3150 has the zero point adjusting unit 3165 that adjusts a zero point of each sensor 3122, whenever the arms 3103L and 3103R execute the predetermined operation corresponding to the recording section set by the section setting unit 3162. By the zero point adjusting unit 3165, an influence of the temperature drift of each sensor 3122 can be suppressed and contact precision can be prevented from being lowered. In particular, when the arms 3103L and 3103R repeat the predetermined operation at the time of activating, zero point adjustment is performed for each operation. Therefore, the influence of the temperature drift can be securely suppressed.

In this embodiment, particularly, the robot controller 3150 has the high-pass filter unit 3161 that extracts the high frequency vibration component of the output signal of each sensor 3122, and the determining unit 3164 compares the output data of the output value V of each sensor based on the high frequency vibration component extracted by the high-pass filter unit 3161 and the normative waveform and determines whether the object contacts the arms 3103L and 3103R. Thereby, since the frequency component due to the disturbance can be removed, it can be detected with high precision whether the object contacts the arms 3103L and 3103R.

The third embodiment has been described. However, the embodiment may be implemented by various different embodiments other than the third embodiment. Therefore, the various different embodiments are hereinafter described as modifications.

Figure 31:
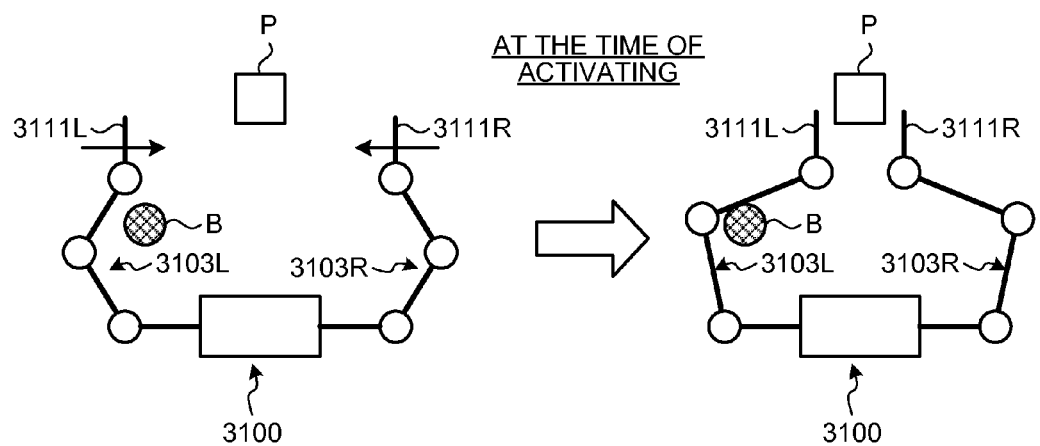
FIG. 31 is a schematic view illustrating a predetermined operation that is executed by the arm at the time of activating, in a modification that is applied to detection of a contact of an obstacle.

(1) Case where the Robot System is Applied to Detection of a Contact of an Obstacle In the above embodiment, the robot system disclosed in the present application is applied to the product grip control. However, the embodiment is not limited thereto and the robot system disclosed in the present application may be applied to detection of a contact of the obstacle. That is, as illustrated in FIG. 31, the determining unit 3164 determines whether the obstacle B contacts the arms 3103L and 3103R using the same method as that of the above embodiment, when the arms 3103L and 3103R execute the predetermined operation according to the position instruction from the robot controller 3150, that is, the operation from the instructed operation start position (position illustrated at the left side of FIG. 31) to the instructed operation completion position. If the contact of the obstacle with respect to the arms 3103L and 3103R is detected, the operation of the arms 3103L and 3103R is stopped at the corresponding position (position illustrated at the right side of FIG. 31). Even in this modification, the same effect as that of the embodiment can be obtained. Further, it is possible to avoid an excessive load from acting on a robot 3100 or an object existing around the robot 3100.

(2) Case where a Low-Pass Filter is Provided

In the above embodiment, the high-pass filter unit 3161 that has the high-pass filter 3161A to extract the high frequency vibration component of the sensor 3122 is provided in the contact detecting unit 3155, the determining unit 3164 compares the normative waveform based on the high frequency vibration component extracted by the high-pass filter unit 3161 and the output data, and determines whether the object contacts the arms 3103L and 3103R. However, the embodiment is not limited thereto. That is, a low-pass filter unit that has a low-pass filter (or it may be a band-pass filter that uses a high frequency band as a pass-band) to extract a low frequency vibration component of the output signal of the sensor 3122 may be provided separately from the high-pass filter unit 3161, in the contact detecting unit 3155, the determining unit 3164 may compare the normative waveform based on the low frequency vibration component extracted by the low-pass filter unit and the output data, and may determine whether the object (product including flexibility such as a cardboard box in particular) contacts the arms 3103L and 3103R. According to this modification, since the low frequency vibration component can be extracted, generation or non-generation of a relative late contact, such as a contact of the product including the flexibility such as the cardboard box with respect to the arms 3103L and 3103R, can be detected with high precision.

Case where the Robot System is Applied to a Single-Arm Robot

In the above description, this embodiment is applied to the robot 3100 to be the dual-arm robot that has the two arms 3103L and 3103R. However, this embodiment may be applied to a single-arm robot that has one robot arm. Even in this case, the same effect as that of the above embodiment can be obtained.

In addition to the configuration described above, the configuration where the methods according to the embodiment and the modifications are appropriately combined may be used.

Although not specifically described, this embodiment can be variously changed in a range that does not depart from the sprit and scope of the embodiment.

Next, a fourth embodiment will be described.

In a field of robots, it is preferable to avoid an excessive load from being generated with respect to a robot or an object existing around the robot. For this reason, various technologies for detecting generation or non-generation of a contact (external force) with respect to the robot are studied.

For example, a technology for attaching a force detector to detect the external force to a base end of a robot arm and stopping an operation of the robot arm on the basis of the detection result of the force detector or operating the robot arm in a reduction direction of the external force when the excessive external force is disclosed in Japanese Patent Application Laid-Open (JP-A) No. 2006-21287.

In order to improve reliability of the robot, it is preferable to detect generation or non-generation of abnormality in the robot arm, such as abnormality based on aging of an actuator of the robot arm or a decelerator.

In the related art, a six-axial force sensor is used as the force detector. In general, the six-axial force sensor is configured using plural strain gauges and a natural frequency is low. For this reason, a high frequency abnormal vibration that is generated in the structural material of the robot arm due to the abnormality of the actuator or the decelerator may not be detected and the abnormality of the robot arm may not be detected. For this reason, reliability is low.

According to one aspect of the embodiment, a robot system that can detect whether the robot arm is abnormal and can improve reliability and a robot abnormality detecting method are provided.

According to this embodiment, since it can be detected whether there is abnormality in the robot arm, the reliability of the robot can be improved.

The fourth embodiment will be described with reference to the drawings.

Figure 32:
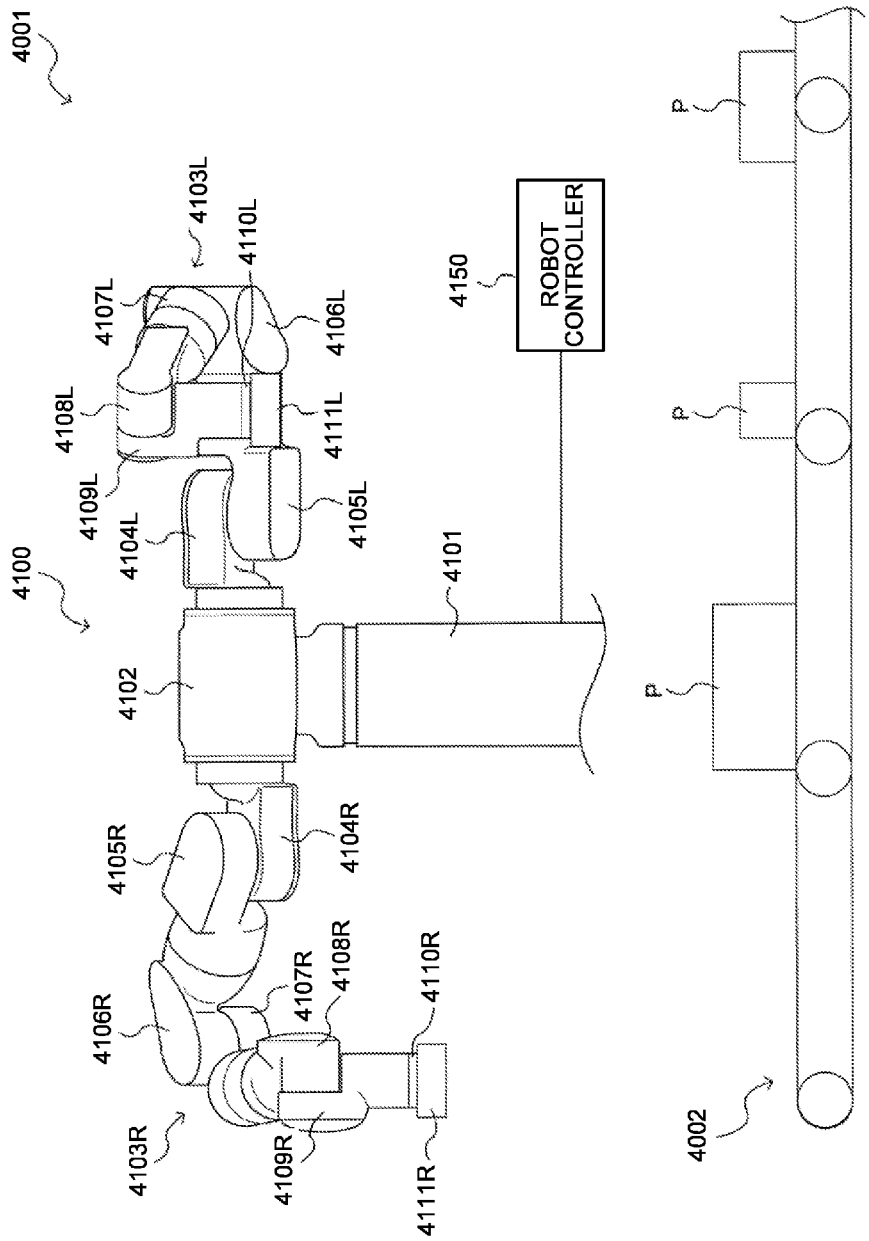
FIG. 32 is a conceptual diagram illustrating the entire configuration of a robot system according to a fourth embodiment.
Figure 33:
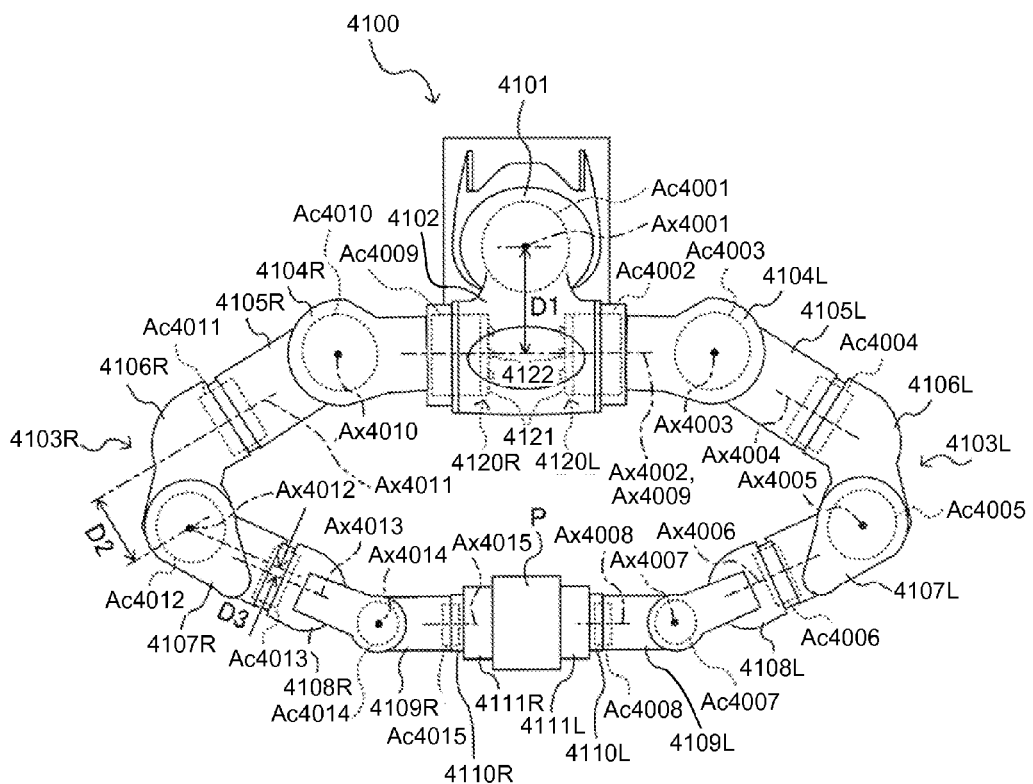
FIG. 33 is a top view illustrating the configuration of the robot according to the fourth embodiment.

FIG. 32 is a conceptual diagram illustrating the entire configuration of the robot system according to the fourth embodiment. FIG. 33 is a top view illustrating the configuration of the robot according to the fourth embodiment.

In FIGS. 32 and 33, a robot system 4001 according to this embodiment includes a robot 4100 that is provided on one side of a belt conveyor 4002 to convey plural products P and a robot controller 4150 (control unit) that controls the robot 4100. The robot 4100 is a dual-arm robot and includes a base 4101, a trunk portion 4102, two arms 4103L and 4103R (robot arms), and two sensor units 4120L and 4120R.

The base 4101 is fixed to a mounting surface (floor) by an anchor bolt (not illustrated in the drawings). The trunk portion 4102 has a joint portion in which an actuator Ac4001 driven to rotate about a rotation axis Ax4001 is provided. The trunk portion 4102 is disposed to rotate with respect to the base 4101 through the first joint portion and rotates in a direction approximately horizontal to the mounting surface by driving of the actuator Ac4001 provided in the first joint portion. The trunk portion 4102 supports the arms 4103L and 4103R that are configured as separate objects, at one side (right side in FIGS. 32 and 33) and the other side (left side in FIGS. 32 and 33), respectively.

The arm 4103L is a manipulator that is provided on one side of the trunk portion 4102. The arm 4103L has a shoulder portion 4104L, an upper arm A portion 4105L, an upper arm B portion 4106L, a lower arm portion 4107L, a wrist A portion 4108L, a wrist B portion 4109L, a flange 4110L, a hand 4111L, and second to eighth joint portions in which actuators Ac4002 to Ac4008 to drive rotation of the individual portions are provided, respectively.

The shoulder portion 4104L is connected to the trunk portion 4102 to rotate through the second joint portion and rotates around a rotation axis Ax4002 approximately horizontal to the mounting surface by driving of the actuator Ac4002 provided in the second joint portion. The upper arm A portion 4105L is connected to the shoulder portion 4104L to rotate through the third joint portion and rotates around a rotation axis Ax4003 orthogonal to the rotation axis Ax4002 by driving of the actuator Ac4003 provided in the third joint portion. The upper arm B portion 4106L is connected to a front end of the upper arm A portion 4105L shoulder portion 4104L to rotate through the fourth joint portion and rotates around a rotation axis Ax4004 orthogonal to the rotation axis Ax4003 by driving of the actuator Ac4004 provided in the fourth joint portion. The lower arm portion 4107L is connected to the upper arm B portion 4106L to rotate through the fifth joint portion and rotates around a rotation axis Ax4005 orthogonal to the rotation axis Ax4004 by driving of the actuator Ac4005 provided in the fifth joint portion. The wrist A portion 4108L is connected to a front end of the lower arm portion 4107L to rotate through the sixth joint portion and rotates around a rotation axis Ax4006 orthogonal to the rotation axis Ax4005 by driving of the actuator Ac4006 provided in the sixth joint portion. The wrist B portion 4109L is connected to the wrist A portion 4108L to rotate through the seventh joint portion and rotates around a rotation axis Ax4007 orthogonal to the rotation axis Ax4006 by driving of the actuator Ac4007 provided in the seventh joint portion. The flange 4110L is connected to a front end of the wrist B portion 4109L to rotate through the eighth joint portion and rotates around a rotation axis Ax4008 orthogonal to the rotation axis Ax4007 by driving of the actuator Ac4008 provided in the eighth joint portion. The hand 4111L is attached to a front end of the flange 4110L and rotates according to the rotation of the flange 4110L.

The arm 4103R is a manipulator that is provided on the other side of the trunk portion 4102. Similar to the arm 4103L, the arm 4103R has a shoulder portion 4104R, an upper arm A portion 4105R, an upper arm B portion 4106R, a lower arm portion 4107R, a wrist A portion 4108R, a wrist B portion 4109R, a flange 4110R, a hand 4107R, and ninth to fifteenth joint portions in which actuators Ac4009 to Ac4015 to drive rotation of the individual portions are provided, respectively.

The shoulder portion 4104R is connected to the trunk portion 4102 to rotate through the ninth joint portion and rotates around a rotation axis Ax4009 approximately horizontal to the mounting surface by driving of the actuator Ac4009 provided in the ninth joint portion. The upper arm A portion 4105R is connected to the shoulder portion 4104R to rotate through the tenth joint portion and rotates around a rotation axis Ax4010 orthogonal to the rotation axis Ax4009 by driving of the actuator Ac4010 provided in the tenth joint portion. The upper arm B portion 4106R is connected to a front end of the upper arm A portion 4105R to rotate through the eleventh joint portion and rotates around a rotation axis Ax4011 orthogonal to the rotation axis Ax4010 by driving of the actuator Ac4011 provided in the eleventh joint portion. The lower arm portion 4107R is connected to the upper arm B portion 4106R to rotate through the twelfth joint portion and rotates around a rotation axis Ax4012 orthogonal to the rotation axis Ax4011 by driving of the actuator Ac4012 provided in the twelfth joint portion. The wrist A portion 4108R is connected to a front end of the lower arm portion 4107R to rotate through the thirteenth joint portion and rotates around a rotation axis Ax4013 orthogonal to the rotation axis Ax4012 by driving of the actuator Ac4013 provided in the thirteenth joint portion. The wrist B portion 4109R is connected to the wrist A portion 4108R to rotate through the fourteenth joint portion and rotates around a rotation axis Ax4014 orthogonal to the rotation axis Ax4013 by driving of the actuator Ac4014 provided in the fourteenth joint portion. The flange 4110R is connected to a front end of the wrist B portion 4109R to rotate through the fifteenth joint portion and rotates around a rotation axis Ax4015 orthogonal to the rotation axis Ax4014 by driving of the actuator Ac4015 provided in the fifteenth joint portion. The hand 4111R is attached to a front end of the flange 4110R and rotates according to the rotation of the flange 4110R.

In this example, each of the arms 4103L and 4103R has seven joint portions, that is, a freedom degree of 7. However, the freedom degree of each of the arms 4103L and 4103R is not limited to "7."

As structural materials that form the shoulder portions 4104L and 4104R, the upper arm A portion 4105L and 4105R, the upper arm B portions 4106L and 4106R, the lower arm portions 4107L and 4107R, the wrist A portions 4108L and 4108R, the wrist B portions 4109L and 4109R, the flanges 4110L and 4110R, and the hands 4111L and 4111R of the arms 4103L and 4103R, metallic materials such as iron or aluminum are used.

As illustrated in FIG. 33, the trunk portion 4102 is formed to protrude forward in a horizontal direction from the first joint portion to the second and ninth joint portions, with respect to the base 4101, such that the rotation axis Ax4001 of the first joint portion and the rotation axiss Ax4002 and Ax4009 of the second and ninth joint portions are offset by the length D1 in a direction approximately horizontal to the mounting surface. Thereby, a space of the lower side of the shoulder portions 4104L and 4104R can be used as a work space, and a reachable range of the arms 4103L and 4103R can be enlarged by rotating the rotation axis Ax4001.

A shape of the upper arm B portion 4106R is set such that the positions of the rotation axis Ax4011 of the eleventh joint portion and the rotation axis Ax4012 of the twelfth joint portion in plan view are offset by the length D2. A shape of the lower arm portion 4107R is set such that the positions of the rotation axis Ax4012 of the twelfth joint portion and the rotation axis Ax4013 of the thirteenth joint portion in plan view are offset by the length D3. When the rotation axis Ax4011 and the rotation axis Ax4013 takes an approximately horizontal posture, the offset length of the rotation axis Ax4011 and the rotation axis Ax4013 becomes (D2+D3). Thereby, when the twelfth joint portion corresponding to a human "elbow" is bent, clearance of the upper arm A portion 4105R and the upper arm B portion 4106R corresponding to a human "upper arm" and the lower arm portion 4107R corresponding to a human "lower arm" can be greatly secured. Even when the hand 4111R comes close to the trunk portion 4102, a degree of freedom of the arm 4103R at the time of an operation increases.

Although not clearly illustrated in FIG. 33, similar to the arm 4103R, in the arm 4103L, a shape of the upper arm B portion 4106L is set such that the positions of the rotation axis Ax4004 of the fourth joint portion and the rotation axis Ax4005 of the fifth joint portion in upper view are offset by the length D2. A shape of the lower arm portion 4107L is set such that the positions of the rotation axis Ax4005 of the fifth joint portion and the rotation axis Ax4006 of the sixth joint portion in upper view are offset by the length D3. When the rotation axis Ax4004 and the rotation axis Ax4006 takes an approximately horizontal posture, the offset length of the rotation axis Ax4004 and the rotation axis Ax4006 becomes (D2+D3).

As illustrated in FIG. 33, each of the sensor units 4120L and 4120R includes a disk-shaped sensor fixing jig 4121 and at least one (in this example, three) sensor 4122 (strain sensors) that have an approximately rectangular solid shape. The sensor fixing jig 4121 of the sensor unit 4120L is attached to a base of a stator of the actuator Ac4002 of the arm 4103L that is positioned to be closest to the base side, and the three sensors 4122 that are provided in the sensor fixing jig 4121 can detect the force applied the arm 4103L (in detail, amount of strain caused by a vibration due to the impact force applied to the arm 4103L, not the magnitude of the force). The sensor fixing jig 4121 of the sensor unit 4120R is attached to a base of a stator of the actuator Ac4009 of the arm 4103R that is positioned to be closest to the base side, and the three sensors 4122 that are provided in the sensor fixing jig 4121 can detect the force applied the arm 4103L (in detail, amount of strain caused by a vibration due to the impact force applied to the arm 4103R, not the magnitude of the force). The sensor units 4120L and 4120R will be described in detail below.

In the robot 4100 that has the above-described configuration, operations of individual driving portions that include the actuators Ac4001 to Ac4015 are controlled by the robot controller 4150, such that the arms 4103L and 4103R are operated toward the inner side than both sides of the product P on the belt conveyor 4002 and the product P is gripped by the hands 4111L and 4111R. Each of the actuators Ac4001 to Ac4015 is composed of a decelerator-integrated servo motor that has a hollow portion where a wiring line (not illustrated in the drawings) can be inserted, and the rotation positions of the actuators Ac1001 to Ac1015 are converted into signals from encoders incorporated in the actuators Ac4001 to Ac4005 and the signals are input to the robot controller 4150 through the wiring line.

Figure 34:
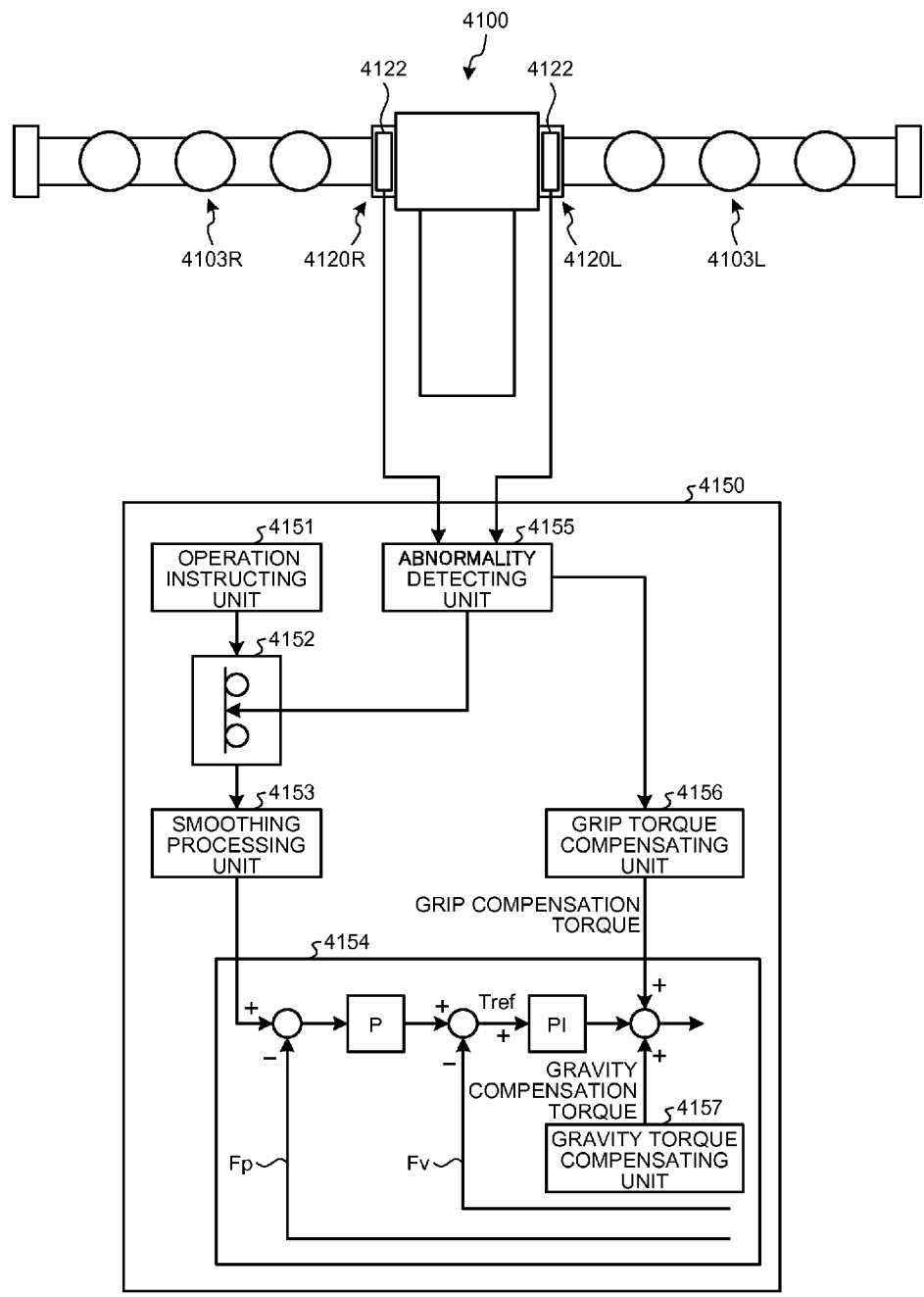
FIG. 34 is a block diagram illustrating the functional configuration of a robot controller according to the fourth embodiment.

FIG. 34 is a block diagram illustrating the functional configuration of the robot controller 4150 according to the fourth embodiment.

In FIG. 34, the robot controller 4150 is composed of a computer (not illustrated in the drawings) that includes an operator, a storage device, and an input device and is connected to the individual driving portions of the robot 4100 or the individual sensors 4122 through the wiring line to communicate with each other. The robot controller 4150 has an operation instructing unit 4151, a position instruction intercepting unit 4152, a smoothing processing unit 4153, a servo unit 4154, an abnormality detecting unit 4155, a grip torque compensating unit 4156, and a gravity torque compensating unit 4157.

The operation instructing unit 4151 calculates a position instruction (operation instruction) with respect to each of the actuators Ac4001 to Ac4015, on the basis of instruction information (information indicating the operation start position and the operation completion position) with respect to each of the arms 4103L and 4103R instructed through the input device, and pools the position instruction to the smoothing processing unit 4153 through the position instruction intercepting unit 4152.

The smoothing processing unit 4153 sequentially outputs the pooled position instruction to the servo unit 4154, for every predetermined operation cycle.

The servo unit 4154 has a joint angle feedback circuit Fp based on a detection value of the encoder of each of the actuators Ac4001 to Ac4015 and a joint angle feedback circuit Fv based on an angular speed detection value obtained from the detection value of the encoder of each of the actuators Ac4001 to Ac4015, for each of the actuators Ac4001 to Ac4015. The servo unit 4154 generates and outputs a torque instruction Tref with each of the actuators Ac4001 to Ac4015 for every predetermined operation cycle, on the basis of the position instructions sequentially input by the smoothing processing unit 4153.

The abnormality detecting unit 4155 detects generation or non-generation of abnormality based on aging of a rotation member such as the actuators Ac4002 to Ac4015 provided in the arms 4103L and 4103R and the decelerator, on the basis of an output value V (output signal of each sensor 4122 of the sensor units 4120L and 4120R. However, the embodiment is not limited thereto and the abnormality detecting unit 4155 may detect generation or non-generation of the abnormality (including abnormality occurring with aging of the rotating member such as the actuators Ac4002 to Ac4015 or the decelerator, or abnormality of the casings of the arms 4103L and 4103R) of the arms 4103L and 4103R. The abnormality detecting unit 4155 will be described in detail below.

When the abnormality of the actuators Ac4002 to Ac4015 of the arms 4103L and 4103R is detected by the abnormality detecting unit 4155, the position instruction intercepting unit 4152 intercepts an output from the operation instructing unit 4151 to the smoothing processing unit 4153 and intercepts the position instruction that is transmitted to the servo unit 4154. If the position instruction transmitted to the servo unit 4154 is intercepted, a value of the torque instruction Tref that is output by the feedback decreases and the arms 4103L and 4103R are quickly stopped.

The grip torque compensating unit 4156 adds grip compensation torque to grip the product P by the arms 4103L and 4103R to the torque instruction Tref with respect to each of the actuators Ac4001 to Ac4015 generated by the servo unit 4154.

The gravity torque compensating unit 4157 adds gravity compensation torque corresponding to the self weight to grip the product P by the arms 4103L and 4103R to the torque instruction Tref with respect to each of the actuators Ac4001 to Ac4015 generated by the servo unit 4154.

Figure 35:
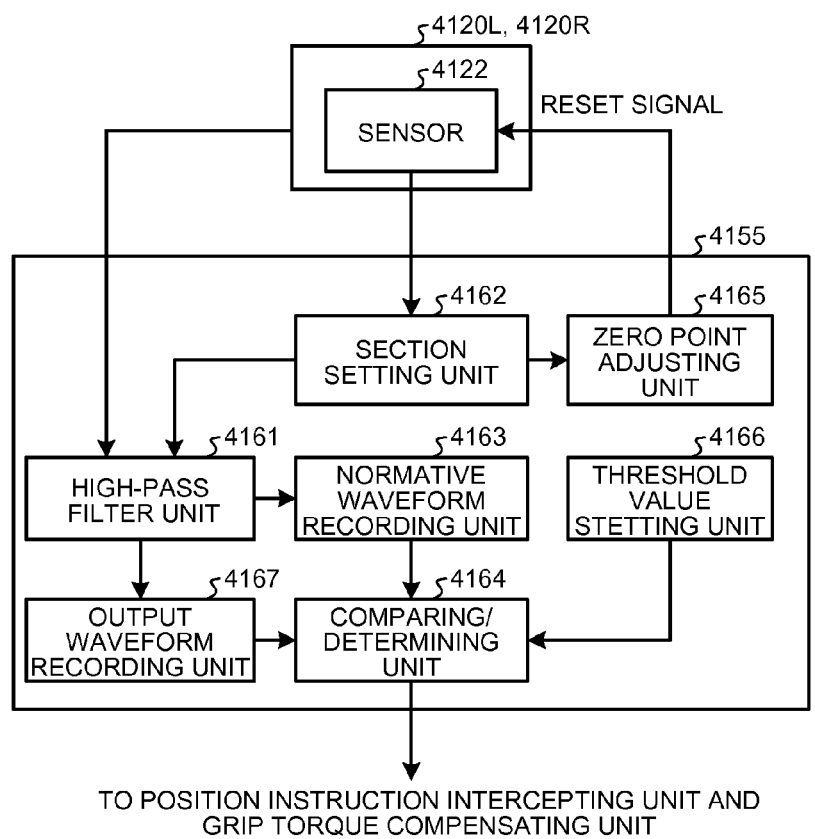
FIG. 35 is a block diagram illustrating the functional configuration of an abnormality detecting unit according to the fourth embodiment.

FIG. 35 is a block diagram illustrating the functional configuration of the abnormality detecting unit 4155 according to the fourth embodiment.

In FIG. 35, the abnormality detecting unit 4155 has a high-pass filter unit 4161, a section setting unit 4162, a normative waveform recording unit 4163, an output waveform recording unit 4167, a comparing/determining unit 4164, a zero point adjusting unit 4165, and a threshold value setting unit 4166.

The high-pass filter unit 4161 extracts a high frequency vibration component of an output signal of each sensor 4122 to remove a frequency component (for example, frequency component due to disturbance) other than a frequency due to the abnormality of the arms 4103L and 4103R, which is included in the output signal of each sensor 4122 of the sensor units 4120L and 4120R. The high-pass filter unit 4161 will be described in detail below.

The section setting unit 4162 sets a section in which the normative waveform recording unit 4163 records a time history of the output value V of the sensor 4122 as the normative waveform, on the basis of input information input by the input device (hereinafter, simply referred to as "recording section").

The normative waveform recording unit 4163 records the time history of the output value V of each sensor 4122 based on the high frequency vibration component extracted by the high-pass filter unit 4161 while the arms 4103L and 4103R execute a predetermined operation corresponding to the recording section set by the section setting unit 4162 in a state in which there is no abnormality in the arms 4103L and 4103R as a normative waveform (refer to FIG. 37B to be described below) for each sensor 4122. In this case, the state in which there is no abnormality in the arms 4103L and 4103R means a state in which there is no structural or functional defect and failure in the casings (including the structure member, the cover member, and the wiring line) of the arms 4103L and 4103R and the actuators Ac4002 to Ac4015 provided in the arms 4103L and 4103R or the decelerator and the arms and the casing and the actuators or the decelerator are normally operated, and a contact or interference not to be intended is not generated in the arms 4103L and 4103R. For example, the state in which there is no abnormality in the arms 4103L and 4103R means a state immediately after it is checked that the casings of the arms 4103L and 4103R and the actuators Ac4002 to Ac4015 provided in the arms 4013L and 4103R or the decelerator are normally operated or a state at the time of initial activating in which there is no initial defect. The predetermined operation is an operation according to the position instruction that is calculated by the operation instructing unit 4151 on the basis of the instruction information (information indicating the operation start position and the operation completion position) instructed through the input device.

The output waveform recording unit 4167 records the time history of the output value V of each sensor 4122 based on the high frequency vibration component extracted by the high-pass filter unit 4161 while the arms 4103L and 4103R execute the predetermined operation at the time of activating as an output waveform (refer to FIG. 38B to be described below) for each sensor 4122. In this embodiment, the output waveform recording unit 4167 records the time history of the output value V of each sensor 4122 while the arms 4103L and 4103R execute the predetermined operation at the time of activating as an output waveform for each sensor 4122, when the product P to be a grip object does not exist in a movable range at the time of activating (for example, immediately after starting conveyance of the product P or at the time of stopping the conveyance and performing checking). However, the embodiment is not limited thereto and the output waveform recording unit 4167 may record the time history of the output value V of each sensor 4122 while the arms 4103L and 4103R execute the predetermined operation at the time of activating in the case where the product P to be a grip object exists in a movable range at the time of activating as an output waveform for each sensor 4122.

The threshold value setting unit 4166 sets a threshold value Dth that becomes a determination value of generation or non-generation of the abnormality in the comparing/determining unit 4164, on the basis of the input information input through the input device.

The comparing/determining unit 4164 compares the normative waveform recorded in the normative waveform recording unit 4163 for each sensor 4122 and the output waveform recorded in the output waveform recording unit 4167 for each sensor 4122, for each sensor 4122, and calculates the difference (in detail, absolute value of the difference) "D" of the normative waveform and the output waveform, for each sensor 4122. The number of times (hereinafter, referred to as number of times of excess N) of the difference "D" calculated for each sensor 4122 exceeding a threshold value Dth previously set by the threshold value setting unit 4166 for a constant time (in this example, time needed when the arms 4103L and 4103R executes the predetermined operation once) is calculated for each sensor 4122. The constant time is not limited to the time needed when the arms 4103L and 4103R executes the predetermined operation once. For example, the constant time may be time that is set through the input device. By determining whether the number of times of excess N counted for each sensor 4122 exceeds the predetermined number of times of determination Nj for each sensor 4122, the comparing/determining unit 4164 determines whether there is abnormality in the actuators Ac4002 to Ac4015 of the arms 4103L and 4103R. The comparing/determining unit 4164 will be described in detail below.

The zero point adjusting unit 4165 outputs a reset signal to each sensor 4122 and adjusts a zero point of each sensor 4122, whenever the arms 4103L and 4103R execute the predetermined operation corresponding to the recording section set by the section setting unit 4162, to suppress the change in the ambient temperature due to heat generation of the actuators Ac4002 to Ac4015 of the arms 4103L and 4103R or an influence of the temperature drift of each sensor 4122 generated by self heat generation.

FIG. 36 a diagram illustrating the detailed configuration of the sensor units 4120L and 4120R, the high-pass filter unit 4161, and the comparing/determining unit 4164 according to the fourth embodiment. In FIG. 36, the normative waveform recording unit 4163 and the output waveform recording unit 4167 are not illustrated.

In FIG. 36, as described above, each of the sensor units 4120L and 4120R includes the sensor fixing jig 4121 that is provided on the inner side of the casing of the trunk portion 4102 and is formed in an annular shape and the three sensors 4122 that are provided in the sensor fixing jig 4121 and have an approximately rectangular solid shape. The sensor fixing jig 4121 of each of the sensor units 4120L and 4120R has an opening 4121A where the wiring line of the actuators Ac4002 to Ac4015 provided in the arms 4103L and 4103R can be inserted, at the approximately central portion. The three sensors 4122 of the sensor unit 4120L are disposed on an inner surface of the sensor fixing jig 4121, that is, a surface (left surface in FIG. 33 and surface in front of a plane of paper in FIG. 36) not attached to the base of the stator of the actuator Ac4002, such that the three sensors 4122 are disposed at an equal interval on the same circumference and are radially disposed. The three sensors 4122 of the sensor unit 4120R are disposed on the inner surface of the sensor fixing jig 4121, that is, a surface (right surface in FIG. 33 and surface in front of a plane of paper in FIG. 36) not attached to the base of the stator of the actuator Ac4009, such that the three sensors 4122 are disposed at an equal interval on the same circumference and are radially disposed.

In this embodiment, a force sensor that has a piezoelectric body made of a material having a natural frequency (rigidity) higher than that of the metallic material to be the structural material forming each portion of the arms 4103L and 4103R, in this example, a sensor where quartz is used as the piezoelectric body is used as each sensor 4122. This is because that the change force including a high frequency component can be detected when a natural frequency is high and the quartz has a natural frequency (or rigidity) higher than that of the metallic material to be the structural material forming each portion of the arms 4103L and 4103R. Therefore, a minute high frequency vibration (fast deformation and dynamic strain) that is transmitted to the structural material of each portion of the arms 4103L and 4103R can be detected.

Each sensor 4122 is not limited to the sensor where the quartz is used as the piezoelectric body and may be a force sensor that has a piezoelectric body made of a material having a natural frequency higher than that of the metallic material to be the structural material forming each portion of the arms 4103L and 4103R. Each sensor 4122 of the sensor unit 4120L detects the amount of strain of a radial direction of the sensor fixing jig 4121 due to the force applied to the arm 4103L as a voltage and each sensor 4122 of the sensor unit 4120R detects the amount of strain of a radial direction of the sensor fixing jig 4121 due to the force applied to the arm 4103R as a voltage. The voltage that is obtained by each sensor 4122 is amplified by an amplifying unit 4123 and is input to each high-pass filter 4161A (to be described below) of the high-pass filter unit 4161.

The high-pass filter unit 4161 has plural high-pass filters 4161A (or band-pass filters using a high frequency band as a pass-band) that can extract a high frequency vibration component of the sensor 4122, and the high frequency component of the output signal of each sensor 4122 that is amplified by the amplifying unit 4123 is extracted by each high-pass filter 4161A. In each high-pass filter 4161A, a cut-off frequency is determined such that a frequency component other than a frequency due to abnormality of the arms 4103L and 4103R (frequency component due to an event other than a contact such as an operation of the actuators Ac4002 to Ac4015) can be removed.

By determining whether the number of times of excess N counted for each sensor 4122 exceeds the predetermined number of times of determination Nj for each sensor 4122 described above, the comparing/determining unit 4164 determines whether there is abnormality in the actuators Ac4002 to Ac4015 of the arms 4103L and 4103R. Specifically, when the number of times of excess N for all of the sensors 4122 is within the predetermined number of times of determination Nj, the comparing/determining unit 4164 determines that there is no abnormality in the actuators Ac4002 to Ac4015 of the arms 4103L and 4103R. When the number of times of excess N for only one sensor 4122 among all of the sensors 4122 exceeds the predetermined number of times of determination Nj, the comparing/determining unit 4164 determines that there is abnormality in the actuators Ac4002 to Ac4015 of the arms 4103L and 4103R. The determination on whether the number of times of excess N exceeds the predetermined number of times of determination Nj substantially corresponds to the determination on whether an event where the difference "D" exceeds the threshold value Dth occurs for every predetermined cycle. That is, the case in which the number of occurrences of an event of excess N exceeds the number of times of determination Nj corresponds to the case in which the event where the difference "D" exceeds the threshold value Dth occurs for every predetermined cycle.

The comparing/determining unit 4164 executes the above determination while changing the number of times of determination Nj according to the operation speed of the arms 4103L and 4103R. That is, in the case where abnormality based on aging is generated in the rotation member such as the actuators Ac 4002 to Ac4015 of the arms 4103L and 4103R or the decelerator and a cyclic abnormal vibration or impact is generated at the time of the operation of the arms 4103L and 4103R, when the operation speed of the arms 4103L and 4103R is fast, the number of times of generating the cyclic abnormal vibration increases, and when the operation speed of the arms 4103L and 4103R is slow, the number of times of generating the cyclic abnormal vibration decreases. For this reason, when the number of times of determination Nj is set to a constant value, erroneous detection of the abnormality is caused depending on the operation speed. Therefore, in this embodiment, the comparing/determining unit 4164 executes the above determination while changing the number of times of determination Nj according to the operation speed of the arms 4103L and 4103R and prevents the erroneous detection.

Figure 37A:
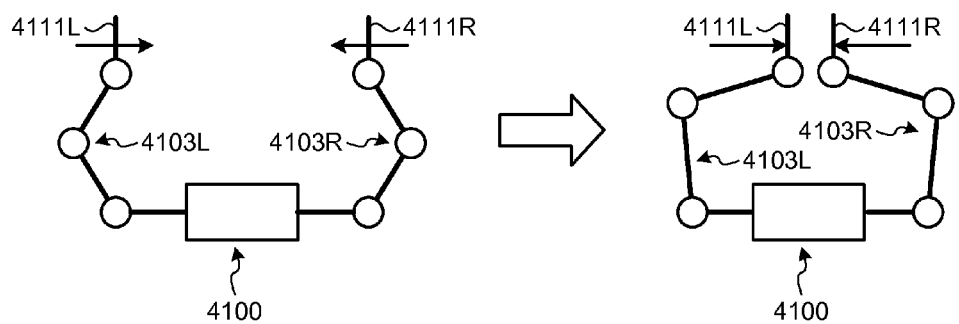
FIGS. 37A and 37B are diagrams illustrating a predetermined operation that is executed by arms according to the fourth embodiment in a state in which there is no abnormality and an output value V of a sensor during the predetermined operation.
Figure 37B:
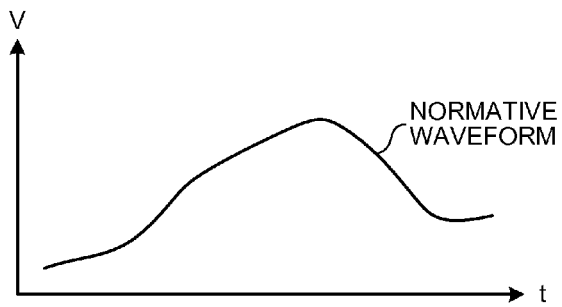

FIGS. 37A and 37B are diagrams illustrating a predetermined operation that is executed by the arms 4103L and 4103R according to the fourth embodiment in a state in which there is no abnormality and an output value V of the sensor 4122 during the predetermined operation.

FIG. 37A schematically illustrates an example of the predetermined operation that is executed by the arms 4103L and 4103R in a state in which there is no abnormality. In the example illustrated in FIG. 37A, in a state in which there is no abnormality in the arms 4103L and 4103R at the time of instructing and in an environment in which the product P to be the grip object does not exist and there is no obstacle around in the robot 4100 (within the movable range of the arms 4103L and 4103R), that is, in a state in which an object does not contact the arms 4103L and 4103R, a predetermined operation according to the position instruction from the robot controller 4150, that is, an operation from the instructed operation start position (position illustrated at the left side of FIG. 37A) to the instructed operation completion position (position illustrated at the right side of FIG. 37A) is executed. The operation completion position is set to the position where the hands 4111L and 4111R can grip a minimum portion of the product P conveyed by the belt conveyor 4002.

FIG. 37B illustrates an example of the normative waveform that is recorded in the normative waveform recording unit 4163 to correspond to the operation illustrated in FIG. 37A, in which a horizontal axis indicates time t and a vertical axis indicates an output value V of the sensor 4122. In the example illustrated in FIG. 37B, in the normative waveform recording unit 4163, the time history of the output value V of the sensor 4122 while the operation corresponding to the recording section described above and illustrated in FIG. 37A is executed once in a state in which there is no abnormality in the arms 4103L and 4103R is recorded as the normative waveform. The normative waveform can always be recorded, when there is no abnormality in the arms 4103L and 4103R. In this embodiment, an example of the case where the normative waveform is recorded at the time of instructing the predetermined operation with respect to the robot 4100 will be described.

Figure 38A:
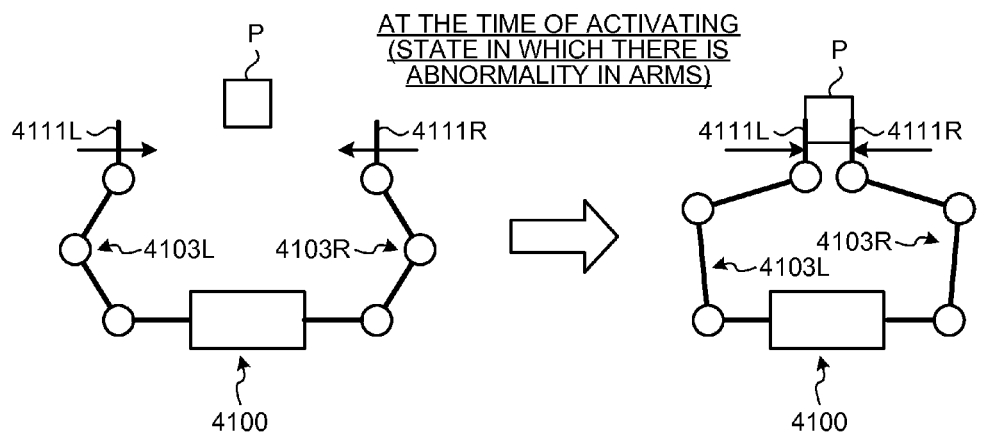
FIGS. 38A and 38B are diagrams illustrating a predetermined operation that is executed by the arms according to the fourth embodiment at the time of activating and an output value V of a sensor during the predetermined operation
Figure 38B:
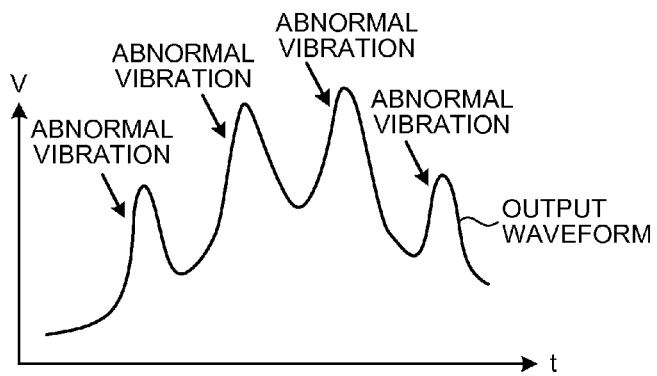

FIGS. 38A and 38B are diagrams illustrating a predetermined operation that is executed by the arms 4103L and 4103R according to the first embodiment at the time of activating and an output value V of the sensor 4122 during the predetermined operation.

FIG. 38A schematically illustrates an example of the predetermined operation that is executed by the arms 4103L and 4103R according to the fourth embodiment at the time of activating. In the example illustrated in FIG. 38A, when the product P to be a grip object does not exist in a movable range at the time of activating (for example, immediately after starting conveyance of the product P or at the time of stopping the conveyance and performing checking), in a state in which abnormality based on aging is generated in the rotation member such as the actuators Ac 4002 to Ac4015 of the arms 4103L and 4103R or the decelerator, a predetermined operation according to the position instruction from the robot controller 4150, that is, an operation from the instructed operation start position (position illustrated at the left side of FIG. 38A) to the instructed operation completion position (position illustrated at the right side of FIG. 38A) is executed. In the example that is illustrated in FIG. 38A, the case where the arms 4103L and 4103R perform the predetermined operation when the product P to be the grip object does not exist in the movable range as described above is illustrated. Therefore, similar to the case of FIG. 37A, the operation from the operation start position to the operation completion position is executed without gripping the product P by the hands 4111L and 4111R. Although not illustrated in the drawings, when the product P to be the grip object exists, the arms 4103L and 4103R is operated from the operation start position to the inner side more than both sides of the product P on the belt conveyor 4002. If the product P contacts the arms 4103L and 4103R, the arms 4103L and 4103R stop the operation at the corresponding position such that the product P is gripped by the hands 4111L and 4111R.

FIG. 38B illustrates an example of the normative waveform that is recorded in the output waveform recording unit 4167 to correspond to the operation illustrated in FIG. 38A, in which a horizontal axis indicates time t and a vertical axis indicates an output value V of the sensor 4122. In the example illustrated in FIG. 38B, in the output waveform recording unit 4167, the time history of the output value V of the sensor 4122 while the arms 4103L and 4103R execute the operation illustrated in FIG. 38A once in a state in which abnormality based on aging is generated in the rotation member such as the actuators Ac4002 to Ac4015 or the decelerator is recorded as an output waveform. As in this case, when abnormality based on aging is generated in the rotation member such as the actuators Ac4002 to Ac4015 of the arms 4103L and 4103R or the decelerator is recorded as an output waveform, an abnormal place cyclically appears in a rotation phase. For this reason, when the arms 4103L and 4103R are operated, a cyclic abnormal vibration or impact is easily generated. In general, when the cyclic abnormal vibration or impact is generated in the arms 4103L and 4103R, the impact force due to the cyclic abnormal vibration or impact is transmitted to the arms 4103L and 4103R, and the output value V of the sensor 4122 increases as compared with the case where the cyclic abnormal vibration or impact is not generated. Therefore, when abnormality based on aging is generated in the rotation member such as the actuators Ac4002 to Ac4015 or the decelerator is recorded as an output waveform, a section where the output value V of the sensor 4122 increases cyclically exists in the output waveform. In the output waveform that is illustrated in FIG. 38B, sections of four places where the output value V of the sensor 4122 increases cyclically exist.

Figure 39A:
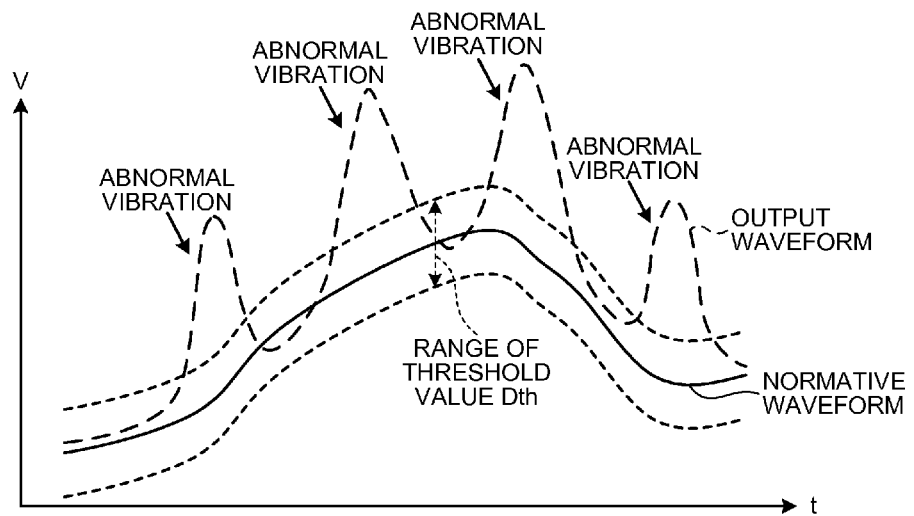
FIGS. 39A and 39B are diagrams illustrating an example of a method of detecting whether there is abnormality in the arms according to the fourth embodiment.
Figure 39B:
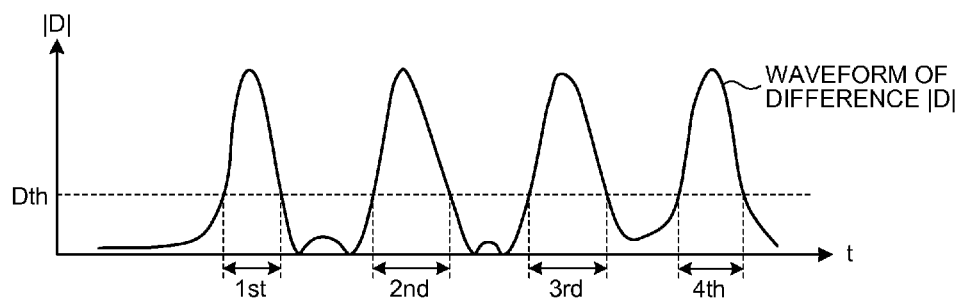

FIGS. 39A and 39B are diagrams illustrating an example of a method of detecting whether there is abnormality in the arms 4103L and 4103R. FIG. 39A illustrates the normative waveform corresponding to FIG. 37B and the output waveform corresponding to FIG. 38B, in which a horizontal axis indicates time t and a vertical axis indicates an output value V of the sensor 4122. FIG. 39B illustrates a waveform of a time-series change of the difference "D", in which a horizontal axis indicates time t and a vertical axis indicates the difference "D".

In FIGS. 39A and 39B, as described above, when there is abnormality in the arms 4103L and 4103R, a section where the output value V of the sensor 4122 increases cyclically exists in the output waveform. Therefore, by comparing the two waveforms of the normative waveform at the time of instructing recorded in the normative waveform recording unit 4163 and the output waveform at the time of activating recorded in the output waveform recording unit 4167 in a state where there is no abnormality in the arms 4103L and 4103R, the cyclic change of the output waveform with respect to the normative waveform can be detected. Therefore, it can be detected whether there is abnormality in the actuators Ac4002 to Ac4015 of the arms 4103L and 4103R. That is, by determining whether the number of times of excess N where the difference "D" of the normative waveform and the output waveform exceeding the threshold value Dth when the arms 4103L and 4103R execute the predetermined operation once exceeds the number of times of determination Nj according to the operation speed of the arms 4103L and 4103R, it can be determined whether there is abnormality in the actuators Ac4002 to Ac4015. Specifically, when the number of times of excess N is within the number of times of determination Nj, it can be determined that there is no abnormality in the actuators Ac4002 to Ac4015. When the number of times of excess N exceeds the number of times of determination Nj, it can be determined that there is abnormality in the actuators Ac4002 to Ac4015. In the examples that are illustrated in FIGS. 39A and 39B, the number of times of excess N is "4" as described above. Therefore, when the number of times of determination Nj is "3" or less, it is determined that there is abnormality in the actuators Ac4002 to Ac4015.

Figure 40:
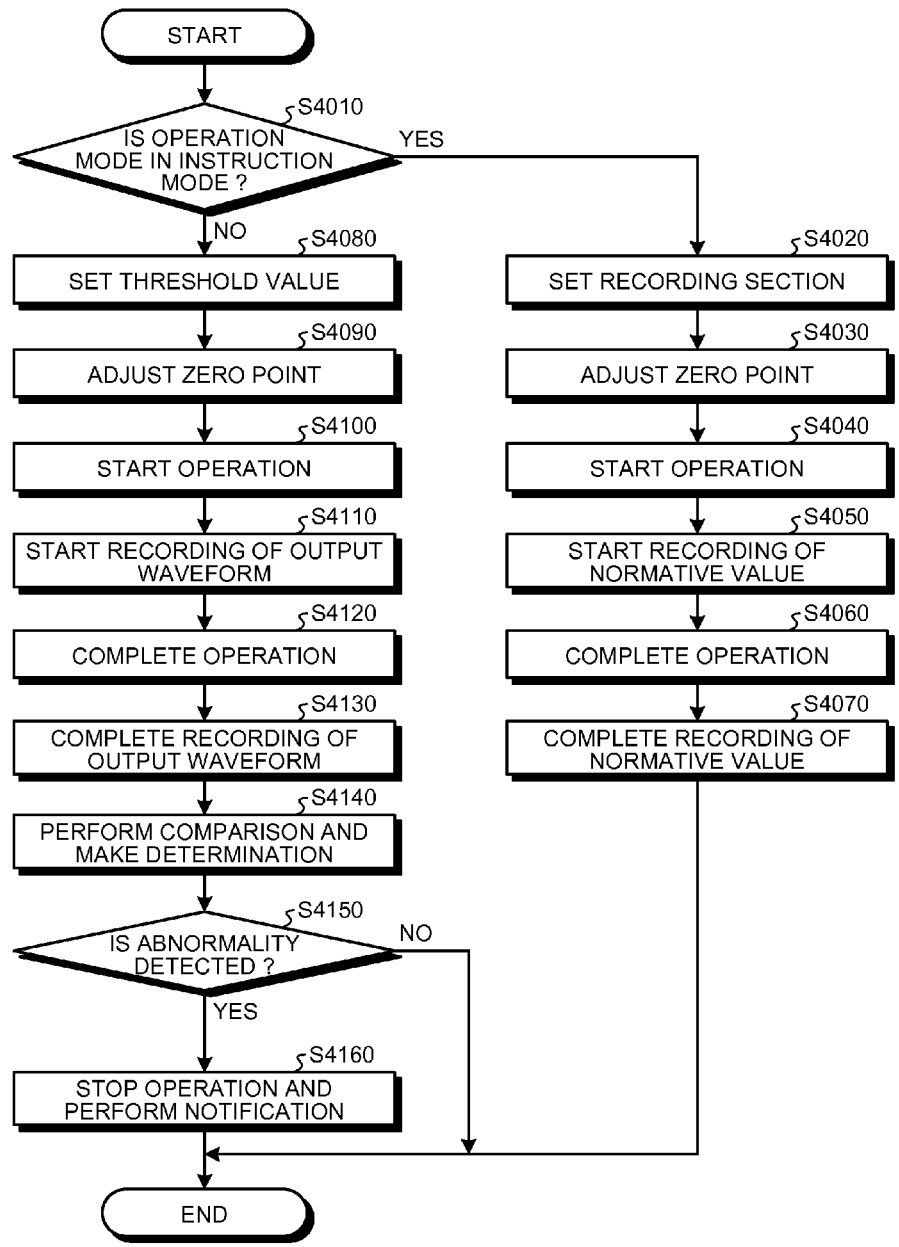
FIG. 40 is a flowchart illustrating a control sequence of an abnormality detecting method of the robot that is executed by the robot controller according to the fourth embodiment.

FIG. 40 is a flowchart illustrating a control sequence based on a robot abnormality detecting method that is executed by the robot controller 4150 according to the fourth embodiment.

In FIG. 40, a process that is illustrated in a flow is started when a predetermined operation start manipulation is executed through the input device. First, in step S4010, the robot controller 4150 determines whether an operation mode of the robot 4100 is an "instruction mode" to perform instructing or an "activation mode" to perform activating, on the basis of input information input through the input device. When the operation mode of the robot 4100 is the "instruction mode", the determination result of step S4010 is satisfied and the process proceeds to step S4020.

In step S4020, the robot controller 4150 sets the recording section in the section setting unit 4162, on the basis of the input information input through the input device.

Then, in step S4030, the robot controller 4150 outputs the reset signal to each sensor 4122 and adjusts a zero point of each sensor 4122, in the zero point adjusting unit 4165.

Then, the process proceeds to step S4040 and the robot controller 4150 outputs a position instruction with respect to each of the actuators Ac4001 to Ac4015, which is calculated in the operation instructing unit 4151 on the basis of the instruction information (information indicating the operation start position and the operation completion position) with respect to each of the arms 4103L and 4103R instructed through the input device, to each of the actuators Ac4001 to Ac4015, and starts the predetermined operation (refer to FIG. 37A) according to the position instruction in the arms 4103L and 4103R, in a state in which there is no abnormality in the arms 4103L and 4103R and an object does not contact the arms 4103L and 4103R.

Then, in step S4050, the robot controller 4150 starts recording of the normative waveform for each sensor 4122, in the normative waveform recording unit 4163. Therefore, while the predetermined operation corresponding to the recording section set in step S4020 and started in step S4040 is executed in a state in which there is no abnormality in the arms 4103L and 4103R and an object does not contact the arms 4103L and 4103R, the normative waveform recording unit 4163 records the time history of the output value V of each sensor 4122 which is based on the high frequency vibration component amplified by the amplifying unit 4123 and extracted by each high-pass filter 4161A as the normative waveform for each sensor 4122.

If the arms 4103L and 4103R are operated until the operation completion position, the process proceeds to step S4060 and the robot controller 4150 completes the operations of the arms 4103L and 4103R.

Then, in step S4070, the robot controller 4150 completes recording of the normative waveform for each sensor 4122, in the normative waveform recording unit 4163. The robot controller 4150 ends the process that is illustrated in the flow. The process that is illustrated in the flow is executed by the robot controller 4150, whenever the predetermined operation start manipulation is executed through the input device.

Meanwhile, in step S4010, when the operation mode of the robot 4100 is the "activation mode", the determination result of step S4010 is not satisfied and the process proceeds to step S4080.

In step S4080, the robot controller 4150 sets the threshold value Dth in the threshold value setting unit 4166, on the basis of the input information input through the input device.

Then, the process proceeds to step S4090 and the robot controller 4150 adjusts a zero point of each sensor 4122 in the zero point setting unit 4165, similar to step S4030.

Then, in step S4100, the robot controller 4150 outputs a position instruction with respect to each of the actuators Ac4001 to Ac4015, which is calculated in the operation instructing unit 4151 on the basis of the instruction information (information indicating the operation start position and the operation completion position) with respect to each of the arms 4103L and 4103R instructed through the input device, to each of the actuators Ac4001 to Ac4015, and starts the predetermined operation (refer to FIG. 38A) according to the position instruction in the arms 4103L and 4103R, when the product P to be the grip object does not exist within the movable range of the arms 4103L and 4103R.

Then, the process proceeds to step S4110 and the robot controller 4150 starts recording of the output waveform for each sensor 4122, in the output waveform recording unit 4167. Therefore, while the predetermined operation started in step S4040 is executed by the arms 4103L and 4103R when the product P to be the grip object does not exist within the movable range of the arms 4103L and 4103R, the output waveform recording unit 4167 records the time history of the output value V of each sensor 4122 based on the high frequency vibration component amplified by the amplifying unit 4123 and extracted by each high-pass filter 4161A as the output waveform for each sensor 4122.

Then, if the arms 4103L and 4103R are operated until the operation completion position, the process proceeds to step S4120 and the robot controller 4150 completes the operations of the arms 4103L and 4103R.

Then, the process proceeds to step S4130 and the robot controller 4150 completes recording of the output waveform for each sensor 4122, in the output waveform recording unit 4167.

Then, in step S4140, the robot controller 4150 compares the two waveforms of the normative waveform recorded in the normative waveform recording unit 4163 and the output waveform in the output waveform recording unit 4167 for each sensor 4122, for each sensor 4122 in the comparing/determining unit 4164, and calculates the difference "D" for each sensor 4122. The robot controller 4150 counts the number of times of excess N where the difference "D" calculated for each sensor 4122 exceeds the threshold value Dth set in step S4080 when the arms 4103L and 4103R executes the predetermined operation started in step S4100 and completed in step S4120 once, for each sensor 4122. By determining whether the number of times of excess N counted for each sensor 4122 exceeds the number of times of determination Nj set according to the operation speed of the arms 4103L and 4103R for each sensor 4122, it is determined whether there is abnormality in the actuators Ac4002 to Ac4015 of the arms 4103L and 4103R. Specifically, when the number of times of excess N for all of the sensors 4122 is within the predetermined number of times of determination Nj, it is determined that there is no abnormality in the actuators Ac4002 to Ac4015 of the arms 4103L and 4103R. When the number of times of excess N for only one sensor 4122 among all of the sensors 4122 exceeds the predetermined number of times of determination Nj, it is determined that there is abnormality in the actuators Ac4002 to Ac4015 of the arms 4103L and 4103R.

Then, the process proceeds to step S4150 and the robot controller 4150 determines whether it is determined in step S4140 that there is abnormality in the actuators Ac4002 to Ac4015. When it is determined that there is no abnormality in the actuators Ac4002 to Ac4015, the determination result of step S4150 is not satisfied and the process that is illustrated in the flow ends. Meanwhile, when it is determined that there is abnormality in the actuators Ac4002 to Ac4015, the determination result of step S4150 is satisfied and the process proceeds to step S4160.

In step S4160, the robot controller 4150 intercepts the output of the position instruction from the operation instructing unit 4151 to the smoothing processing unit 4153 in the position instruction intercepting unit 4152, outputs the torque instruction Tref generated by the servo unit 4154 to each of the actuators Ac4001 to Ac4015, stops the operation instructed to the arms 4103L and 4103R, and notifies an external device of the abnormality of the arms 4103L and 4103R in a notifying unit (not illustrated in the drawings).

In the above description, the sequence of steps S4050 and S4070 corresponds to a normative data recording sequence that is described in claims, the sequence of steps S4110 and S4130 corresponds to an output data recording sequence, and the sequence of step S4140 corresponds to a comparing/determining sequence.

As described above, in the robot system 4001 according to this embodiment, in the normative data recording unit 4163, the time history of the output value V of each sensor 4122 while the arms 4103L and 4103R execute the predetermined operation in a state in which the object does not contact the arms is recorded as the normative waveform. In the output data recording unit 4167, the time history of the output value V of each sensor 4122 while the arms 4103L and 4103R execute the predetermined operation at the time of activating is recorded as the output waveform. By comparing the normative waveform recorded in the normative data recording unit 4163 and the output waveform recorded in the output data recording unit 4167 (determining whether the number of times of excess N exceeding the number of times of determination Nj), the determining unit 4164 determines whether there is abnormality in the arms 4103L and 4103R (in the above example, abnormality in the actuators Ac4002 to Ac4015 provided in the arms 4103L and 4103R).

In this case, when abnormality based on aging is generated in the rotation member such as the actuators Ac4002 to Ac4015 or the decelerator is recorded as an output waveform, an abnormal place cyclically appears in a rotation phase. For this reason, when the arms 4103L and 4103R are operated, a cyclic abnormal vibration or impact is easily generated. The abnormal vibration or the impact can be detected using the sensor 4122 having the high natural frequency. Therefore, in this embodiment, since the cyclic change of the output waveform with respect to the normative waveform can be detected by comparing the two waveforms of the normative waveform in a state in which there is no abnormality in the arms 4103L and 4103R and the output waveform at the time of activating, it can be detected whether there is abnormality in the actuators Ac4002 to Ac4015 of the arms 4103L and 4103R. Therefore, reliability of the robot system 4001 can be improved. As a result, the operation of the arms 4103L and 4103R can be stopped on the basis of generation or non-generation of the abnormality or the abnormality can be notified to the outside to quickly perform maintenance work.

In this embodiment, particularly, when the number of times of excess N where the difference "D" of the output waveform and the normative waveform of each sensor 4122 exceeds the predetermined threshold value Dth when the arms 4103L and 4103R execute the predetermined operation once exceeds the predetermined number of times of determination Nj, the comparing/determining unit 4164 determines that there is abnormality in the actuators Ac4002 to Ac4015. Thereby, since the cyclic change of the output waveform with respect to the normative waveform can be securely detected, it can be detected with high precision whether there is abnormality in the actuators Ac4002 to Ac4015. By setting the predetermined threshold value Dth as a determination value of generation or non-generation of the abnormality, erroneous detection based on disturbance can be suppressed.

In this embodiment, particularly, the comparing/determining unit 4164 perform the above determination while changing the number of times of determination Nj according to the operation speed of the arms 4103L and 4103R. Thereby, the erroneous detection can be prevented from being generated due to the change in the operation speed, and it can be detected with high precision whether there is abnormality in the actuators Ac4002 to Ac4015.

In this embodiment, particularly, the robot controller 4150 has the threshold value setting unit 4166 that sets the threshold value Dth. Since the threshold value setting unit 4166 can set an arbitrary value as the threshold value Dth according to a specification or an activation environment of the robot 4100, the robot controller 4150 can suppress the erroneous detection based on the disturbance and can detect whether there is abnormality in the actuators Ac4002 to Ac4015 with high precision.

In this embodiment, particularly, the robot controller 4150 has the section setting unit 4162 that sets the recording section where the time history of the output value V of each sensor 4122 is recorded as the normative waveform by the normative data recording unit 4163. By the section setting unit 4162, a section where the arms 4103L and 4103R execute an arbitrary operation can be set as the recording section. In this way, if the section where the same operation as the predetermined operation executed by the arms 4103L and 4103R is executed os set as the recording section, and the normative waveform is recorded, it is possible to detect whether there is abnormality in the actuators Ac4002 to Ac4015 at the time of activating. Since a normative waveform can be recorded for each different operation, a normative waveform can be recorded to correspond to each of various operations executed by the arms 4103L and 4103R at the time of activating.

In this embodiment, particularly, the robot controller 4150 has the zero point adjusting unit 4165 that adjusts a zero point of each sensor 4122, whenever the arms 4103L and 4103R execute the predetermined operation corresponding to the recording section set by the section setting unit 4162. By the zero point adjusting unit 4165, an influence of the temperature drift of each sensor 4122 can be suppressed and abnormality detection precision can be prevented from being lowered. In particular, when the arms 4103L and 4103R repeat the predetermined operation at the time of activating, zero point adjustment is performed for each operation. Therefore, the influence of the temperature drift can be securely suppressed.

In this embodiment, particularly, the force sensor that has a piezoelectric body that has a natural frequency higher than that of the structural material (metallic material such as iron or aluminum in the above example) forming each portion of the arms 4103L and 4103R is used as each sensor 4122. Thereby, the high frequency abnormal vibration or the impact that is generated in the structural material of each portion of the arms 4103L and 4103R due to abnormality based on aging of the rotation member such as the actuators Ac4002 to Ac4015 of the arms 4130L and 4130R or the decelerator can be detected, and it can be detected with high precision whether there is abnormality in the actuators Ac4002 to Ac4015.

The fourth embodiment has been described. However, the embodiment may be implemented by various different embodiments other than the fourth embodiment. Therefore, the various different embodiments are hereinafter described as modifications.

(1) Case where the Robot is Applied to Detection of a Contact of an Object

In the above embodiment, the robot disclosed in the present application is applied to the detection of abnormality in the arms 4103L and 4103R. However, the embodiment is not limited thereto and the robot disclosed in the present application may be applied to detection of a contact of an object to the arms 4103L and 4103R.

In this modification, the comparing/determining unit of the contact detecting unit (not illustrated in the drawings) of the robot controller 4150 detects whether the robot 4100 is in a normal state or an abnormal state, on the basis of the output value V (output signal) of each sensor 4122 of the sensor units 4120L and 4120R. In this specification, a state in which the object does not contact the arms 4013L and 4103R is defined as a normal state and a state in which the object contacts the arms 4013L and 4103R is defined as an abnormal state. Therefore, a subject that can be recognized as a thing is defined as an object. Accordingly, examples of the object include a product P to be gripped by the robot 4100, the robot 4100 itself, a work apparatus such as the belt conveyor 4002, a part of a building such as a wall, and an organism such as a living body. That is, in this modification, the comparing/determining unit of the contact detecting unit detects whether the object contacts the arms 4103L and 4103R, on the basis of the output value V (output signal) of each sensor 4122 of the sensor units 4120L and 4120R.

In this case, as described above, each sensor 4122 of the sensor units 4120L and 4120R detects the force that is applied to the arms 4103L and 4103R. Examples of the force that is applied to the arms 4103L and 4103R include the internal force that is generated by the operation of the arms 4103L and 4103R and the external force that is applied to the arms 4103L and 4103R from the outside. The external force is not applied to the arms 4103L and 4103R when the arms 4103L and 4103R are operated in a state in which the object does not contact the arms 4103L and 4103R. Therefore, each sensor 4122 detects only the vibration due to the internal force. Meanwhile, when the object contacts the arms 4103L and 4103R, the internal force and the external force are applied to the arms 4103L and 4103R. Therefore, each sensor 4122 detects the vibrations due to the internal force and the external force. For this reason, when the object contacts the arms 4103L and 4103R, the output value V of the sensor 4122 increases by the amount corresponding to the external force. Therefore, in this modification, the comparing/determining unit of the contact detecting unit compares the output data of the output value V (specifically, output value V of the sensor 4122 based on the high frequency vibration component extracted by the high-pass filter unit 4161) when the arms 4103L and 4103R execute the predetermined operation at the time of activating and the normative waveform previously recorded as the time history of the output value V (specifically, output value V of the sensor 4122 based on the high frequency vibration component extracted by the high-pass filter unit 4161) of the sensor 4122 while the arms 4103L and 4103R execute the predetermined operation in a state in which the object does not contact the arms, and determines whether the object contacts the arms 4103L and 4103R.

Figure 41:
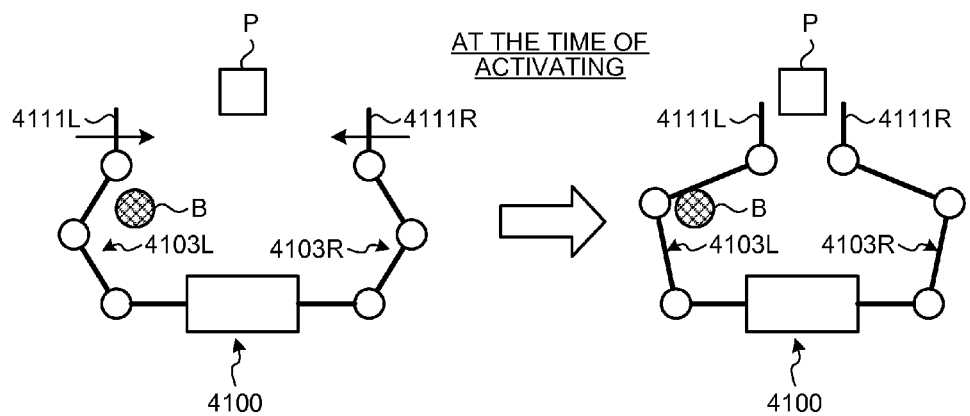
FIG. 41 is a schematic view illustrating a predetermined operation that is executed by the arms at the time of activating, in a modification that is applied to detection of a contact of an object.

FIG. 41 schematically illustrates an example of the predetermined operation that is executed by the arms 4103L and 4103R at the time of activating. In the example that is illustrated in FIG. 41, at the time of activating, under an environment in which an obstacle B exists around the robot 4100 (within the movable range of the arms 4103L and 4103R), the arms 4103L and 4103R perform the predetermined operation according to the position instruction from the robot controller 4150, that is, the operation from the instructed operation start position (position illustrated at the left side of FIG. 41) to the instructed operation completion position. At this time, the contact detecting unit determines whether the object contacts the arms 4103L and 4103R, using the above method. The arms 4103L and 4103R are operated from the operation start position to the inner side more than both sides of the product P on the belt conveyor 4002 (not illustrated in FIG. 41). When the contact detecting unit detects the contact of the object (obstacle B in this example) with respect to the arms 4103L and 4103R while the arms 4103L and 4103R execute the operation until the operation completion position, the robot controller 4150 stops the operation of the arms 4103L and 4103R at the corresponding position (position illustrated at the right side of FIG. 41).

In this example, the case where the contact of the obstacle B with respect to the arms 4103L and 4103R is detected and the operation is stopped when the contact is detected is described. However, the embodiment is not limited thereto and the contact of the product P with respect to the arms 4103L and 4103R may be detected, the operation may be stopped when the contact is detected, and the product P may be gripped by the hands 4111L and 4111R.

Even in this modification, the same effect as that of the above embodiment can be obtained. Since the external force applied to the arms 4103L and 4103R can be detected by the sensor 4122, it can be detected whether the object contacts the arms 4103L and 4103R. As described above, since the sensor 4122 is provided in the bases of the actuators Ac4002 and Ac4009 of the arms 4103L and 4103R closest to the side of the base end, a contact at the side of the front end can be detected. That is, a contact with respect to the entire arms 4103L and 4103R can be detected. Therefore, excessive load can be avoided from being applied to the robot 4100 or the object existing around the robot 4100.

In particular, the robot controller 4150 has the high-pass filter unit 4161 that extracts the high frequency vibration component of the output signal of each sensor 4122, and the comparing/determining unit of the contact detecting unit compares the normative waveform based on the high frequency vibration component extracted by the high-pass filter unit 4161 and the output waveform and determines whether the object contacts the arms 4103L and 4103R. Thereby, since the frequency component due to the contact of the object with respect to the arms 4103L and 4103R can be removed, it can be detected with high precision whether the object contacts the arms 4103L and 4103R.

(2) Case where the Robot is Applied to a Single-Arm Robot

In the above embodiment, the robot disclosed in the present application is applied to the robot 4100 to be the dual-arm robot that has the two arms 4103L and 4103R. However, the embodiment is not limited thereto and the robot disclosed in the present application may be applied to a single-arm robot that has one robot arm. Even in this case, the same effect as that of the above embodiment can be obtained.

In addition to the configuration described above, the configuration where the methods according to the embodiment and the modifications are appropriately combined may be used.

Although not specifically described, this embodiment can be variously changed in a range that does not depart from the sprit and scope of the embodiment.

Next, a fifth embodiment will be described.

In a field of robots, it is preferable to avoid an excessive load from being generated with respect to a robot or an object existing around the robot. For this reason, various technologies for detecting generation or non-generation of a contact (external force) with respect to the robot are studied.

For example, a technology for attaching a force detector to detect the external force to a base end of a robot arm and stopping an operation of the robot arm on the basis of the detection result of the force detector or operating the robot arm in a reduction direction of the external force when the excessive external force is disclosed in Japanese Patent Application Laid-Open (JP-A) No. 2006-21287.

Meanwhile, in the related art, if the operation of the robot arm is stopped after the external force is detected, when the contacted object is operated, the strong impact force may be generated, even though the robot arm is stopped. Even when the robot is operated in a direction where the external force is reduced, a new operation instruction is generated with respect to the robot arm after the external force is detected and the robot arm is operated. For this reason, a response time until the robot arm is operated after a contact (collision) is generated increases.

According to one aspect of the embodiment, a robot system and a robot control device that can detect the external force generated due to a contact of the robot arm and an object existing around the robot arm are provided.

According to this embodiment, even when disturbance due to a ripple of a decelerator included in the actuator is applied to the sensor incorporated in the robot arm, generation or non-generation and a direction of the external force can be detected without erroneously detecting the generation or non-generation of the external force. If the external force is detected, a torque instruction value with respect to the actuator is limited. If the external force exceeds the torque instruction value with respect to each actuator, because the actuator is displaced according to the external force, the impact that is generated due to a rapid load of the external force can be alleviated. Even when the external force is continuously applied to the robot arm, such as when the object existing around the robot arm continuously move to the robot arm, the actuator is displaced according to the external force and the posture of the robot arm is changed. Therefore, the object that exists around the robot arm can be avoided.

Hereinafter, the fifth embodiment will be described with reference to the drawings. This embodiment is an example of the case where a robot system disclosed in the present application is applied to a robot system that performs work such as inspection, sterilization, and milking with respect to a domestic animal, using a robot arm 5002.

Figure 42:
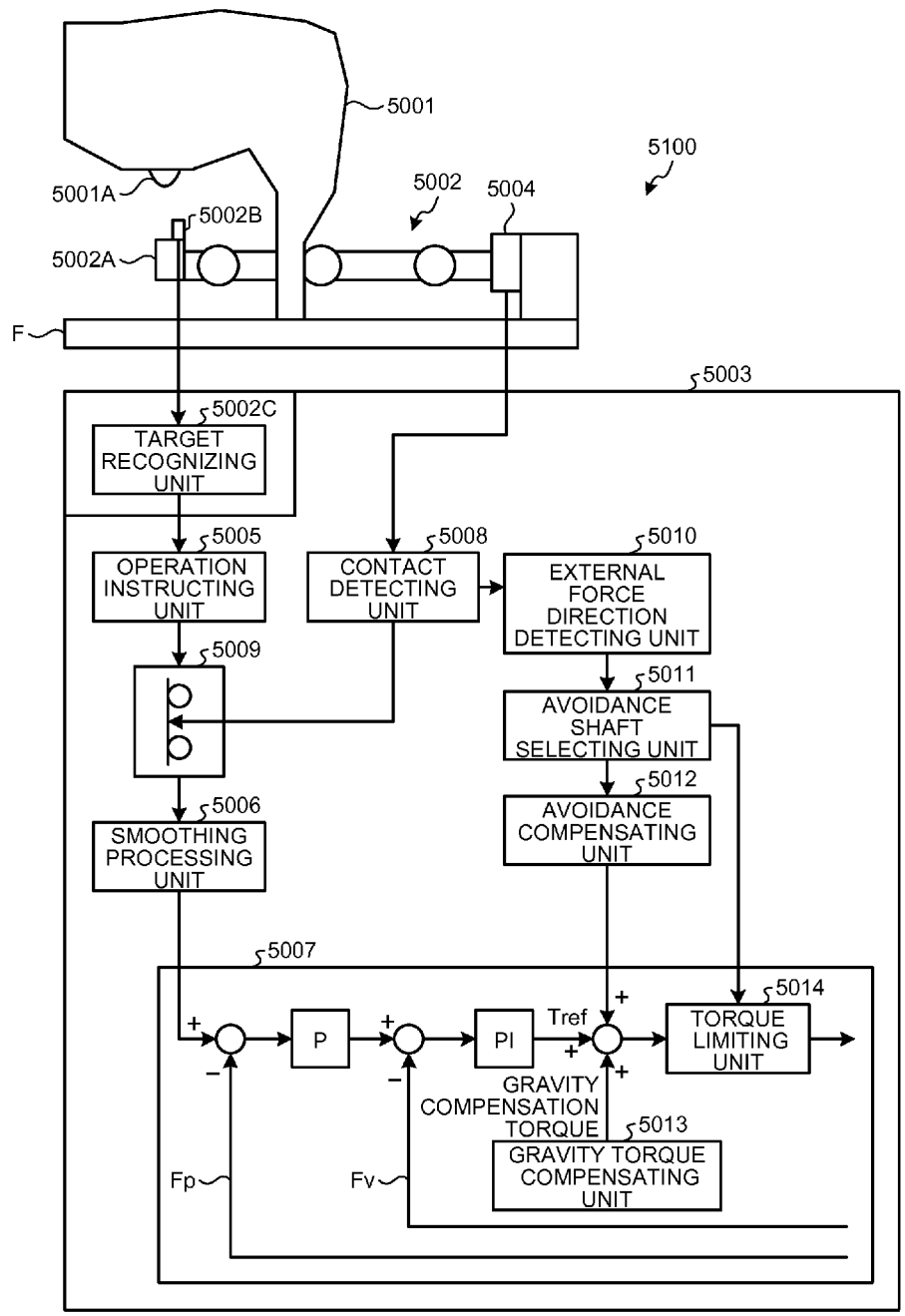
FIG. 42 is a schematic diagram illustrating the entire configuration of a robot system according to a fifth embodiment.

As illustrated in FIG. 42, a robot system 5100 according to this embodiment includes a floor F that receives a domestic animal 5001, a robot arm 5002, a controller 5003, and a sensor unit 5004.

Figure 43:
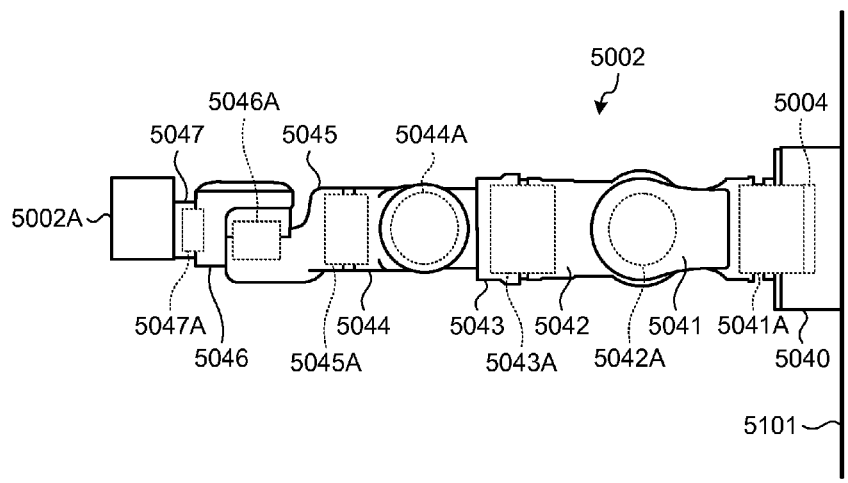
FIG. 43 is a side view illustrating the configuration of a robot according to the fifth embodiment.

As illustrated in FIG. 43, the robot arm 5002 includes a base 5040 fixed to a mounting surface (wall surface, floor, or the like) 5101. The robot arm 5002 further includes a first structural material 5041, a second structural material 5042, a third structural material 5043, a fourth structural material 5044, a fifth structural material 5045, a sixth structural material 5046, and a flange 5047 that are disposed sequentially from the base 5040 to a front end of the robot arm 5002 are connected to one another through actuators (rotation joints) driven to rotate.

The base 5040 and the first structural material 5041 are connected through a first actuator (first joint) 5041A and the first structural material 5041 is rotated by driving of the first actuator 5041A. The first structural material 5041 and the second structural material 5042 are connected through a second actuator (second joint) 5042A and the second structural material 5042 is rotated by driving of the second actuator 5042A.

The second structural material 5042 and the third structural material 5043 are connected through a third actuator (third joint) 5043A and the third structural material 5043 is rotated by driving of the third actuator 5043A. The third structural material 5043 and the fourth structural material 5044 are connected through a fourth actuator (fourth joint) 5044A and the fourth structural material 5044 is rotated by driving of the fourth actuator 5044A.

The fourth structural material 5044 and the fifth structural material 5045 are connected through a fifth actuator (fifth joint) 5045A and the fifth structural material 5045 is rotated by driving of the fifth actuator 5045A. The fifth structural material 5045 and the sixth structural material 5046 are connected through a sixth actuator (sixth joint) 5046A and the sixth structural material 5046 is rotated by driving of the sixth actuator 5046A.

The sixth structure 5046 and the flange 5047 are connected through a seventh actuator (seventh joint) 5047A and the flange 5047 and an end effector 5002A such as a hand that is attached to the flange 5047 are rotated by driving of the seventh actuator 5047A.

Various tools (not illustrated in the drawings) such as an inspector, a milker, and a sterilizer are attached to the end effect 5002A and perform work such as inspection, sterilization, and milking, with respect to a target portion 5001A of the domestic animal 5001.

To the end effector (that is, front end of the robot arm 5002) 5002A, an object detecting sensor (in this embodiment, the object detecting sensor is a camera, but various different sensors can be applied) 5002B is attached.

The object detecting sensor 5002B is aligned to a sufficiently wide detection region including the target portion 5001A of the domestic animal 5001 that moves irregularly in the floor F partitioned in all directions.

An image that is acquired by the object detecting sensor 5002B is input to a target recognizing unit 5002C of the controller 5003 and the target recognizing unit 5002C detects the position of the target portion 5001A of the domestic animal 5001 and inputs the detection result as the target position to an operation instructing unit 5005 to be described below in real time.

In this embodiment, in order to simplify the description, the controller 5003 is illustrated as one control device. However, in actuality, the controller 5003 is configured using plural computers and the target recognizing unit 5002C or an external force detecting unit (to be described below) may be configured using a control device that is separated from the robot controller to control an operation of the robot arm 5002.

Each of the first to seventh actuators 5041A to 5047A is composed of a decelerator-integrated servo motor that has a hollow portion where a cable (not illustrated in the drawings) can be inserted, and the rotation positions of the actuators are input as signals from encoders incorporated in the actuators to the controller 5003 through the cable.

Figure 44:
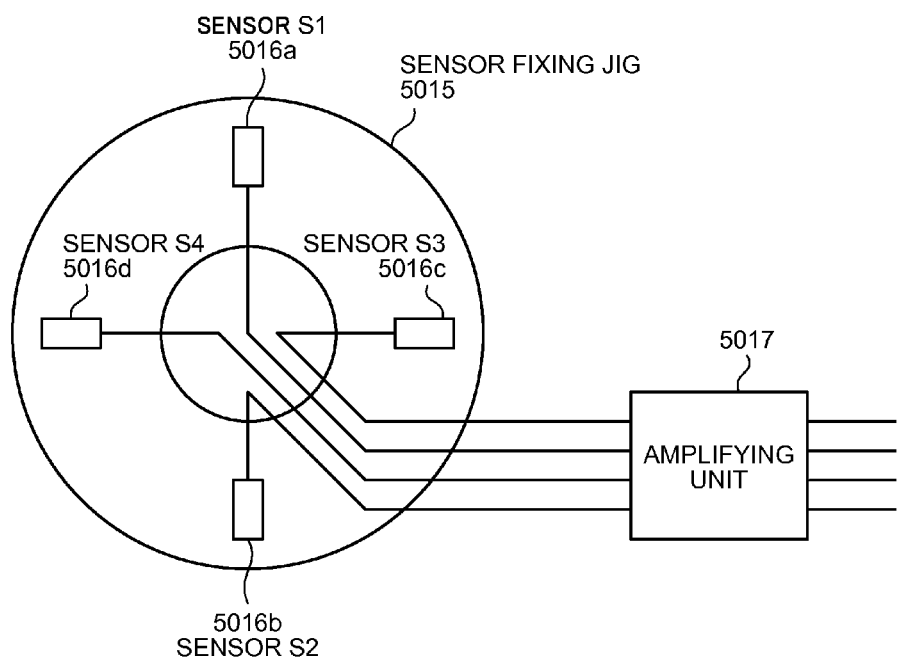
FIG. 44 is a schematic diagram illustrating the configuration of a sensor unit according to the fifth embodiment.

As illustrated in FIG. 44, the sensor unit 5004 includes a sensor fixing jig 5015 and four sensors S1 to S4 and the disk-shaped sensor fixing jig 5015 is attached to an end of a stator of the first actuator 5041A of the robot arm 5002.

Each of the sensors S1 to S4 (5016*a* to 5016*d*) is buried in the disk-shaped sensor fixing jig 5015 and is disposed along the same circle arc (virtual circle) at an equal interval. In each of the sensors S1 to S4, quartz is used as a piezoelectric body. Each of the sensors S1 to S4 detects the amount of strain of a radial direction of the sensor fixing jig 5015 as a voltage, and the obtained voltage is amplified by an amplifying unit 5017 and is input to the controller 5003.

By a crystal oscillator (crystal piezoelectric element) in each of the sensors S1 to S4, a response time is fast as compared with the case where a strain gauge or other piezoelectric element is used, superior responsiveness can be obtained as compared with an operation cycle of a servo unit 5007 to be described below, and the impact by a contact of an object existing around the robot arm can be sufficiently alleviated.

In this embodiment, as described above, the crystal oscillator is used because the response time is fast. However, any device may be applied to each of the sensors S1 to S4, as long as the superior responsiveness is obtained. In the crystal piezoelectric sensor, durability is superior as compared with the strain gauge or a common collision sensor and high-precision detection is enabled even when the sensor unit 5004 is provided in a base end where a load based on the self weight of the robot arm 5002 is largest.

An operation of driving portions that include the actuators 5041A to 5047A of the robot arm 5002 is controlled by the controller 5003.

The controller 5003 is composed of a computer that includes a storage device, an electronic operator, and an input device (all of which are not illustrated in the drawings), and is connected to each driving portion of the robot arm 5002 to communicate with each other.

As illustrated in FIG. 42, the controller 5003 has a target recognizing unit 5002C, an operation instructing unit 5005, a smoothing processing unit 5006, a servo unit 5007, a contact detecting unit (external force detecting unit) 5008, a position instruction intercepting unit (operation instruction intercepting unit) 5009, an external force direction detecting unit 5010, an avoidance axis selecting unit 5011, an avoidance compensating unit (friction compensation torque adding unit) 5012, a gravity torque compensating unit (gravity compensation torque adding unit) 5013, and a torque limiting unit 5014 as components.

As described above, the target recognizing unit 5002C calculates the position of the target portion 5001A of the domestic animal 5001, on the basis of the detection result of the object detecting sensor 5002B, and the position of the target portion 5001A is transmitted as the target position to the operation instructing unit 5005.

As a method that recognizes the position of the target portion 5001A by the target recognizing unit 5002C, various methods may be applied.

The operation instructing unit 5005 calculates a position instruction (operation instruction) with respect to each of the actuators Ac5041 to Ac5047, on the basis of the input of the target position from the target recognizing unit 5002C, and pools the position instruction to the smoothing processing unit 5006.

In the smoothing processing unit 5006, the pooled position instruction is sequentially given to the side of the servo unit 5007 for every operation cycle T (mm/sec).

The servo unit 5007 has a joint angle feedback circuit Fp based on a detection value of the encoder of each of the actuators 5041A to 5047A and a joint angle feedback circuit Fv based on an angular speed detection value obtained from the detection value of the encoder of each of the actuators 5041A to 5047A, for each of the actuators Ac1001 to Ac1015. The servo unit 5007 outputs the torque instruction Tref for every operation cycle T.

The contact detecting unit 5008 detects whether the domestic animal 5001 and the robot arm 5002 contact, on the basis of an output of the sensor unit 5004.

Figure 45:
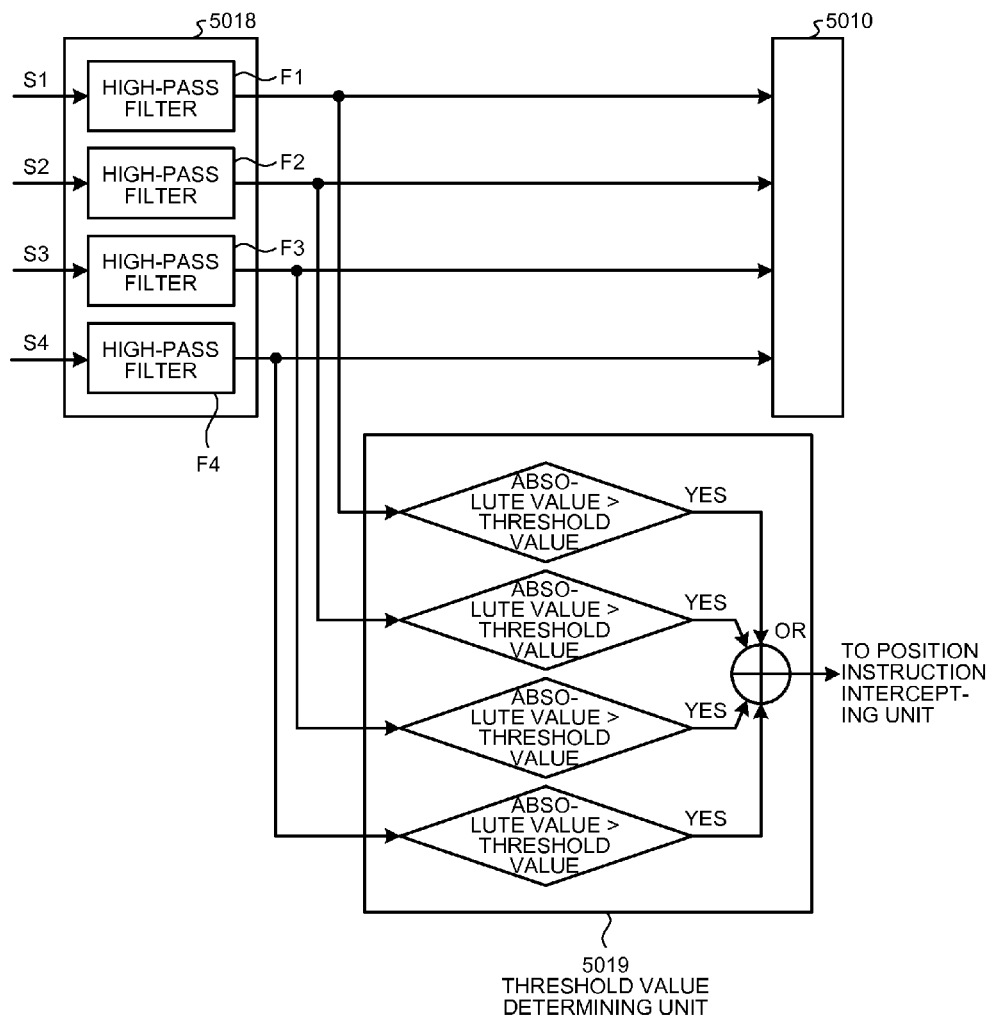
FIG. 45 is a block diagram illustrating the functional configuration of a contact detecting unit according to the fifth embodiment.

The configuration of the contact detecting unit 5008 will be described in detail. As illustrated in FIG. 45, the contact detecting unit 5008 has a high-pass filter unit 5018 and a threshold value determining unit 5019.

The high-pass filter unit 5018 has high-pass filters (or band-pass filters) F1 to F4 that extract only high frequency components with respect to the sensor signals from the amplifying units 5017 of the sensor units 5004, and separates a signal component due to the external force and transmits the signal component to the external force direction detecting unit 5010.

With respect to adjustment of each of the high-pass filters F1 to F4, a contact experiment (for example, the robot arm is beat by a hammer) is performed in advance, a frequency of a detection signal of each of the sensors S1 to S4 when the external force is generated by a contact is measured, and a cutoff frequency of each filter is determined to remove a frequency component other than the frequency due to the external force.

In this way, a signal component included in the detection signal of each of the sensors S1 to S4 due to a factor of disturbance generated in the robot arm 5002, such as a ripple of a decelerator incorporated in each of the actuators 5041A to 5047A, and a signal component due to the external force based on a contact with a peripheral object or the robot arm can be separated from each other.

The threshold value determining unit 5019 determines whether an absolute value of the detection signal (after passing through the high-pass filters F1 to F4) of each of the sensors S1 to S4 exceeds a predetermined threshold value (adjusted by a collision experiment). When an absolute value of any one of the detection signals of the sensors S1 to S4 exceeds the threshold value, the threshold value determining unit 5019 determines that the contact is generated (external force is generated).

When it is detected by the threshold value determining unit 5019 that the contact is generated, the position instruction intercepting unit 5009 (refer to FIG. 42) is operated, transmission of the position instruction from the operation instructing unit 5005 to the smoothing processing unit 5006 is intercepted, the position instruction that is transmitted to the servo unit 5007 is decreased by the smoothing processing unit 5006, and transmission of the position instruction with respect to the servo unit 5007 is intercepted.

If the transmission of the position instruction with respect to the servo unit 5007 is intercepted, a value of the torque instruction Tref that is output by the feedback decreases and the robot arm 5002 is quickly stopped.

Figures 46, 47:
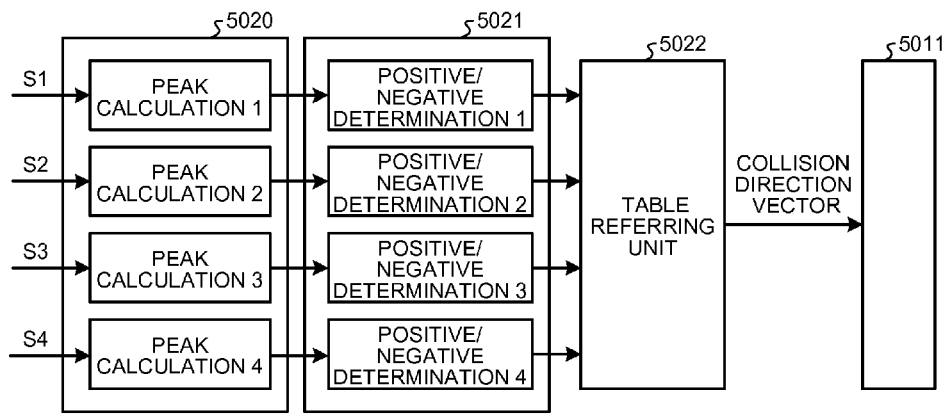
FIG. 46 is a block diagram illustrating the functional configuration of an external force direction detecting unit according to the fifth embodiment.
FIG. 47 is a schematic view illustrating table data according to the fifth embodiment.

As illustrated in FIG. 46, the external force direction detecting unit 5010 has a peak calculating unit 5020, a positive/negative determining unit 5021, and a table referring unit 5022 as components.

The peak calculating unit 5020 calculates a peak value of an impact wave, with respect to a detection signal for each of the sensors S1 to S4 output from the high-pass filter unit 5018. The peak value is a maximum value of an absolute value of the detection signal (that is, maximum value in predetermined time).

The positive/negative determining unit 5021 outputs positive/negative (1 or −1) or zero of each peak value to be calculated.

That is, when the absolute value of the peak value is less than the predetermined threshold value, the positive/negative determining unit 5021 outputs zero (determination impossibility).

The table referring unit 5022 calculates torque of a direction where the external force generated by a contact of the domestic animal 5001 is applied (external force direction torque), by referring to a data table previously set to a storage device, with respect to a combination of positive/negative of an impact wave peak of each sensor signal.

Figure 48:
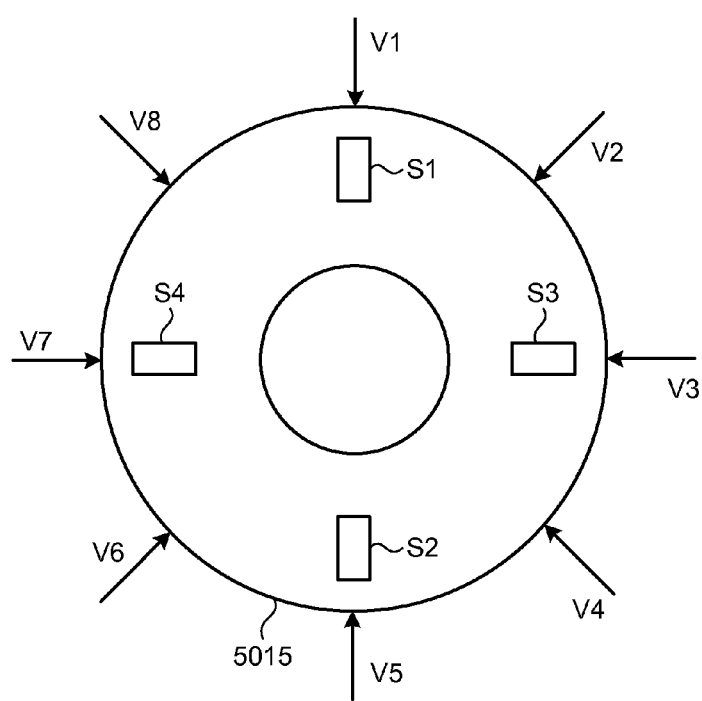
FIG. 48 is a diagram illustrating an arrangement relationship of sensors and external force direction vectors according to the fifth embodiment.

The data table may be configured as a matrix in which the combination of positive/negative of the detection signal for each of the sensors S1 to S4 and the external force direction are associated with each other, as illustrated in FIGS. 47 and 48.

As such, by referring to the data table and the combination of the positive/negative of the detection signal for each of the sensors S1 to S4, collision directions (in this embodiment, eight directions) can be broadly calculated using the plural sensor signals, from the positive/negative of the impact wave peak at the time of colliding. Since the sensor unit 5004 is attached to the side of the base 5040 of the robot arm 5002, the collision directions can be calculated, even when the contact object such as the domestic animal 5001 contacts the position of the side of the base end as well as a peripheral portion of a front end of the robot arm 5002.

Figure 49:
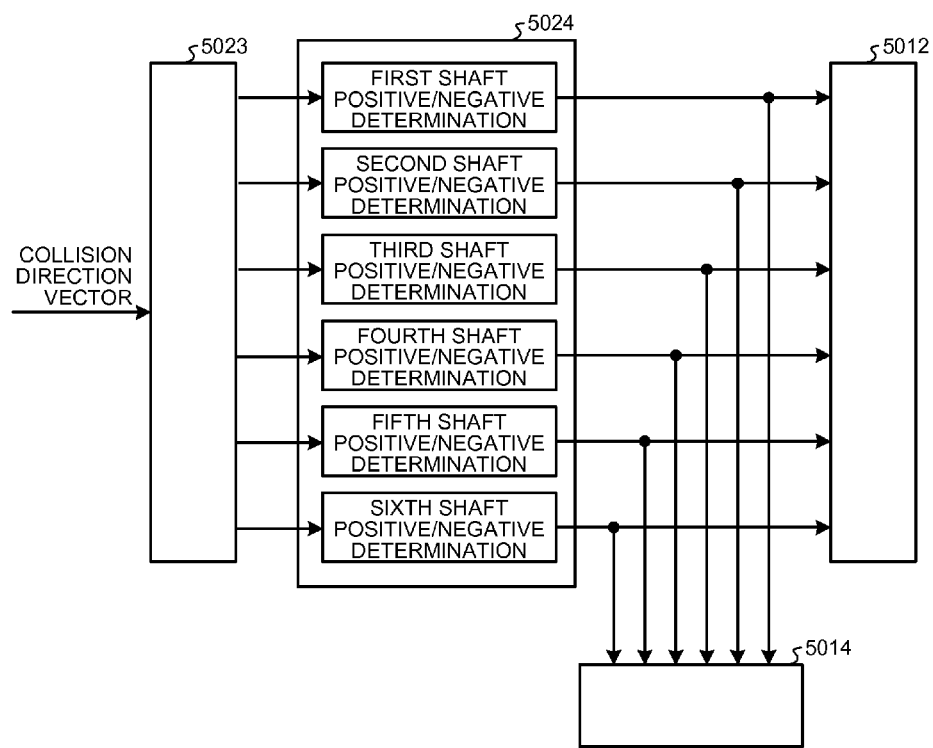
FIG. 49 is a block diagram illustrating the functional configuration of an avoidance axis selecting unit according to the fifth embodiment.

As illustrated in FIG. 49, the avoidance axis selecting unit 5011 has a vector converting unit 5023 and a joint vector positive/negative determining unit 5024 as components.

The vector converting unit 5023 multiplies an external force direction vector described by work coordinates of the robot arm 5002 by a transposed matrix of a Jacobian matrix of the robot arm 5002 and converts the external force direction vector into a vector for each of the actuators 5041A to 5047A.

In this case, since the robot arm 5002 is a redundant manipulator, a vector of the actuator 5043A (redundant axis) can set as zero.

The actuators 5041A and 5042A are set to a first axis and a second axis, respectively, the actuators 5044A to 5047A are set to the third to sixth axiss, and the external force direction vector is converted into each axis vector. When the first to sixth axiss are not specified, these axiss are simply called a axis.

As the Jacobian matrix, a Jacobian matrix with respect to a wrist point of the robot arm 5002 may be calculated, because the domestic animal 5001 and the robot arm 5002 are likely to contact in the vicinity of a wrist of the robot arm 5002.

Instead of the transposed matrix, an inverse matrix may be used. However, it is preferable to use the transposed matrix, because a calculation load of the transposed matrix is smaller than a calculation load of the inverse matrix.

The joint vector positive/negative determining unit 5024 outputs positive/negative (1 or −1) with respect to each component (component of each joint axis) of the external force direction vector converted in a joint space. When an absolute value is less than the predetermined threshold value, the joint vector positive/negative determining unit 5024 outputs zero.

Figure 50:
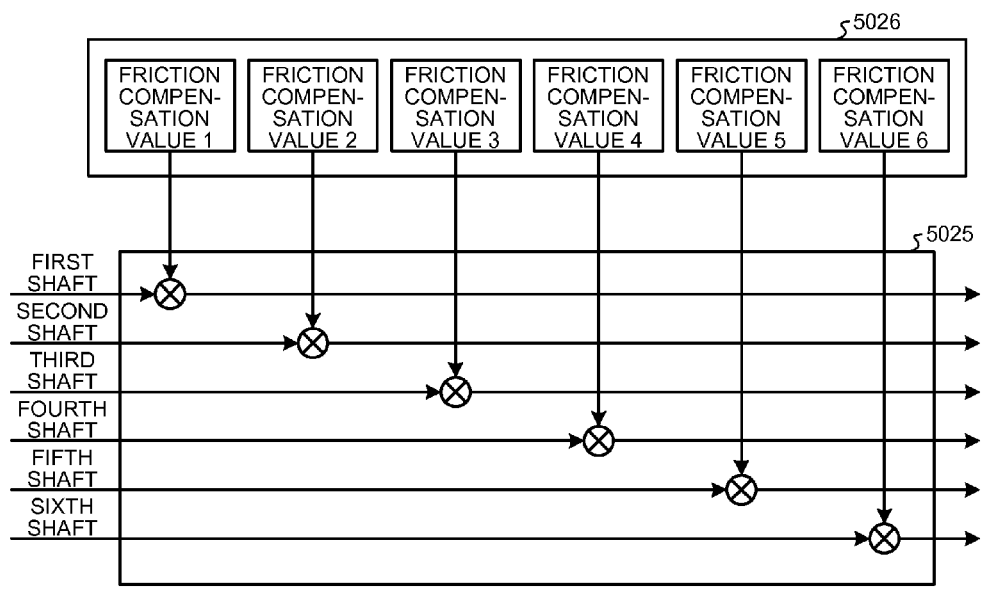
FIG. 50 is a block diagram illustrating the functional configuration of an avoidance compensating unit according to the fifth embodiment.

As illustrated in FIG. 50, the avoidance compensating unit 5012 has a friction compensation vector calculating unit 5025 and a friction compensation value storage unit 5026 as components.

The friction compensation vector calculating unit 5025 multiplies each component (±1 or zero) of the external force direction vector in each joint space output from the avoidance axis selecting unit 5011 by a friction compensation value of each axis and outputs a calculated value.

The friction compensation value of each axis is previously adjusted and a determined value is stored in the friction compensation value storage unit 5026.

When the corresponding axis is completely stopped, the friction compensation value is calculated on the basis of a maximum static friction torque of the actuator corresponding to the axis. When the corresponding axis rotates, the friction compensation value is calculated on the basis of a dynamic friction torque of the actuator corresponding to the axis.

As illustrated in FIG. 42, the friction compensation vector (torque) that is output from the avoidance compensating unit 5012 and the gravity compensation vector are added to the torque instruction Tref in the servo unit 5007.

The gravity compensation torque is calculated by the gravity torque compensating unit 5013. Hereinafter, a sum of the friction compensation torque and the gravity compensation torque is called an avoidance compensation torque Tavo.

A sum of the original torque instruction Tref that is output from the feedback circuit of the servo unit 5007 and the avoidance compensation torque Tavo is input to the torque limiting unit 5014.

An output of the avoidance axis selecting unit 5011 is input to the torque limiting unit 5014 as well as the avoidance compensating unit 5012. With respect to the axis where the output of the avoidance axis selecting unit 5011 is +1 or −1, the torque limiting unit 5014 limits a torque instruction value with respect to the corresponding actuator.

Figure 51:
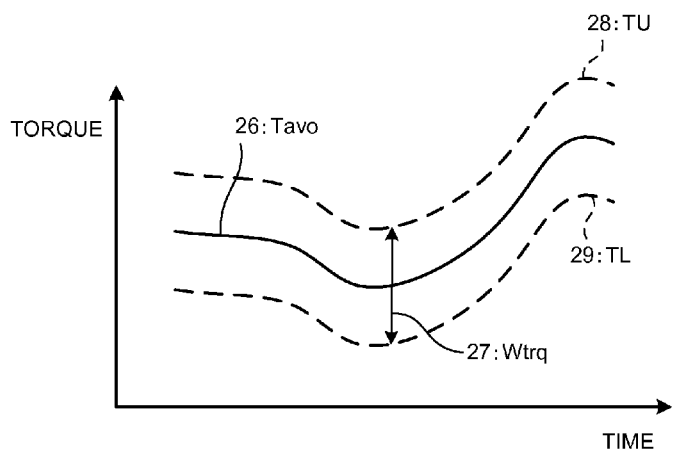
FIG. 51 is a chart illustrating a function of a torque limiting unit according to the fifth embodiment.

As illustrated in FIG. 51, the torque limiting unit 5014 sets the torque instruction value with respect to the corresponding actuator to be limited within a torque limitation width 27 (Wtrp) previously calculated by an experiment, using the avoidance compensation torque 26 (Tavo) as a center value. Therefore, a motor torque is limited between the torque upper limit 28 (TU) and the torque lower limit 29 (TL) and the limited torque is transmitted as a final torque instruction value to each of the actuators 5041A to 5047A.

As described above, the avoidance compensation torque Tavo is the torque to support each actuator by the robot arm 5002 with respect to a moment load by the self weight and (gravity compensation torque) and operate the robot arm 5002 in a direction where the external force is applied with respect to the static friction force or the dynamic friction force of the actuator (friction compensation torque). For this reason, if a value of the torque upper limit 28 (TU) is excessively large, generation of the excessive torque is allowed to cause a load with respect to the robot arm 5002.

Meanwhile, if a value of the torque lower limit 29 (TL) is excessively small, the self weight is not supported and the joint is unintentionally rotated by the gravity.

Therefore, by sufficiently decreasing the torque limitation width Wtrp, the unnecessary force is not applied to the domestic animal 5001, and each joint of the robot arm 5002 can be guided to a direction where the impact or the external force based on the collision is alleviated. The torque limitation value Wtrp is preferably minimized (the difference of the torque upper limit TU and the torque lower limit TL is small). However, the predetermined gravity compensation torque or the predetermined friction compensation torque do not necessarily become an optimal value and may include an error. For this reason, in order to allow the error of the predetermined gravity compensation torque or the predetermined friction compensation torque, the torque limitation width Wtrq that is previously obtained by an experiment needs to be set. By setting the torque limitation width Wtrq, the robot arm 5002 can be stably controlled.

The torque may be limited immediately after the rotation axis is selected and the avoidance compensation torque is fixed.

Since the robot system according to this embodiment has the above-described configuration, at the time of starting the work, the robot system detects the position of the target portion 5001A of the domestic animal 5001 at any time, on the basis of a detection image from the object detecting sensor 5002B, provides the detected position as the target position for every operation cycle to the servo unit 5007, approaches the tool of the end effector to the target portion 5001A even when the position of the target portion 5001A is irregularly changed by the feedback control, and performs the work such as such as inspection, sterilization, and milking with respect to the target portion 5001A of the domestic animal 5001.

When the domestic animal 5001 moves greatly at the time of the work and contacts the robot arm 5002 and the contact (external force) is detected by the contact detecting unit 5008, the position instruction intercepting unit 5009 is operated and intercepts the position instruction from the operation instructing unit 5005 such that the position instruction is not transmitted to the servo unit 5007. Therefore, the robot arm 5002 is stopped.

At this time, since the instruction data held in the smoothing processing unit 5006 is sequentially provided to the servo unit 5007 as described above, generation of the impact by rapid stop of the robot arm 5002 is reduced.

Meanwhile, a sensor output is transmitted from the contact detecting unit 5008 to the external force detecting unit 5010 and the external force direction detecting unit 5010 detects a collision direction of the domestic animal 5001 and the robot arm 5002. The avoidance axis selecting unit 5011 selects a joint axis of the robot arm 5002 to be avoided, on the basis of the detected external force direction vector. The avoidance compensating unit 5012 performs operation compensation with respect to the selected avoidance axis and alleviates the collision. The avoidance axis selecting unit 5011 moves to the torque limiting unit 5014 to limit the torque of the rotation axis.

Thereby, when the domestic animal 5001 and the robot arm 5002 contact, because the robot arm 5002 is actively avoided in an external force direction with high responsiveness under a series of control of the servo unit, the impact at the time of the contact can be alleviated. Since the robot arm 5002 is stopped after being avoided in the external force direction from the contact generation position, the possibility of the domestic animal 5001 and the robot arm 5002 continuously colliding can be lowered.

The torque limiting unit 5014 of the robot control device for the domestic animal in this embodiment limits the avoidance object axis within the torque limitation width Wtrq based on the avoidance compensation torque. Therefore, even when the domestic animal 5001 further moves to the side of the robot arm 5002, the unnecessary force is not applied from the robot arm 5002 to the domestic animal 5001 and the robot arm can be guided to a direction where the impact force is alleviated. The excessive external force is not applied to the domestic animal 5001 and the robot arm 5002 and safety is improved.

In the contact detecting unit 5008 according to this embodiment, the high-pass filter unit 5018 extracts only the high frequency vibration at the time of the collision from the output signal of the sensor unit 5004. Therefore, even when the disturbance such as the ripple of the decelerator is applied to the sensor, the contact of the domestic animal 5001 and the robot arm 5002 can be detected at a high speed and with high sensitivity.

Since the avoidance compensating unit 5012 of the robot control device for the domestic animal in this embodiment adds the avoidance compensation torque to the torque instruction, a response speed can be increased as compared with the case of the avoidance and the compensation using the position instruction.

Next, a sixth embodiment will be described.

A robot system according to this embodiment is different from the robot system according to the fifth embodiment in the configuration of the controller 5003. Therefore, the same portions as those of the fifth embodiment are denoted by the same reference numerals and the overlapped description is omitted.

Figure 52:
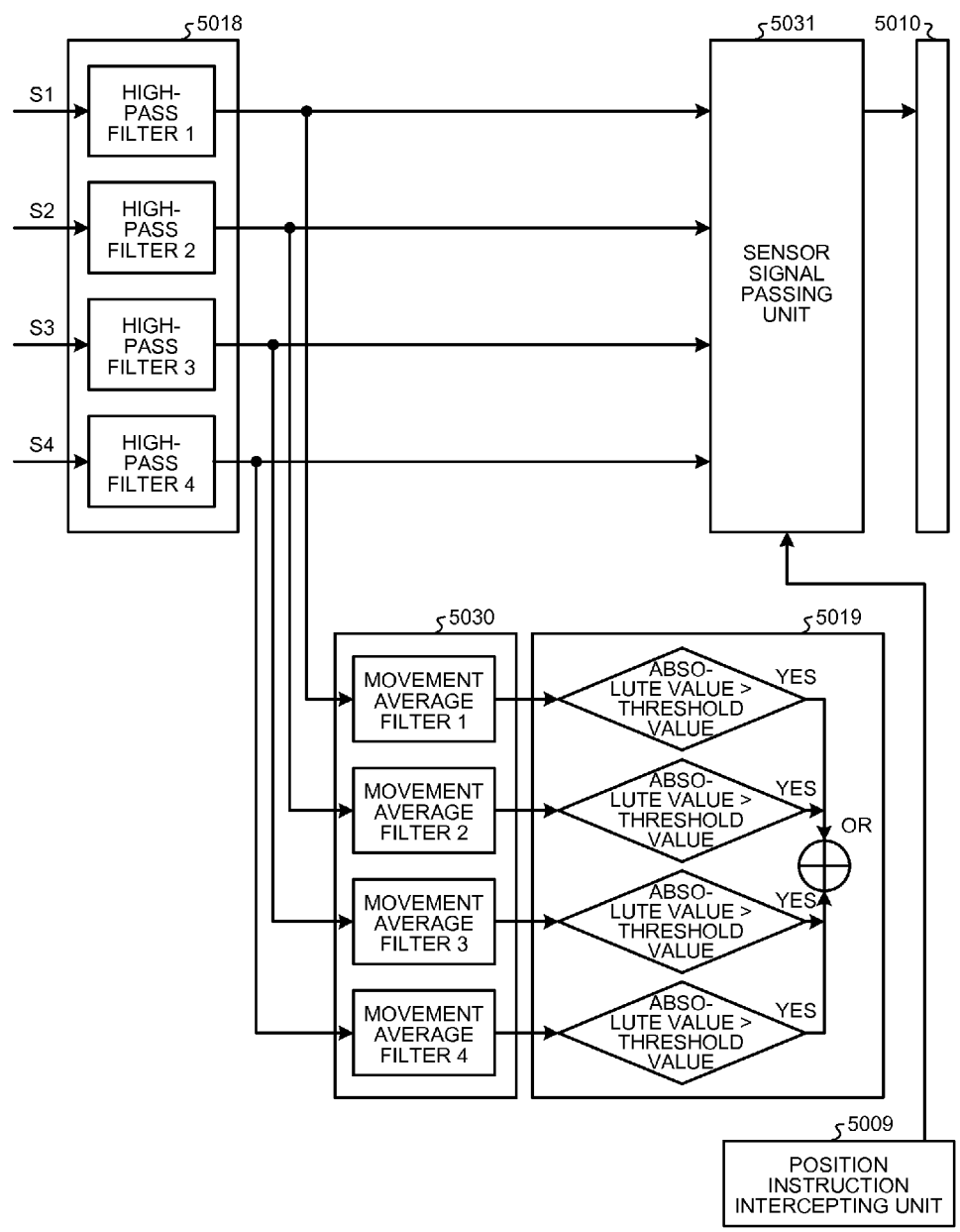
FIG. 52 is a block diagram illustrating a contact detecting unit according to a sixth embodiment.

FIG. 52 is a block diagram illustrating the detailed configuration of a contact detecting unit 5008 according to this embodiment.

In this embodiment, the contact detecting unit 5008 has a moving average filter unit 5030 between the high-pass filter unit 5018 and the threshold value determining unit 5019.

The moving average filter unit 5030 has first to fourth moving average filters that output an average of sensor signals in predetermined time going back from the present time, with respect to the sensor signals output from the high-pass filter unit 5018.

By this configuration, when a disturbance signal such as a servo noise having a frequency component equal to or higher than a signal component of an impact wave passes through the high-pass filters, only the disturbance signal is removed by the moving average filter. As a result, in the case other than the collision, erroneous detection of a contact by the threshold value determining unit 5019 can be avoided. As described above, if the threshold value determining unit 5019 detects the contact, the sensor signal passing unit 5031 is operated at the same time as the operation of the position instruction intercepting unit 5009, and the sensor signal that is output from the high-pass filter unit 5018 is output to the external force direction detecting unit 5010.

Figure 53:
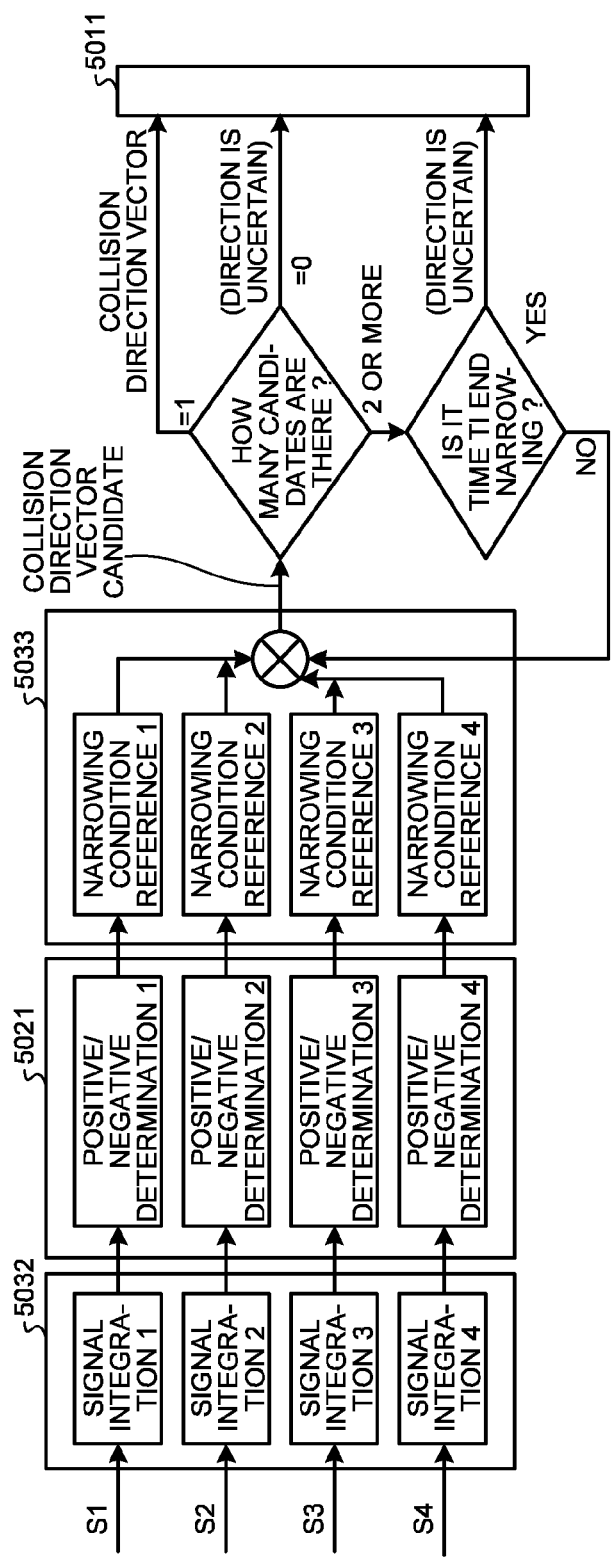
FIG. 53 is a block diagram illustrating an external force direction detecting unit according to the sixth embodiment.

FIG. 53 is a block diagram illustrating the detailed configuration of the external force direction detecting unit 5010 according to this embodiment.

A signal integrating unit 5032 calculates an integration value of the sensor signals input until the present time, with respect to the sensor signals output from the sensor signal passing unit 5031 of FIG. 52. By using the integration value of the signals, the positive/negative change of the signals is smoothened, and certainty of identification of positive/negative at each time is improved.

Figure 54:
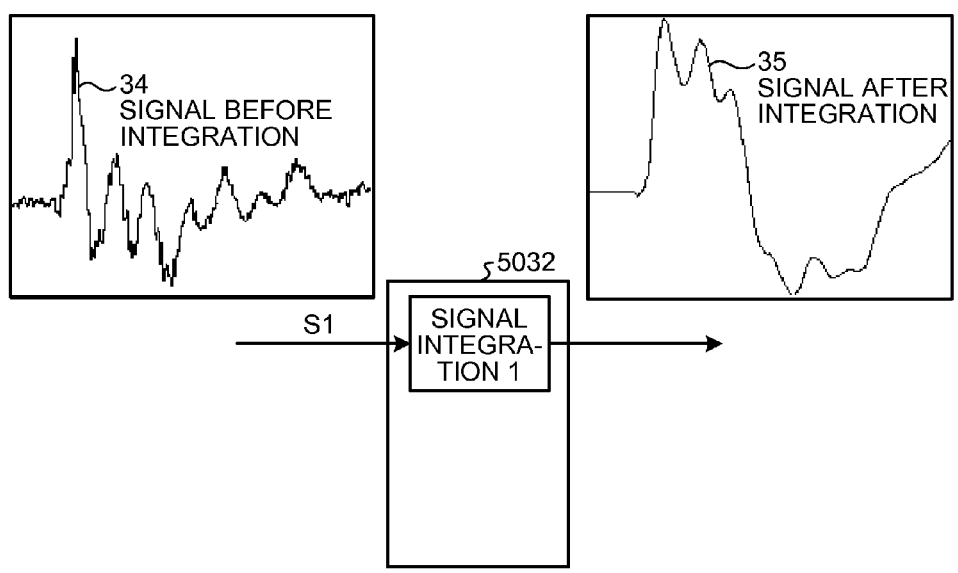
FIG. 54 is a diagram illustrating an example of a signal integration processing result according to the sixth embodiment.

As an example of a signal integration processing result, a signal 34 before the integration is input to the signal integrating unit 5032 and a signal 35 after the integration is obtained, as illustrated in FIG. 54. In the signal 35 after the integration, the frequency in the change in the positive/negative becomes lower than that of the signal 34 before the integration.

A narrowing condition referring unit 5033 calculates a collision direction (external force direction vector) by referring to a predetermined external force direction narrowing condition table (data table), with respect to the positive/negative of each signal integration value output by the positive/negative determining unit 5021.

As illustrated in FIG. 55, the narrowing condition table is data where the positive/negative of each of sensor signal integration values at plural predetermined times and the external force direction vector candidates are associated and is stored in the storage device of the controller 5003.

In an example of FIG. 55, the narrowing condition table is composed of a table at four times of X1 to X4 (X1<X2<X3<X4).

Figure 56:
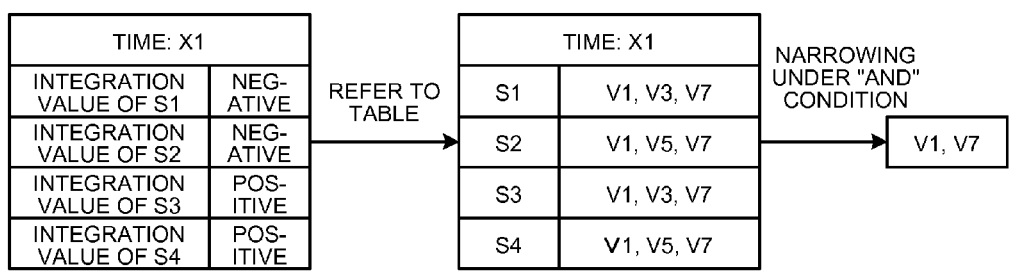
FIG. 56 is a diagram illustrating an example of external force direction narrowing processing according to the sixth embodiment.

An arrangement relationship of the sensors S1 to S4 and the external force direction vectors V1 to V8 is as illustrated in FIG. 48. The narrowing condition referring unit 5033 extracts the external force direction vector candidates that satisfy a condition with respect to positive/negative of each sensor signal integration value at each time. For example, as illustrated in FIG. 56, the case where the combination (negative, negative, positive, and positive) of the positive/negative of the integration values of the sensors S1 to S4 at the time X1 will be described.

When the integration value of the sensor S1 is negative, the external force direction vector candidate becomes any one of the external force direction vectors V1, V3, and V7. When the integration value of the sensor S2 is negative, the external force direction vector candidate becomes any one of the external force direction vectors V1, V5, and V7. At this time, V1 and V7 become both the external force direction vector candidates. Likewise, V1 and V7 become the external force direction vector candidates with respect to the positive/negative of the integration values of the sensors S3 and S4.

If the number of extracted external force direction vectors is 1, the extraction result (external force direction vector) is input to the avoidance axis selecting unit 5011. If the number of external force direction vector candidates is 2 or more, the external force direction vector candidates are calculated using both the extraction result of the external force direction vector candidates at the next time and the extraction result until the current time.

In the case of the above example, the external force direction vector is continuously extracted by referring to the combination of the positive/negative of the integration values at the next time X2 and the narrowing condition table. In this way, narrowing is repeated until the number of external force direction vector candidates becomes 1 or less. By using the sensor signals at the plural times, a detection rate of an external force direction can be improved. When the number of external force direction vector candidates becomes 0 by narrowing or the number of external force direction vector candidates is 2 or more in the case of referring to all of the tables until the predetermined narrowing end time, it is determined that the external force direction is uncertain, and all elements of the external force direction vectors are set to zero and are input to the avoidance axis selecting unit 5011.

Since the robot system according to this embodiment has the above-described configuration, the disturbance that passes through the high-pass filter unit 5018 and is generated in very short time is suppressed by the moving average filter unit 5030, and erroneous detection of contact generation performed by the contact detecting unit 5008 when the object such as the domestic animal and the robot arm 5002 do not contact is suppressed.

The external force direction detecting unit 5010 decreases the frequency in the change in the positive/negative of the signal by the signal integrating unit 5032 and certainty of the identification of the positive/negative at each time is improved. Since the narrowing condition referring unit 5033 refers to the sensor signals at the plural times, the detection rate of the external force direction is improved.

Next, a seventh embodiment will be described.

A robot system according to this embodiment is different from the robot system according to the fifth embodiment in the configuration of the controller 5003. Therefore, the same portions as those of the fifth embodiment are denoted by the same reference numerals and the overlapped description is omitted.

Figure 57:
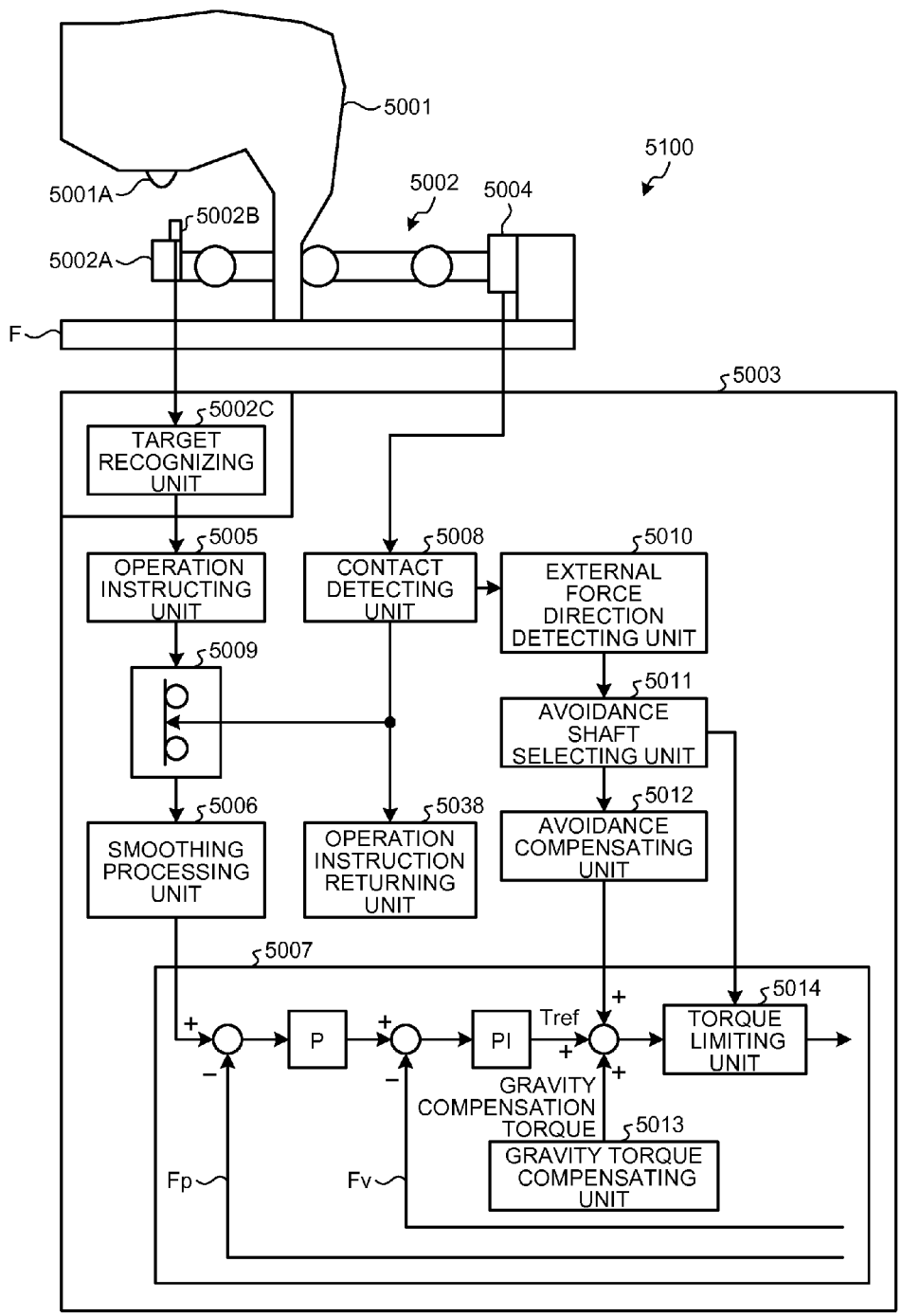
FIG. 57 is a schematic diagram illustrating the entire configuration of a robot system according to a seventh embodiment.

As illustrated in FIG. 57, this embodiment is different from the fifth embodiment in that an operation instruction returning unit 5038 is provided as a component of the controller 5003.

The operation instruction returning unit 5038 releases interception of a position instruction by the position instruction intercepting unit 5009, when the contact detecting unit 5008 does not newly detect the external force within a predetermined period (for example, in predetermined time after a collision avoidance operation), in a state in which the contact detecting unit 5008 detects a contact and a position instruction from the operation instructing unit 5005 is intercepted, and the position instruction from the operation instructing unit 5005 is transmitted to the side of the servo unit 5007 through the smoothing processing unit 5006.

Since the robot system according to the seventh embodiment has the above-described configuration, the robot system previously sets a predetermined period to an optimal value by an experiment. When the domestic animal 5001 and the robot arm 5002 contact during the operation of the robot arm 5002, the robot arm performs an avoidance operation in an external force application direction during the predetermined period and an excessive contact of the domestic animal 5001 and the robot arm 5002 can be prevented. After the predetermined period passes, because the approaching operation with respect to the target portion 5001A is restarted on the basis of the detection result of the object detecting sensor 5002B, even though the contact is generated, the robot arm 5002 is not stopped or the robot arm is stopped in a short time, and the work such as the inspection, the sterilization, and the milking with respect to the domestic animal 5001 can be continuously performed.

That is, it is preferable to stably perform the work with respect to the work object (or position target of the robot) without stopping the work, while a slight contact of the robot arm 5002 and the object existing around the robot arm is allowed, according to an application purpose of the robot system 5100.

In the case of this embodiment, for example, work efficiency may be greatly lowered, if the robot arm 5002 is stopped, whenever the domestic animal 5001 moves with the high frequency and frequently contacts the robot arm 5002. However, if the predetermined period is set, when the domestic animal 5001 and the robot arm 5002 contact, the work is continuously performed by the robot arm 5002 while the robot arm 5002 is made to execute the avoidance operation in the external force direction and the excessive external force (or impact) is suppressed, and work efficiency can suppressed from being lowered due to the contact.

The fifth to seventh embodiments have been described. However, the embodiment may be implemented by various different embodiments other than the fifth to seventh embodiments. Therefore, the various different embodiments are hereinafter described as modifications.

For example, in the above embodiment, the four crystal piezoelectric sensors are buried as the sensor unit 5004 in the sensor fixing jig of the base of the robot. However, the number of sensors may be 3 or less or five or more. The sensors are buried in the sensor fixing jig. However, the sensors may be attached to a surface of the robot. Alternatively, sensor elements other than the crystal piezoelectric sensor may be used.

The maximum number of times of narrowing the external force direction is 4. However, the maximum number of times of narrowing the external force direction may be 3 or less or 5 or more.

The above embodiment is not limited to the case where the work is performed with respect to the domestic animal and may be applied to various purposes. For example, the above embodiment may be applied to a control device in the case where a human being and a robot perform work in cooperation with each other.

Next, an eighth embodiment will be described.

In a multiple joint robot, it may be required to control a robot having a degree of freedom (redundant degree of freedom) higher than a degree of freedom of the required position/posture. That is, since the robot has the redundant degree of freedom, the posture of the manipulator can be variously changed even though the required position/posture is taken with respect to the object. Therefore, by appropriately controlling the redundant degree of freedom, the work can be performed while interference with the manipulator or the object existing around the manipulator is avoided at the time of the work in a relatively narrow place. Japanese Patent Application Laid-Open (JP-A) No. 2007-203380 discloses a method that controls the manipulator having the redundant degree of freedom.

Meanwhile, a large number of manipulators are operated along a previously instructed operation path. According to an application purpose, the work may be performed with respect to a work object where the position is uncertain, such as a moving work object. In this case, the target position/posture of the manipulator is modified on the basis of information of a sensor to detect the position of the work object. Thereby, the work can be performed with respect to the work object while the manipulator follows the work object.

However, in the case where the manipulator has the redundant degree of freedom, in the method in the related art that determines the operation amounts of all of the driving axiss including the redundant degree of freedom by the instruction in advance, when the position of the work object is moved as described above, the position of the redundant degree of freedom does not become necessarily the appropriate position, and interference (contact) with the work object or the manipulator is generated.

The instructed operation path may be changed according to the work object, the manipulator unintentionally may take the singular posture, and a problem may be generated in control of the manipulator.

This problem is generated in the case where an obstacle existing in an operation range of the manipulator moves, the case where an unintentional contact with the manipulator and an object existing around the manipulator is generated, and the case where an operation orbit of the manipulator is changed, in addition to the case where the target position/posture is changed on the basis of the sensor.

According to one aspect of an embodiment, a robot system and a robot control device that can optimally control a manipulator having a redundant degree of freedom are provided.

According to this embodiment, even when the targeted position/posture is changed, a redundant axis of the manipulator can be appropriately set with the small operation amount, and the manipulator having the redundant degree of freedom can be optimally controlled.

Hereinafter, an eighth embodiment will be described with reference to the drawings. This embodiment is an example of the case where the robot system disclosed in the present application is applied to a robot system to perform work such as inspection, sterilization, and milking for a domestic animal, using a manipulator 6002.

Figure 58:
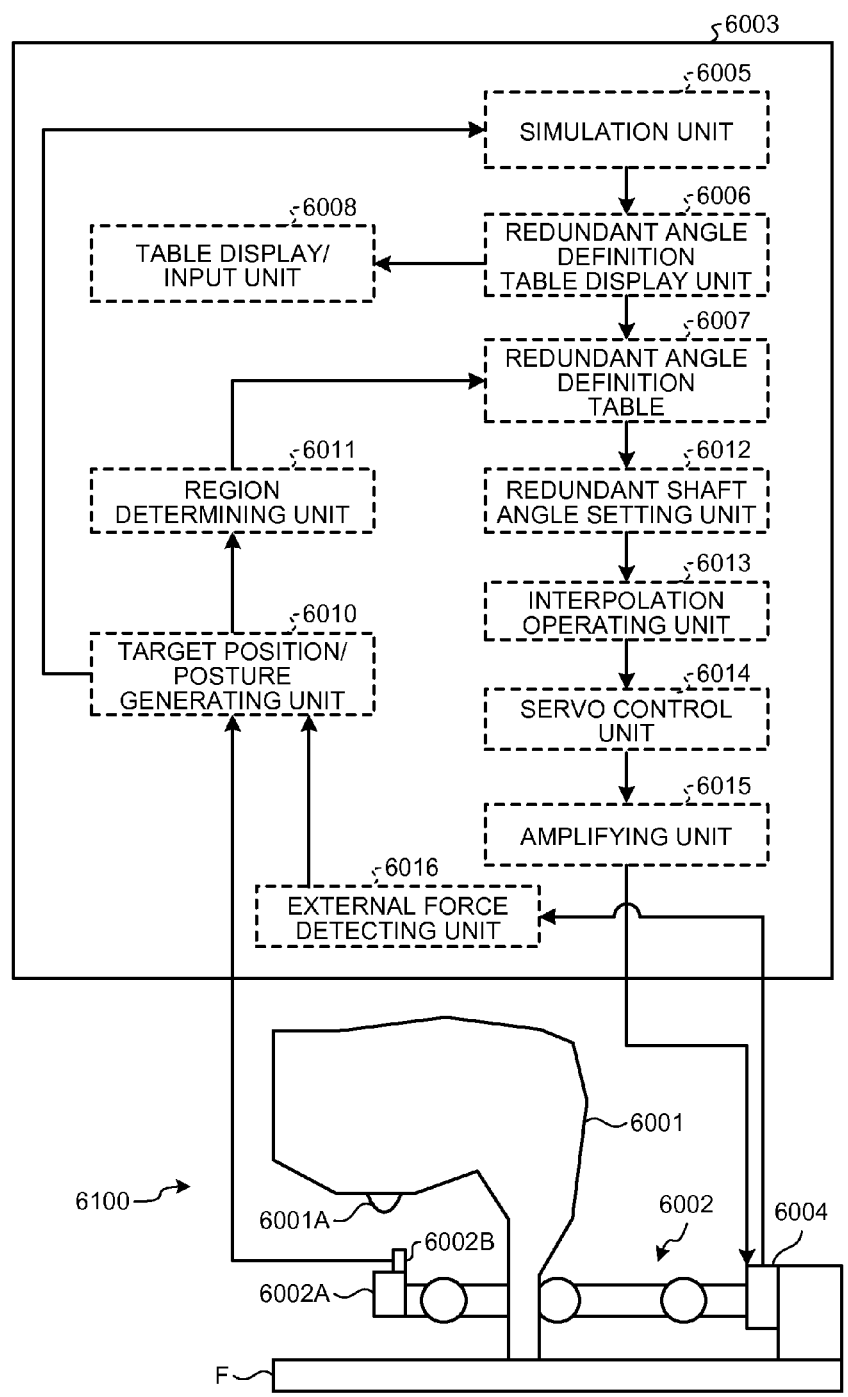
FIG. 58 is a schematic diagram illustrating the entire configuration of a robot system according to an eighth embodiment.

As illustrated in FIG. 58, a robot system 6100 according to this embodiment includes a floor F that receives a domestic animal 6001, a manipulator 6002, a controller 6003, and a sensor unit 6004.

Figure 59:
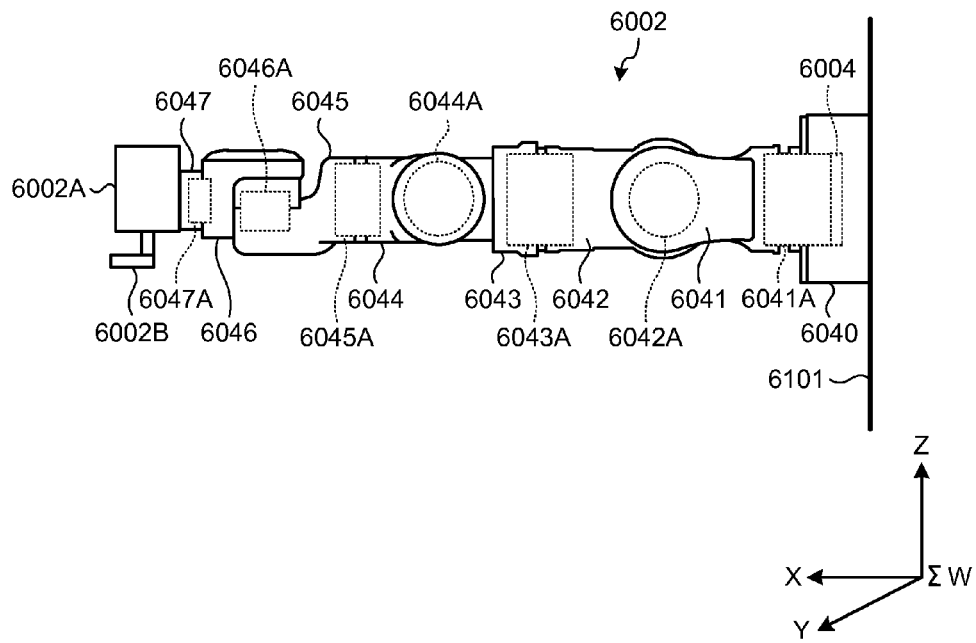
FIG. 59 is a side view illustrating the configuration of a robot according to the eighth embodiment.

As illustrated in FIG. 59, in the manipulator 6002, a base 6040 that is fixed to a mounting surface (wall surface or floor) 6101 and a first structural material 6041, a second structural material 6042, a third structural material 6043, a fourth structural material 6044, a fifth structural material 6045, a sixth structural material 6046, and a flange 6047 that are disposed sequentially from the base 6040 to a front end of the manipulator 6002 are connected through actuators (rotation joint) that are driven to rotate.

The base 6040 and the first structural material 6041 are connected through a first actuator (first joint) 6041A and the first structural material 6041 is rotated by driving of the first actuator 6041A. The first structural material 6041 and the second structural material 6042 are connected through a second actuator (second joint) 6042A and the second structural material 6042 is rotated by driving of the second actuator 6042A.

The second structural material 6042 and the third structural material 6043 are connected through a third actuator (third joint) 6043A and the third structural material 6043 is rotated by driving of the third actuator 5043A.

The third structural material 6043 and the fourth structural material 6044 are connected through a fourth actuator (fourth joint) 6044A and the fourth structural material 6044 is rotated by driving of the fourth actuator 6044A.

The fourth structural material 6044 and the fifth structural material 6045 are connected through a fifth actuator (fifth joint) 6045A and the fifth structural material 6045 is rotated by driving of the fifth actuator 6045A. The fifth structural material 6045 and the sixth structural material 6046 are connected through a sixth actuator (sixth joint) 6046A and the sixth structural material 6046 is rotated by driving of the sixth actuator 6046A.

The sixth structure 6046 and the flange 6047 are connected through a seventh actuator (seventh joint) 6047A, and the flange 6047 and an end effector 6002A such as a hand that is attached to the flange 6047 are rotated by driving of the seventh actuator 6047A.

In this embodiment, the third actuator (third joint) 6043A is previously stored as a redundant axis in a storage region of the controller 6003 (redundant axis setting unit) and the rotation position of the third actuator 6043A is optimally controlled by a function of the controller 6003 to be described below. The actuator 6043A is called the redundant axis, the actuators 6041A and 6042A are called a first axis and a second axis, respectively, and the actuators 6044A to 6047A are called third to sixth axiss, respectively. When the first to sixth axiss are not specified, these axiss are simply called a axis.

Various tools (not illustrated in the drawings) such as an inspector, a milker, and a sterilizer are attached to the end effect 6002A and performs work such as inspection, sterilization, and milking, with respect to a target portion 6001A of the domestic animal 6001. In the case of the manipulator 6002 according to this embodiment, a control point that is the position to control the operation position of the manipulator 6002 is set as a point where the manipulator can be linearly moved by driving of each of the actuators 6044A to 6047A and is positioned in the vicinity of a axis center of the sixth actuator 6046A.

A position relationship of the control point, and the flange 6047, and the end effector 6002A and each tool is previously input to the controller 6003 and the position of each tool can be controlled by controlling the position/posture of the control point.

To the end effector (that is, front end of the robot arm 6002) 6002A, an object detecting sensor (in this embodiment, the object detecting sensor is a camera, but various different sensors can be applied) 6002B is attached.

The object detecting sensor 6002B is aligned to a sufficiently wide detection region including the target portion 6001A of the domestic animal 6001 that moves irregularly in the floor F partitioned in all directions.

An image that is acquired by the object detecting sensor 6002B is input to the target position/posture generating unit 6010 of the controller 6003 and the target position/posture generating unit 6010 detects the position of the target portion 6001A of the domestic animal 6001 and inputs the detection result as the target position to a simulation unit 6005 to be described below in real time.

In this embodiment, in order to simplify the description, the controller 6003 is illustrated as one control device. However, in actuality, the controller 6003 is configured using plural computers and the target position/posture generating unit 6010 or an external force detecting unit (to be described below) may be configured using a control device that is separated from the robot controller to control an operation of the manipulator 6002.

Each of the first to seventh actuators 6041A to 6047A is composed of a decelerator-integrated servo motor that has a hollow portion where a cable (not illustrated in the drawings) can be inserted, and the rotation positions of the actuators are input as signals from encoders incorporated in the actuators to the controller 6003 through the cable.

Figure 60:
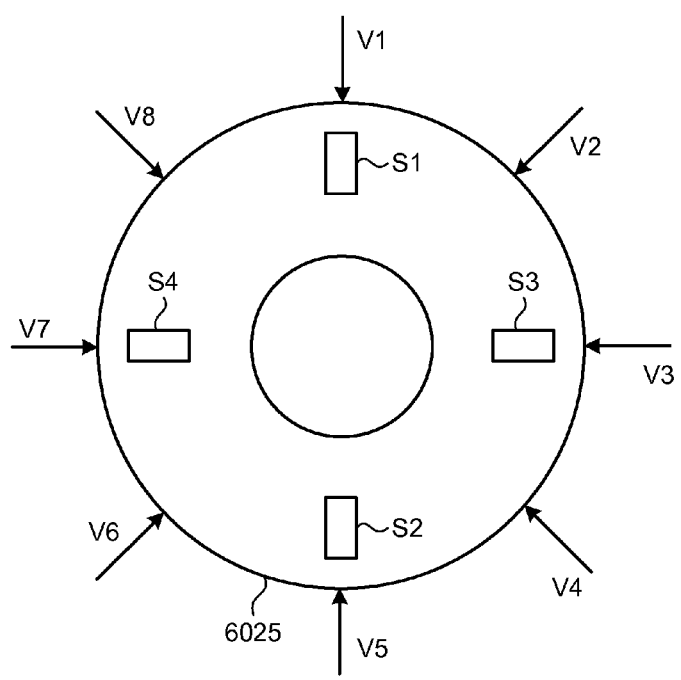
FIG. 60 is a schematic diagram illustrating the configuration of a sensor unit according to the eighth embodiment.

As illustrated in FIG. 60, the sensor unit 6004 includes a sensor fixing jig 6025 and four sensors S1 to S4 and the disk-shaped sensor fixing jig 6025 is attached to a base of a stator of the first actuator 6041A of the manipulator 6002.

Each of the sensors S1 to S4 is buried in the disk-shaped sensor fixing jig 6025 and are disposed along the same circle arc (virtual circle) at an equal interval. In each of the sensors S1 to S4, quartz is used as a piezoelectric body. Each of the sensors S1 to S4 detects the amount of strain of a radial direction of the sensor fixing jig 6025 as a voltage, and the obtained voltage is amplified by an amplifying unit (not illustrated in the drawings) and is input to the controller 6003.

By a crystal oscillator (crystal piezoelectric element) in each of the sensors S1 to S4, a response time is fast as compared with the case where a strain gauge or other piezoelectric element is used, superior responsiveness can be obtained as compared with an operation cycle of a servo control unit 6014 to be described below, and impact based on a contact of an object existing around the manipulator can be sufficiently alleviated.

In this embodiment, as described above, the crystal oscillator is used because the response time is fast. However, any device may be applied to each of the sensors S1 to S4, as long as the superior responsiveness is obtained. In the crystal piezoelectric sensor, durability is superior as compared with the strain gauge or a common collision sensor and high-precision detection is enabled even when the sensor unit 6004 is provided in a base end where a load based on the self weight of the manipulator 6002 is largest.

An operation of driving portions that include the actuators 6041A to 6047A of the manipulator 6002 is controlled by the controller 6003.

The controller 6003 is composed of a computer that includes a storage device, an electronic operator, and an input device (all of which are not illustrated in the drawings), and is connected to each driving portion of the manipulator 6002 to communicate with each other.

As illustrated in FIG. 58, the controller 6003 has a simulation unit 6005, a redundant angle definition table generating unit 6006, a redundant angle definition table 6007, a table display/input unit 6008, a target position/posture generating unit 6010, a region determining unit 6011, a redundant axis angle setting unit 6012, an interpolation operating unit 6013, a servo control unit 6014, an amplifying unit 6015, and an external force detecting unit (avoidance operation executing unit) 6016 as components.

The simulation unit 6005 is configured to generate an operation trace from the current position/posture to the target position/posture, on the basis of information of the position of an obstacle in an operation enabled region of the manipulator to be input in advance, the target position/posture of a control point from the target position/posture generating unit 6010, and the current position/posture of the manipulator 6002 obtained from a detection signal of an encoder of each of the actuators 6041A to 6047A. As an algorism for generating the operation trace, various algorithms may be applied.

The operation trace may be generated by the simulation unit 6005 at the time of an instruction operation of the manipulator 6002. At the time of an automatic operation, a redundant angle may be determined by referring to the redundant angle definition table 6007. By alleviating the load of a CPU, a solution (target position instruction with respect to each of the actuators 6041A to 6047A) can be determined at practical time.

Figure 61:
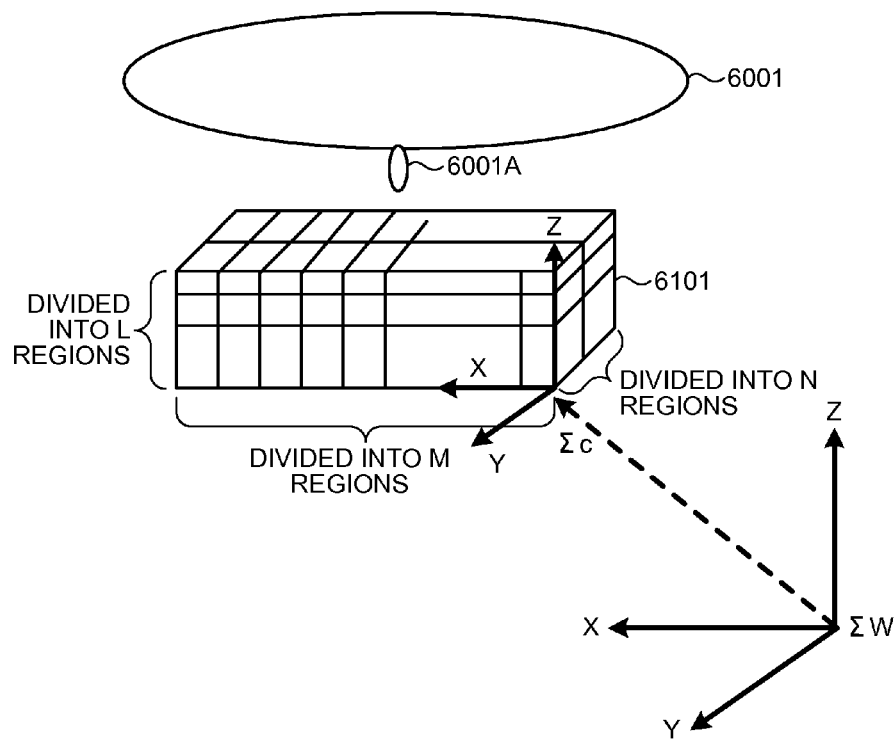
FIG. 61 is a schematic diagram illustrating a region of a three-dimensional space that is defined in a redundant angle definition table according to the eighth embodiment.

On the basis of the input information from the table display/input unit 6008, as illustrated in FIG. 61, the redundant angle definition table generating unit 6006 divides a region 6101 of a three-dimensional space previously set in the operation region of the manipulator 6002 according to a previously executed experiment in consideration of the operation of the manipulator 6002 and an object existing around the manipulator or the domestic animal 6001, and sets divided small regions.

The region 6101 and the small regions (m, n, l) are associated with a simultaneous transformation matrix with a reference coordinate system Σw of the manipulator 6002, with respect to a reference coordinate system Σc. The region 6101 is previously divided into L small regions in a Z direction, N small regions in a Y direction, and M small regions in an X direction, on the basis of the experiment result described above.

Specifically, the redundant angle definition table generating unit 6006 determines the size of the region 6101, according to the variation of the solid of the domestic animal 6001 (for example, the variation of the position of the target portion 6001A or the variation of the position of an obstacle such as legs of the domestic animal 6001). That is, when the variation is large, the region 6101 is set to have a large size, and when the variation is small, the region 6101 is set to have a small size.

Each of the divided small regions Sc (m, n, l) are set to become a rectangular solid. A shape of the small regions Sc (m, n, l) is preferably rectangular, because the operation amount can be suppressed. However, various shapes may be set according to necessity.

In the redundant angle definition table 6007, a parameter to set the position of a redundant axis with respect to each region of the divided region 6101 is associated.

Information of the region 6101, that is, information of positions, dimensions, and shapes of the small regions Sc (m, n, l) and information of the parameters corresponding to the information are displayed on a display device by processing of the table display/input unit 6008 an the information can be input/modified by a worker using the input device.

The target position/posture generating unit 6010 is configured to generate the targeted position/postures of various tools griped by the end effector 6002A of the manipulator 6002, on the basis of input information from the object detecting sensor 6002B and input information from the external force detecting unit 6016 to be described below.

Meanwhile, when the external force detecting unit 6016 detects the external force, the target position/posture generating unit 6010 temporarily stops an operation based on the detection result of the object detecting sensor 6002B and sets the newest target position/posture including a contact avoiding correction value of the target position/posture input from the external force detecting unit 6016 as the target position/posture.

The region determining unit 6011 selects the small region S of the redundant angle definition table 6007 from the small regions Sc (m, n, l), on the basis of the output of the target position/posture generating unit 6010 and the output of the redundant angle definition table 6007.

When it is determined that the small corresponding to the output of the target position/posture generating unit 6010 does not exist in the small regions Sc (m, n, l), the region determining unit 6011 outputs an abnormal signal to the object detecting sensor 6002B, and avoidance work such as focal adjustment is executed at the side of the object detecting sensor 6002B.

Alternatively, When it is determined that the small corresponding to the output of the target position/posture generating unit 6010 does not exist in the small regions Sc (m, n, l), an error warning message may be displayed by a display device of the controller 6003.

The redundant axis angle setting unit 6012 sets the angle (target position) of the redundant axis, on the basis of the parameter of the redundant angle definition table 6007 corresponding to the region selected by the region determining unit 6011.

The interpolation operating unit 6013 performs an interpolation operation with respect to an operation aspect (or including the operation speed) of each of the actuators 6041A to 6047A until the target position/posture from the current position where an inverse kinematics operation is not executed, on the basis of the angular position of the third actuator 6043A to be the redundant axis set by the redundant axis angle setting unit 6012 and the operation trace calculated by simulation unit 6005, and outputs the target position instruction of each of the actuators 6041A to 6047A for every predetermined operation cycle.

The servo control unit 6014 performs the position speed feedback control, on the basis of the target position instruction of each of the actuators 6041A to 6047A output from the interpolation operating unit 6013 for every predetermined operation cycle and an input signal from an encoder of each of the actuators 6041A to 6047A.

The amplifying unit 6015 performs operation control of each of the actuators 6041A to 6047A, on the basis of the operation instruction output from the servo control unit 6014.

The external force detecting unit 6016 detects whether the external force is generated with respect to the manipulator 6002, on the basis of the input signal from each of the sensors S1 to S4, calculates a contact avoiding correction value of the target position to make the manipulator 6002 avoid the external force, and inputs the correction value to the side of the target position/posture generating unit 6010.

Since the robot system 6100 according to the eighth embodiment has the above-described configuration, at the time of starting the work, the object detecting sensor 6002B measures the position of the target portion 6001A of the domestic animal 6001, the measurement result is input to the controller 6003, and the target position/posture of the control point is calculated by the target position/posture generating unit 6010.

The measurement information that is obtained from the object detecting sensor 6002B is three position information of X, Y, and Z of translational degrees of freedom of 3. Operational degrees of freedom of the manipulator 6002 are 7 and redundant degrees of freedom are 4.

Figure 62:
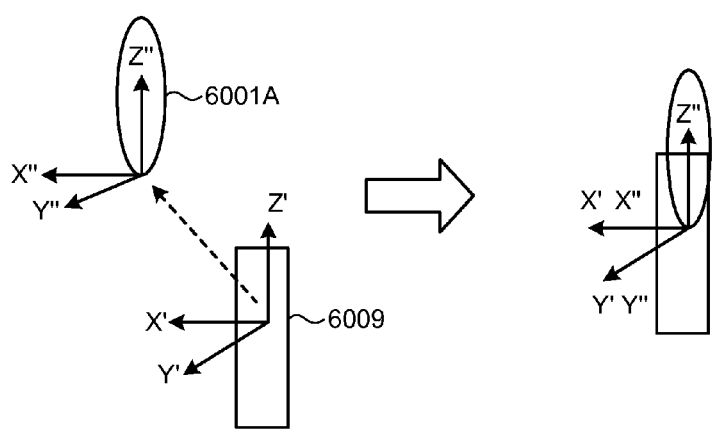
FIG. 62 is a schematic diagram illustrating a coordinate relationship of an end effector and a target portion (work object) according to the eighth embodiment.

For this reason, in order to generate the target position/posture of degrees of freedom of 6 that is the sum of rotational degrees of freedom of 3 and translational degrees of freedom of 3 on the basis of the detection information of the object detecting sensor 6002B according to this embodiment, the target portion 6001A is assumed as a nipple of the domestic animal, and the nipple has a cylindrical shape. As illustrated in FIG. 62, since a shape is constant around a Z" axis and the target portion 6001A is downward, a rotation angle around Y" and X" axes is assumed as a constant angle, and the target position/posture generating unit 6010, the region determining unit 6011, and the redundant axis angle setting unit 6012 determines Rz (rotation position around the Z" axis) and an elbow angle Ex using the redundant angle definition table 6007.

That is, the position and the coordinates (Xs, Ys, Zs) of the target portion 6001A based on the object detecting sensor coordinate system that are calculated by the object detecting sensor 6002B are input to the region determining unit 6011, and a number of the corresponding small region is determined from the small regions Sc (m, n, l), by referring to the redundant angle definition table 6007 illustrated in FIG. 63.

For example, if a region No2 is selected in FIG. 63, as values of Rz and Ex, 47 and 75 are set by the redundant axis angle setting unit 6012. The set position and posture angle are input to the interpolation operating unit 6013, a target position instruction with respect to each of the actuators 6041A to 6047A is generated on the basis of inverse kinematics and is input to the servo control unit 6014 and the amplifying unit 6015, and the manipulator 6002 positions the target portion 6001A in the target portion 6001A (refer to FIG. 62). The above operation is repetitively executed for each sampling cycle of a measurement frequency (for example, 100 Hz or more) of the object detecting sensor 6002B.

An operation cycle of the position speed feedback control in the servo control unit 6014 is shorter than the sample cycle.

As such, according to the robot system according to this embodiment, the target position/posture is calculated fro each operation cycle, on the basis of the detection result input from the object detecting sensor 6002B for each measurement frequency, and the angular position of the redundant axis is set from the collation result with the redundant angle definition table 6007, on the basis of the target position/posture. Therefore, the redundant axis of the manipulator can be appropriately set with the small operation amount, and the manipulator having the redundant degree of freedom can be optimally controlled.

Thereby, even when the manipulator 6002 is operated in a narrow work space where a moving obstacle such as the leg of the domestic animal 6001 exists, the posture of the redundant axis can be changed according to the position of the target portion 6001A, and high work efficiency can be maintained by reducing the contact probability of the manipulator 6002 and the obstacle.

Even when the manipulator 6002 and the obstacle contact, because the target position/posture to avoid the external force is changed by the external force detecting unit (avoidance operation executing unit) 6016, the manipulator 6002 does not excessively contact the obstacle and can avoid the obstacle. The angular position of the redundant axis is set from the collation result with the redundant angle definition table 6007, on the basis of the modified target position/posture, at the time of the contact avoidance operation. Therefore, the posture of the manipulator 6002 can be appropriately controlled to reduce the contact probability with another obstacle, during the avoidance operation of the obstacle.

The eighth embodiment has been described. However, the embodiment may be implemented by various different embodiments other than the eighth embodiment. Therefore, the various different embodiments are hereinafter described as modifications.

The embodiment is not limited to the case where the work is performed with respect to the domestic animal and can be applied to various different purposes. For example, the embodiment can be applied to the case where the position of the obstacle in the operation range of the manipulator is changed.

In the above embodiment, the manipulator of the degree of freedom of 7 that has the seven actuators is described. However, the degree of freedom of the manipulator is not limited thereto and this embodiment can be applied to the manipulator having the degree of freedom of 8 or more by appropriately setting data of the redundant angle definition table.

In the case of the manipulator having the degree of freedom of 6 or less, when the degree of freedom of 1 or more is allowed with respect to an approach with respect to the work object, the manipulator has a redundant degree of freedom. However, this embodiment can be applied to the above case.

According to at least one embodiment described above, functionality of the robot can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

In regard to the embodiments, the following aspects are disclosed.

Note 1. A robot comprising:
  a robot arm;
  one or more actuators that are provided in the robot arm and drive the robot arm;
  a sensor fixing jig that is provided in a base of the actuator, among the actuators in the robot arm, closest to a base end of the robot arm; and
  a strain sensor that is provided in the sensor fixing jig and has a piezoelectric body with a natural frequency higher than a natural frequency of a structural material forming the robot arm.

Note 2. The robot of Note 1,
  wherein the sensor fixing jig is provided in a casing of the robot arm or a casing of the robot.

Note 3. The robot of Note 1 or 2,
  wherein at least three strain sensors are provided in the sensor fixing jig.

Note 4. The robot of Note 3,
wherein the at least three strain sensors are radially disposed on the same circumference at an equal interval.

Note 5. The robot of any one of Notes 1 to 4,
wherein the sensor fixing jig is formed in an annular circular shape with an opening at the center.

Note 6. The robot of any one of Notes 1 to 5,
wherein the strain sensor is a sensor that uses quartz as the piezoelectric body.

Note 7. A robot comprising:
a robot arm that includes one or more actuators; and
a first strain sensor that is provided in the vicinity of a front end of a casing of the robot arm and has a piezoelectric body with a natural frequency higher than a natural frequency of a structural material forming the robot arm.

Note 8. The robot of Note 7, further comprising:
an A/D converter that is provided in the vicinity of the first strain sensor and converts an output signal of the first strain sensor into a digital signal.

Note 9. The robot of Note 7 or 8,
wherein the first strain sensor is provided on an external surface of the casing.

Note 10. The robot of any one of Notes 7 to 9, further comprising:
a second strain sensor that is provided in a base of the actuator, among the actuators in the robot arm, closest to a base end of the robot arm and has a piezoelectric body with a natural frequency higher than a natural frequency of the structural material.

Note 11. The robot of any one of Notes 7 to 10,
wherein each of the first strain sensor and the second strain sensor is a sensor that uses quartz as the piezoelectric body.

Note 12. A robot system comprising:
a robot that includes a robot arm;
a strain sensor that has a piezoelectric body with a natural frequency higher than a natural frequency of a structural material forming the robot arm; and
a control unit that includes a determining unit configured to determine whether the robot is in a normal state or an abnormal state, on the basis of an output value of the strain sensor.

Note. 13 The robot system of Note 12,
wherein the control unit has a normative data recording unit that records a time history of the output value of the strain sensor while the robot arm executes a predetermined operation at the time of the normal state as normative data, and
the determining unit determines whether the robot is in the normal state or the abnormal state by comparing output data of the output value of the strain sensor at timing when the robot arm executes the predetermined operation at the time of activating and with the normative data recorded in the normative data recording unit.

Note 14. The robot system of Note 13,
wherein the determining unit determines that the robot is in the normal state, when the difference of the output data and the normative data is within a range of a predetermined threshold value, and determines that the robot is in the abnormal state, when the difference exceeds the threshold value.

Note 15. The robot system of Note 14,
wherein the control unit further includes a threshold value setting unit that sets the threshold value.

Note 16. The robot system of any one of Notes 13 to 15,
wherein the control unit further includes a section setting unit that sets a section which is a subject for which the time history of the output value of the strain sensor is recorded by the normative data recording unit as the normative data.

Note. 17 The robot system of 16,
wherein the control unit further includes a zero point adjusting unit that adjusts a zero point of the strain sensor, whenever the robot arm executes the predetermined operation corresponding to the section set by the section setting unit.

Note 18. The robot system of any one of Notes 13 to 17,
wherein the control unit further includes a high-pass filter unit that extracts a high frequency vibration component of the output signal of the strain sensor, and
the determining unit compares the normative data based on the high frequency vibration component extracted by the high-pass filter unit with the output data, and determines whether the robot is in the normal state or the abnormal state.

Note 19. The robot system of any one of Notes 13 to 18,
wherein the control unit further includes a low-pass filter unit that extracts a low frequency vibration component of the output signal of the strain sensor, and
the determining unit compares the normative data based on the low frequency vibration component extracted by the low-pass filter unit with the output data, and determines whether the robot is in the normal state or the abnormal state.

Note 20. The robot system of any one of Notes 12 to 19,
wherein the strain sensor is a sensor that uses quartz as the piezoelectric body.

Note 21. A state determining method of a robot that determines whether the robot including a robot arm is in a normal state or an abnormal state, the method comprising:
an output value acquiring sequence that acquires an output value of a strain sensor having a piezoelectric body with a natural frequency higher than a natural frequency of a structural material forming the robot arm; and
a determining sequence that determines whether the robot is in the normal state or the abnormal state, on the basis of the output value of the strain sensor.

Note 22. The state determining method of Note 21, further comprising:
a normative data recording sequence that records a time history of the output value of the strain sensor while the robot arm executes a predetermined operation at the time of the normal state as normative data,
wherein the determining sequence compares output data of the output value of the strain sensor when the robot arm executes the predetermined operation at the time of activating with the recorded normative data, and determines whether the robot is in the normal state or the abnormal state.

Note 23. A robot system comprising:
a robot including a robot arm; and
a control unit that controls the robot,
wherein the robot includes a strain sensor provided in the robot arm, and
wherein the control unit includes:
a normative data recording unit that records a time history of an output value of the strain sensor while the robot arm executes a predetermined operation in a state in which there is no abnormality in the robot arm as normative data;
an output data recording unit that records a time history of an output value of the strain sensor while the robot arm executes the predetermined operation at the time of activating as output data; and a comparing/determining unit that compares the normative data recorded in the normative data recording unit with the output data recorded in the output data recording unit and determines whether there is abnormality in the robot arm.

Note 24. The robot system of Note 23,
wherein one or more actuators that operate one or more joint portions of the robot arm are provided in the robot arm, and
the comparing/determining unit determines that there is abnormality in the actuators, when an event that the difference between the output data and the normative data exceeds a predetermined threshold value occurs for every predetermined cycle.

Note 25. The robot system of Note 23 or 24,
wherein the comparing/determining unit determines that there is abnormality in the robot arm, when the number of times of excess where the difference between the output data and the normative data exceeds the predetermined threshold value in a predetermined time period, exceeds a predetermined number of times of determination.

Note 26. The robot system of Note 25,
wherein the comparing/determining unit performs determination while changing the number of times of determination according to an operation speed of the robot arm.

Note 27. The robot system of Note 25 or 26,
wherein the control unit further includes a threshold value setting unit that sets the threshold value.

Note 28. The robot system of any one of Notes 23 to 27,
wherein the control unit further includes a section setting unit that sets a section that is a subject for which the time history of the output value of the strain sensor is recorded by the normative data recording unit as the normative data.

Note 29. The robot system of Note 28,
wherein the control unit further includes a zero point adjusting unit that adjusts a zero point of the strain sensor, whenever the robot arm executes the predetermined operation corresponding to the section set by the section setting unit.

Note 30. The robot system of any one of Notes 23 to 29,
wherein the control unit further includes a high-pass filter unit that extracts a high frequency vibration component of the output signal of the strain sensor, and
the comparing/determining unit compares the normative data based on the high frequency vibration component extracted by the high-pass filter unit with the output data, and determines whether the robot is in the normal state or the abnormal state.

Note 31. The robot system of any one of Notes 23 to 30,
wherein the strain sensor is a force sensor that has a piezoelectric body with a natural frequency higher than a natural frequency of a structural material forming the robot arm.

Note 32. The robot system of Note 31,
wherein the strain sensor is a sensor that uses quartz as the piezoelectric body.

Note 33. An abnormality detecting method of a robot that determines whether there is abnormality in a robot arm included in the robot, the abnormality detecting method comprising:
a normative data recoding sequence that records a time history of an output value of a strain sensor provided in the robot arm while the robot arm executes a predetermined operation in a state in which there is no abnormality as normative data;
an output data recording sequence that records the time history of the output value of the strain sensor while the robot arm executes the predetermined operation at the time of activating as output data; and
a comparing/determining sequence that compares the normative data with the output data, and determines whether there is abnormality in the robot arm.

Note 34. A robot system comprising:
a robot arm;
one or more actuators that are provided in the robot arm and drive the robot arm;
a sensor unit that detects the external force applied to at least one of the robot arm and the actuator; and
a controller that controls an operation of the actuator and limits a torque instruction value with respect to the actuator, on the basis of the detection result of the sensor unit.

Note 35. The robot system of Note 34, further comprising:
a position sensor that detects a position and a posture of a control point inside the robot arm or the actuator, the control point being a point where the position and the posture are controlled by the controller,
wherein the controller includes:
an operation instruction setting unit that sets the position of each actuator corresponding to the position and the posture of the control point, as the target position, and sets an operation instruction with respect to each actuator,
a servo unit that generates a torque instruction with respect to each actuator, for every predetermined operation cycle, on the basis of at least the operation instruction and the detection result of the position sensor,
an external force detecting unit that detects a direction of the external force when the external force is generated, on the basis of the detection result of the sensor unit,
an avoidance axis selecting unit that selects the actuator to perform an avoidance operation from among the one or more actuators, on the basis of the direction of the external force detected by the external force detecting unit,
a gravity compensation torque adding unit that adds the gravity compensation torque corresponding to the self weight to the torque instruction generated by the servo unit, and
a friction compensation toque adding unit that adds the friction compensation torque to cause the actuator to operate in the direction of the external force against the friction force of the actuator, to the torque instruction generated by the servo unit with respect to the actuator selected by the avoidance axis selecting unit.

Note 36. The robot system of Note 35,
wherein the controller includes an operation instruction intercepting unit that intercepts the operation instruction given to the servo unit, when the external force is detected by the external force detecting unit.

Note 37. The robot system of Note 36,
wherein the controller includes an operation instruction returning unit that releases the interception of the operation instruction by the operation instruction intercepting unit, when the external force is not detected by the external force detecting unit during a predetermined period or more after the operation instruction is intercepted by the operation instruction intercepting unit.

Note 38. The robot system of any one of Notes 35 to 37,
wherein the controller includes a torque instruction limiting unit that limits a torque instruction value with respect to the actuator, and
the torque instruction limiting unit sets an upper limit and a lower limit of the torque instruction value, on the basis of the sum of the gravity compensation torque and the friction compensation torque.

Note 39. The robot system of any one of Notes 35 to 38,
wherein the sensor unit includes plural sensors that use quartz as the piezoelectric body.

Note 40. The robot system of Note 39,
wherein the sensor unit includes: a disk-shaped sensor fixing jig provided in a base of the actuator, among the actuators in the robot arm, closest to a base end of the robot arm, and
the plural sensors buried in the sensor fixing jig along the same circular arc.

Note 41. The robot system of Note 40,
wherein the external force detecting unit extracts a high frequency vibration component of each signal from the plural sensors and detects whether the external force is generated, on the basis of the extracted high frequency vibration components.

Note 42. The robot system of Note 41,
wherein the external force detecting unit calculates a peak value of the extracted high frequency vibration component for each sensor and detects a direction of the external force on the basis of a combination of positives and negatives of the peak values of the sensors.

Note 43. The robot system of Note 42,
wherein the avoidance axis selecting unit executes threshold value processing on each component of a vector obtained through a calculation of multiplying a direction vector of the external force calculated by the external force detecting unit by a transposed matrix of a Jacobian matrix and calculates an avoidance object joint axis and a direction.

Note. 44 The robot system of Note 43,
wherein the friction compensation torque adding unit adds a maximum static friction torque of the actuator as the friction compensation torque, when the actuator selected by the avoidance axis selecting unit is stopped, and adds a dynamic friction torque of the actuator as the friction compensation torque, when the actuator rotates.

Note 45. The robot system of Note 41,
wherein the external force detecting unit detects whether the external force is generated, on the basis of a moving average obtained by executing moving averaging processing on the extracted high frequency vibration component for each sensor.

Note. 46 The robot system of Note 41,
wherein the external force detecting unit calculates an integration value of the high frequency vibration component for each sensor after the generation of the external force is detected, and detects a direction of the external force on the basis of a combination of positives and negatives of the integration values.

Note 47. The robot system of Note 45 or 46,
wherein the controller includes a data table where a combination of positives and negatives of the integration values of the sensors or a combination of positives and negatives of the moving averages of the sensors and the direction of the external force are associated with each other, and
the external force detecting unit detects the direction of the external force, on the basis of the combination of the positives and negatives of the integration values of the sensors or the combination of the positives and negatives of the moving averages of the sensors, at a plurality of timings after the generation of the external force is detected.

Note 48. A control device of a robot including a robot arm with one or more actuators, and a sensor unit detecting an external force applied to at least one of the robot arm and the actuators, the control device comprising:
an actuator control unit that transmits a torque instruction to the actuator; and
a torque instruction limiting unit that limits a value of the torque instruction transmitted to the actuator, on the basis of an input which is the result from the sensor unit.

Note 49. A robot system comprising:
a manipulator that includes one or more actuators; and
a controller that controls an operation of each of the actuators,
wherein the controller includes:
a redundant axis setting unit that sets a part of the actuators as a redundant axis,
a target position/posture generating unit that sets a target position/posture of the manipulator,
a simulation unit that generates an operation trace until the manipulator reaches from the current posture to the target position/posture, on the basis of the target position/posture,
a redundant angle definition table in which small regions set by dividing a region in a movable range of the manipulator and parameters for redundant axis angles corresponding to the small regions are associated with each other,
a region determining unit that selects the corresponding small region in the redundant angle definition table, on the basis of the result output from the target position/posture generating unit,
a redundant axis angle setting unit that sets the redundant axis angle, on the basis of the selection result of the region determining unit and the redundant angle definition table, and
an interpolation operating unit that generates an operation instruction with respect to each of the actuators, on the basis of the operation trace and the redundant axis angle.

Note 50. The robot system of Note 49, further comprising:
an object detecting sensor that detects the position of a work object,
wherein the target position/posture generating unit changes the target position/posture, on the basis of the detection result of the object detecting sensor.

Note 51. The robot system of Note 49 or 50, further comprising:
a sensor unit that detects the external force applied to the manipulator,
wherein the controller includes an avoidance operation executing unit that controls an operation of the actuator and causes the actuator to execute an avoidance operation in an avoidance direction with respect to the external force, on the basis of the detection result of the sensor unit.

Note 52. The robot system of any one of Notes 49 to 51,
wherein the controller has a table display/input unit that displays the redundant angle definition table and receives a modification of contents of the redundant angle definition table.

Note 53. The robot system of any one of Notes 49 to 52,
wherein the manipulator includes:
a base,
a first joint that causes a first structural material to operate relative to the base,
a second joint that causes a second structural material to operate relative to the first structural material,
a third joint that causes a third structural material to operate relative to the second structural material,
a fourth joint that causes a fourth structural material to operate relative to the third structural material,
a fifth joint that causes a fifth structural material to operate relative to the fourth structural material,
a sixth joint that causes a sixth structural material to operate relative to the fifth structural material, and
a seventh joint that causes a flange to rotate relative to the sixth structural material.

Note 54. The robot system of any one of Notes 49 to 53,
wherein each of the small regions that are defined in the redundant angle definition table has a shape of a rectangular parallelepiped.

Note 55. The robot system of any one of Notes 50 to 54,
wherein each of the small regions that are defined in the redundant angle definition table are set in advance, taking a variation in the position of the work object into consideration.

Note 56. The robot system of any one of Notes 50 to 55,
wherein the region determining unit outputs an abnormal signal to the object detecting sensor, when it is determined that the corresponding small region in the redundant angle definition table does not exist, from the output result of the target position/posture generating unit.

Note 57. A robot control device that controls an operation of a manipulator having one or more actuators, the robot control device comprising:
a redundant axis setting unit that sets a part of the actuators to a redundant axis,
a target position/posture generating unit that sets a target position/posture of the manipulator,
a simulation unit that generates an operation trace until the manipulator reaches from the current posture to the target position/posture, on the basis of the target position/posture,
a redundant angle definition table in which small regions set by dividing a region in a reachable range of the manipulator and parameters for redundant axis angles corresponding to the small regions are associated with each other,
a region determining unit that selects the corresponding small region in the redundant angle definition table, on the basis of the output result of the target position/posture generating unit,
a redundant axis angle setting unit that sets the redundant axis angle, on the basis of the selection result of the region determining unit and the redundant angle definition table, and
an interpolation operating unit that generates an operation instruction with respect to each of the actuators, on the basis of the operation trace and the redundant axis angle.

What is claimed is:

1. A robot comprising:
an arm;
a first strain sensor that includes a piezoelectric body with a natural frequency higher than a natural frequency of a structure material forming the arm;
one or more actuators that are provided in the arm to drive the arm; and
a sensor fixing jig that is provided in a base of the actuator, among the actuators in the arm, closest to a base end of the arm,
wherein the first strain sensor is provided in the sensor fixing jig.

2. The robot according to claim 1,
wherein the sensor fixing jig is provided in a casing of the arm or a casing of the robot.

3. The robot according to claim 2, further comprising two or more strain sensors each of which includes a piezoelectric body with a natural frequency higher than the natural frequency of the structure material,
wherein the at least three strain sensors are radially disposed on the same circumference at an equal interval.

4. The robot according to claim 1, further comprising:
a second strain sensor that is provided in the vicinity of a front end of a casing of the arm and includes a piezoelectric body with a natural frequency higher than the natural frequency of the structure material.

5. The robot according to claim 4, further comprising:
an A/D converter that is provided in the vicinity of the second strain sensor and converts an output signal of the second strain sensor into a digital signal.

6. The robot according to claim 4,
wherein the second strain sensor is provided on an external surface of the casing.

7. A robot system comprising:
a robot that includes arm;
a strain sensor that includes a piezoelectric body with a natural frequency higher than a natural frequency of a structure material forming the arm;
a control unit that determines a predetermined state of the robot, on the basis of an output value of the strain sensor;
one or more actuators that are provided in the arm to drive the arm; and a sensor fixing jig that is provided in a base of the actuator, among the actuators in the arm, closest to a base end of the arm, wherein the strain sensor is provided in the sensor fixing jig.

8. The robot system according to claim 7,
wherein the control unit includes a determining unit that determines whether the robot is in a normal state or an abnormal state, on the basis of the output value of the strain sensor.

9. The robot system according to claim 8,
wherein the control unit further includes a normative data recording unit that records a time history of the output value of the strain sensor while the arm execute a predetermined operation at the time of the normal state as normative data, and
the determining unit compares output data of the output value of the strain sensor when the arm execute the predetermined operation at the time of activating with the normative data recorded in the normative data recording unit, and determines whether the robot is in the normal state or the abnormal state.

10. The robot system according to claim 9,
wherein the determining unit determines that the robot is in the normal state, when the difference between the output data and the normative data is within a range of a predetermined threshold value, and determines that the robot is in the abnormal state, when the difference exceeds the threshold value.

11. The robot system according to claim 7,
wherein the control unit includes:
a normative data recording unit that records a time history of the output value of the strain sensor while the arm execute a predetermined operation in a state where there is no abnormality as normative data, an output data recording unit that records a time history of an output value of the strain sensor while the arm execute the predetermined operation at the time of activating as output data, and a comparing/determining unit that compares the normative data recorded in the normative data recording unit with the output data recorded in the output data recording unit and determines whether there is abnormality in the arm.

12. The robot system according to claim 11, the comparing/determining unit determines that there is abnormality in the actuators, when an event where a difference between the output data and the normative data exceeds a predetermined threshold value occurs for every predetermined cycle.

13. The robot system according to claim 11, wherein the comparing/determining unit determines that there is abnormality in the robot arm, when the number of times of excess where the difference between the output data and the normative data exceeds a predetermined threshold value in a predetermined time period exceeds a predetermined number of times of determination.

14. A robot, comprising:

a robot arm;

a means for detecting dynamic strain of a structural material forming the robot arm;

one or more actuators that are provided in the arm to drive the arm; and a sensor fixing jig that is provided in a base of the actuator, among the actuators in the arm, closest to a base end of the arm, wherein the means for detecting dynamic strain is provided in the sensor fixing jig.

* * * * *